(12) United States Patent
Ramstack et al.

(10) Patent No.: US 9,598,503 B2
(45) Date of Patent: Mar. 21, 2017

(54) METHODS AND SYSTEMS FOR POLYMER PRECIPITATION AND GENERATION OF PARTICLES

(71) Applicants: J. Michael Ramstack, Lunenberg, MA (US); Thomas C. Crawford, Essex, CT (US)

(72) Inventors: J. Michael Ramstack, Lunenberg, MA (US); Thomas C. Crawford, Essex, CT (US)

(73) Assignee: CERULEAN PHARMA INC., Waltham, MA (US)

( * ) Notice: Subject to any disclaimer, the term of this patent is extended or adjusted under 35 U.S.C. 154(b) by 65 days.

(21) Appl. No.: 13/864,429

(22) Filed: Apr. 17, 2013

(65) Prior Publication Data
US 2013/0317208 A1 Nov. 28, 2013

Related U.S. Application Data

(60) Provisional application No. 61/635,140, filed on Apr. 18, 2012.

(51) Int. Cl.
C08B 37/16 (2006.01)

(52) U.S. Cl.
CPC .................. C08B 37/0012 (2013.01)

(58) Field of Classification Search
None
See application file for complete search history.

(56) References Cited

U.S. PATENT DOCUMENTS

| | | | |
|---|---|---|---|
| 5,718,905 A | 2/1998 | Skiba et al. | |
| 5,833,891 A | 11/1998 | Subramaniam et al. | |
| 6,407,079 B1 | 6/2002 | Muller et al. | |
| 7,270,808 B2 * | 9/2007 | Cheng et al. | 424/78.08 |
| 2006/0121078 A1 | 6/2006 | Trogolo et al. | |
| 2007/0025952 A1 | 2/2007 | Davis et al. | |
| 2010/0247669 A1 | 9/2010 | Eliasof et al. | |
| 2011/0152512 A1 | 6/2011 | Ryan | |
| 2011/0237540 A1 | 9/2011 | Crawford et al. | |
| 2011/0237748 A1 | 9/2011 | Podobinski et al. | |

FOREIGN PATENT DOCUMENTS

| | | |
|---|---|---|
| FR | 2665169 A1 | 1/1992 |
| WO | 96/29998 A1 | 10/1996 |
| WO | 2009149883 A1 | 12/2009 |

OTHER PUBLICATIONS

International Search Report and Written Opinion for International Application No. PCT/US2013/036887 dated Nov. 5, 2013.
Cserhati, "Charge-transfer chromatographic study of the complex formation of some anticancer drugs with g-cyclodextrin," Analytical Biochemistry, 1995, vol. 225, pp. 328-332.
Hisamatsu et al., "Study on specific modification of glucosyl cyclodextrins," Starch, 1992, vol. 44, pp. 188-191.
Husain et al., "Complexation of doxorubicin with β- and g-cyclodextrins," Applied Spectroscopy, 1992, vol. 46, pp. 652-658.
Mungall et al., "Use of the azido group in the synthesis of 5' terminal aminodeoxythymidine oligonucleotides," J. Org. Chem., 1975, vol. 40, No. 11, pp. 1659-1662.
Suh et al., "A new backbone of artificial enzymes obtained by cross-linkage of Poly(ethylenimine)," Bioorg. Med. Chem. Lett., 1998, vol. 8, pp. 1327-1330.
Tabushi et al., "Bis(histamino)cyclodextrin-Zn-imidazole complex as an artificial carbonic anhydrase," J. Am. Chem. Soc., 1984, vol. 106, pp. 4580-4584.
Tabushi et al., "Characterization of regiospecific A,C- and A,D-disulfonate capping of β-cyclodextrin. Capping as an efficient production technique," J. Am. Chem. Soc., 1984, vol. 106, pp. 5267-5270.
Tabushi et al., "Specific bifunctionalization on cyclodextrin," Tetrahedron Lett., 1977, vol. 18, pp. 1527-1530.
Supplementary European Search Report for European Application No. EP 13778546 dated Oct. 26, 2015.

* cited by examiner

*Primary Examiner* — Layla Berry
(74) *Attorney, Agent, or Firm* — Lando & Anastasi, LLP

(57) ABSTRACT

Processes for precipitating a polymer from a polymer-containing fluid are disclosed, which include providing a vessel housing a medium that provides one or more precipitation surfaces. A polymer-containing fluid, e.g., a polymer solution, dispersion or mixed solution/dispersion, and an anti-solvent can be introduced into the vessel so as to cause precipitation of at least a portion of the polymer on at least one of the precipitation surfaces. In some embodiments, the polymer contains one or more cyclic oligosaccharide moieties, such as one or more cyclodextrin moieties (e.g., α-cyclodextrin, β-cyclodextrin, and γ-cyclodextrin). The polymer can be any of a linear or branched polymer. The polymer can be any of polycation, a polyanion, or a non-ionic polymer. Also disclosed herein are precipitation surfaces with polymer precipitated thereon.

31 Claims, 7 Drawing Sheets

METHODS AND SYSTEMS FOR POLYMER PRECIPITATION AND GENERATION OF PARTICLES

CLAIMS OF PRIORITY

This application claims priority to U.S. Ser. No. 61/635,140 filed Apr. 18, 2012, the entire contents of which is incorporated herein by reference.

BACKGROUND

The present invention relates generally to methods, devices and systems for precipitating polymer(s) from a polymer-carrying fluid, such as a polymer solution, dispersion or mixed solution/dispersion, as well as such methods, devices and systems that can be utilized to fabricate polymeric particles, and in particular polymeric nanoparticles.

Polymeric particles (e.g., nanoparticles) can be utilized for delivery of drugs. For example, cyclodextrin containing polymeric nanoparticles can be utilized as carriers of therapeutic agents. Typically, such cyclodextrin polymeric particles (e.g., nanoparticles) can be fabricated by introducing a polymer solution containing a cyclodextrin polymer having a therapeutic agent covalently attached thereto into an anti-solvent, such as acetone, to cause precipitation of the conjugated polymer. The precipitation process is relatively slow and generally includes formation of a cloudy solution followed by generation of polymeric strands, which eventually coalesce into a polymeric aggregate. Multiple decantation and rinsing steps are then performed to remove unreacted impurities. The conjugated polymer can then be dispersed in water to spontaneously form cyclodextrin polymeric particles (e.g., nanoparticles).

The scaling of the above process for generating particles (e.g., nanoparticles) on a commercial scale can be difficult. Additionally, the reproducibility in generating these particles (e.g., nanoparticles could be improved).

Accordingly, there is a need for improved methods, systems and devices for precipitating polymer(s) from a polymer-carrying fluid and for generating particles (e.g., nanoparticles), such as polymeric particles (e.g., nanoparticles).

SUMMARY

Processes for precipitating a polymer from a polymer-containing fluid are disclosed, which include providing a vessel housing a medium that provides one or more precipitation surfaces. A polymer-containing fluid, e.g., a polymer solution, dispersion or mixed solution/dispersion, and an anti-solvent can be introduced into the vessel so as to cause precipitation of at least a portion of the polymer on at least one of the precipitation surfaces.

In some embodiments, the polymer contains one or more cyclic oligosaccharide moieties, such as one or more cyclodextrin moieties (e.g., α-cyclodextrin, β-cyclodextrin, and γ-cyclodextrin). The polymer can be any of a linear or branched polymer. The polymer can be any of polycation, a polyanion, or a non-ionic polymer.

In some embodiments, the polymer can comprise a covalently attached agent which may be a therapeutic agent or a prodrug thereof, a bioactive agent or a precursor thereof, an adjuvant, a diagnostic agent, a targeting ligand or a precursor thereof, or a reactive group. In some embodiments, the therapeutic agent can be any of an anti-cancer agent, an anti-inflammatory agent, or a cardiovascular agent. In some embodiments, the therapeutic agent is an anti-cancer agent. In some embodiments, the anti-cancer agent is an alkylating agent, a vascular disrupting agent, a microtubule targeting agent, a mitotic inhibitor, a topoisomerase inhibitor, an anti-angiogenic agent or an anti-metabolite. In some embodiments, the anti-cancer agent is a taxane (e.g., paclitaxel, docetaxel, larotaxel or cabazitaxel). In some embodiments, the anti-cancer agent is an anthracycline (e.g., doxorubicin). In some embodiments, the anti-cancer agent is a platinum-based agent (e.g., cisplatin). In some embodiments, the anti-cancer agent is a pyrimidine analog (e.g., gemcitabine). In some embodiments, the therapeutic agent can be any of a taxane, an epothilone, or a proteasome inhibitor (e.g., a boronic acid proteasome inhibitor)-.

In some embodiments, the process can further comprise extracting at least a portion of the polymer-containing fluid and the anti-solvent from the vessel and recirculating the mixture through the vessel and the medium to induce further precipitation.

The medium can be porous. In some embodiments, the medium can be a mesh. In some embodiments, the mesh is at least partly formed of a metal, e.g., stainless steel, gold, and silver. In some embodiments, the mesh is at least partially formed of a polymeric material, e.g., polytetrafluoroethylene (PTFE). In some embodiments, the mesh is at least partially formed of a ceramic.

The polymer in the polymer-containing fluid can be immiscible, or partially miscible, in the anti-solvent.

In some embodiments, the polymer has an average molecular weight in a range of about 40 kDa to about 100 kDa, e.g., in a range of about 70 kDa to about 80 kDa, or about 40 kDa to about 90 kDa.

In some embodiments, the medium can comprise a plurality of insoluble supports providing the precipitation surfaces. In some embodiments, the insoluble supports providing the precipitation surfaces exhibit a size in a range of about 10 micrometers (microns) to about 1 millimeter, e.g., in a size in a range of about 10 microns to about 500 microns, or in a range of about 10 microns to about 400 microns, or in a range of about 10 microns to about 300 microns, or in a range of about 10 microns to about 200 microns, or in a range of about 10 microns to about 100 microns, or in a range of about 10 microns to about 50 microns, or in a range of about 10 microns to about 20 microns.

In some embodiments, the medium providing the precipitation surfaces, such as the aforementioned mesh or a collection of insoluble supports, is inert to any of the anti-solvent, the fluid containing the polymer and the polymer.

In some embodiments, the insoluble supports providing the precipitation surfaces comprise a powder of diatomaceous earth (e.g., Celite®), or other preferably inert insoluble supports, e.g., PTFE (polytetrafluoroethylene) insoluble supports.

In some embodiments, in the above process, at least a portion of the anti-solvent is introduced into the vessel prior to the introduction of the polymer-containing fluid into the vessel. In some cases, the anti-solvent introduced into the vessel can be agitated and the polymer-containing fluid can be introduced into the agitated anti-solvent.

In some embodiments, in the above process, a flow, e.g., a continuous flow, of the anti-solvent is established through the vessel and the polymer-containing fluid is introduced into the flowing anti-solvent.

As noted above, the polymer-containing fluid can comprise any of a polymer solution, a polymer dispersion, or a mixed polymer solution/dispersion. In some embodiments, the polymer-containing fluid comprises a polymer solution that includes a quantity of a polymer dissolved in a process solvent, where the process solvent is miscible, or at least partially miscible, in the anti-solvent.

In some embodiments, the fluid containing the polymer can be, without limitation, any of acetone, ether, alcohol, tetrahydrofuran, 2-pyrrolidone, N-methyl-2-pyrrolidone (NMP), dimethylformamide (DMF), dimethylacetamide (DMA), methyl acetate, ethyl formate, methyl ethyl ketone (MEK), methyl isobutyl ketone (MIBK), methyl propyl ketone, isopropyl ketone, isopropyl acetate, acetonitrile (MeCN), dimethyl sulfoxide (DMSO), or a combination thereof.

In some embodiments, the anti-solvent can be any of an organic solvent or a mixture of two or more organic solvents such as alcohols and aprotic solvents such as polar aprotic solvents. By way of example, the anti-solvent can comprise any of methanol, ethanol, acetone, n-propanol, isopropanol, n-butanol, ethyl ether, methyl isobutyl ketone (MIBK), ethyl acetate (ETAC), or a combination thereof.

In some embodiments, the introduction of the polymer-containing fluid into the vessel is terminated after precipitation of at least some of the polymer on the medium surface(s) and precipitation surface(s) are washed with the same or a different anti-solvent. For example, in some cases, the liquid in the vessel is drained and an anti-solvent different than that utilized during the precipitation step is introduced into the vessel to rinse the precipitation surface(s).

In a related aspect, subsequent to precipitation of at least some of the polymer on the surface(s) of the medium, at least a portion of the medium having the precipitated polymer is collected. The collected medium can be optionally dried and stored for later use, e.g., for generating polymeric particles (e.g., nanoparticles) by exposing the polymer-coated surface(s) to a stripping liquid, e.g., a liquid capable of stripping at least a portion of the precipitated polymer from the surface(s) of the medium so as to form polymeric particles (e.g., nanoparticles).

In some embodiments in which the medium providing the precipitation surfaces comprises a plurality of insoluble supports, subsequent to precipitation of at least some of the polymer on surfaces of those insoluble supports, the polymer-coated insoluble supports can be separated from at least a portion of a liquid present in the vessel, e.g., by employing centrifugation or filtration. In some embodiments, the collected polymer-coated insoluble supports can be dried and stored for future use.

In another aspect, the polymer-coated precipitation surface(s) can be placed in contact with a liquid adapted to strip at least a portion of the precipitated polymer from those surface(s) so as to form a plurality of polymeric particles (e.g., nanoparticles), e.g., as a colloidal suspension.

A variety of liquids can be employed as stripping liquids (herein also referred to as stripping solvents) for formation of the polymeric particles (e.g., nanoparticles). In some embodiments, the stripping liquid comprises a polar liquid. By way of example, the stripping liquid can be water. In some embodiments, the stripping liquid can be water containing salt(s), wetting agent(s), or other suitable additives. In some embodiments, the stripping liquid can be an aqueous solution having a selected pH. For example, in some embodiments, the stripping liquid can be an aqueous solution having an acidic pH (e.g., a pH of about 3) while in other embodiments, the stripping solution can be an aqueous solution having an alkaline pH. Alternatively, the aqueous solution can have a neutral pH (i.e., a pH of about 7).

In some embodiments, the polymeric particles (e.g., nanoparticles) formed by exposing the polymer-coated precipitation surface(s) to a liquid can have an average particle size equal to less than about 1 micrometer (micron). For example, the polymeric nanoparticles can exhibit an average particle size equal or less than about 500 nm. For example, the polymeric nanoparticles can exhibit an average particle size in a range of about 5 nm to about 500 nm, or in a range of about 10 nm to about 500 nm, or in a range of about 20 nm to about 500 nm, or in a range of about 30 nm to about 500 nm, or in a range of about 40 nm to about 500 nm, or in a range of about 50 nm to about 500 nm.

In some embodiments, the polymeric nanoparticles can exhibit an average particle size equal to or less than about 400 nm. For example, the polymeric nanoparticles can exhibit an average particle size in a range of about 5 nm to about 400 nm, or in a range of about 10 nm to about 400 nm, or in a range of about 20 nm to about 400 nm, or in a range of about 30 nm to about 400 nm, or in a range of about 40 nm to about 400 nm, in a range of about 50 nm to about 400 nm.

In some embodiments, the polymeric nanoparticles can exhibit an average particle size equal to or less than about 300 nm. For example, the polymeric nanoparticles can exhibit an average particle size in a range of about 5 nm to about 300 nm, or in a range of about 10 nm to about 300 nm, or in a range of about 20 nm to about 300 nm, or in a range of about 30 nm to about 300 nm, or in a range of about 40 nm to about 300 nm, or in a range of about 50 nm to about 300 nm.

In some embodiments, the polymeric nanoparticles can exhibit an average particle size equal to or less than about 200 nm. For example, the polymeric nanoparticles can exhibit an average particle size in a range of about 5 nm to about 200 nm, or in a range of about 10 nm to about 200 nm, or in a range of 20 nm to about 200 nm, or in a range of about 30 nm to about 200 nm, or in a range of about 40 nm to about 200 nm, or in a range of about 50 nm to about 200 nm.

In some embodiments, the polymeric nanoparticles can exhibit an average particle size equal to or less than about 100 nm. For example, the polymeric nanoparticles can exhibit an average particle size in a range of about 5 nm to about 100 nm, or in a range of about 10 nm to about 100 nm, or in a range of about 20 nm to about 100 nm, or in a range of about 30 nm to about 100 nm, or in a range of about 40 nm to about 100 nm, or in a range of about 50 nm to about 100 nm.

In some embodiments, the polymeric particles (e.g., nanoparticles) exhibit a polydispersity index in a range of about 0.1 to about 1, e.g., in a range of about 0.1 to about 0.5.

In some embodiments, the solvent containing the particles (e.g., nanoparticles) can be filtered, e.g. via tangential flow filtration (TFF), to remove unwanted impurities and to obtain a retentate with a higher concentration of the particles (e.g., nanoparticles) in the solvent. In some embodiments, the mixture of the solvent and the particles (e.g., nanoparticles) can then be collected. In some embodiments, the collected particles (e.g., nanoparticles) can be lyophilized, and optionally stored for future use.

In another aspect, a process for precipitating a polymer from a polymer-containing fluid is disclosed, which includes establishing a flow of an anti-solvent through a porous medium, where the medium provides one or more precipitation surfaces. A polymer-containing fluid is introduced into the flowing anti-solvent so as to cause precipitation of at least a portion of the polymer on the one or more precipitation surfaces.

In some embodiments, the polymer contains one or more cyclic oligosaccharide moieties, such as α-cyclodextrin, β-cyclodextrin, and γ-cyclodextrin. The polymer can be any of a linear or branched polymer. The polymer can be any of polycation, a polyanion, or a non-ionic polymer.

In some embodiments, the polymer can comprise a covalently attached agent which may be a therapeutic agent or a prodrug thereof, a bioactive agent or a precursor thereof, an adjuvant, a diagnostic agent, a targeting ligand or a precursor thereof, or a reactive group.

In some embodiments, in the above process, the porous medium is disposed in the vessel and the anti-solvent flow is established through the porous medium before the polymer-containing fluid is introduced into the flowing anti-solvent. In other embodiments, the flow of the anti-solvent is established substantially concurrently with the introduction of the polymer-containing fluid into the anti-solvent.

In some embodiments, the porous medium can be a mesh formed, e.g., at least partially of a metal, a polymeric material (e.g. polytetrafluoroethylene), and/or a ceramic. In some embodiments, the porous medium comprises a plurality of insoluble supports, e.g., a powder of diatomaceous earth, that provide the precipitation surfaces. In some cases, the insoluble supports providing the precipitation surfaces have a size in a range of about 10 microns to about 1 millimeter, e.g., in a range of about 10 microns to about 500 microns, or in a range of about 10 microns to about 400 microns, or in a range of about 10 microns to about 300 microns, or in a range of about 10 microns to about 200 microns, or in a range of about 10 microns to about 100 microns.

In some embodiments, in the above process, the flow of the anti-solvent through the porous medium is continued for a time period after the introduction of the polymer-containing fluid into the flowing anti-solvent is terminated.

In a related aspect, the polymer-coated surfaces can be placed in contact with a liquid so as to strip at least a portion of the precipitated polymer from the precipitation surfaces so as to form a plurality of polymeric particles (e.g., nanoparticles) in the liquid, e.g., as a colloidal suspension. For example, after precipitation of at least a portion of the polymer on the precipitation surface(s), the flow of the anti-solvent and the polymer-containing fluid though the porous medium can be terminated. The anti-solvent can be drained, and a flow of the liquid suitable for stripping the precipitated polymer can be established through the porous medium so as to form a plurality of polymeric particles (e.g., nanoparticles).

In some embodiments, the polymeric particles (e.g., nanoparticles) can have an average size less than about 1 micron, e.g., in a range of about 10 nm to about 500 nm, or in a range of about 10 nm to about 400 nm, or in a range of about 10 nm to about 300 nm, or in a range of about 10 nm to about 200 nm, or in a range of about 10 nm to about 100 nm.

In some embodiments, the polymeric particles (e.g., nanoparticles) can exhibit a polydispersity index in a range of about 0.1 to about 1, e.g., in a range of about 0.1 to about 0.5.

In another aspect, a process for precipitating a polymer from a polymer-containing fluid is disclosed, which includes providing a vessel containing an anti-solvent and precipitation surfaces formed by a plurality of insoluble supports that are in contact with the anti-solvent. A polymer-containing fluid is introduced into the anti-solvent so as to cause precipitation of at least a portion of the polymer on the precipitation surfaces.

In some embodiments, the anti-solvent is agitated and the polymer-containing fluid is introduced into the agitated anti-solvent.

By way of example, the insoluble supports can comprise a powder of diatomaceous earth (Celite®). In some embodiments, the insoluble supports having the precipitation surfaces exhibit a size in a range of about 10 microns to about 1 millimeter, e.g., in a range of about 10 microns to about 500 microns, or in a range of about 10 microns to about 400 microns, or in a range of about 10 microns to about 300 microns, or in a range of about 10 microns to about 200 microns, or in a range of about 10 microns to about 200 microns.

In some embodiments, at least a portion of the insoluble supports are collected subsequent to the precipitation of the polymer on the insoluble supports' surfaces. In some embodiments, the polymer-coated insoluble supports can be separated from the anti-solvent, e.g., via centrifugation or filtration.

In another aspect, a process for generating polymeric particles (e.g., nanoparticles) is disclosed, which comprises providing a vessel housing a medium, where the medium provides one or more precipitation surfaces. A polymer-containing fluid and an anti-solvent are introduced into the vessel so as to cause precipitation of at least a portion of the polymer on at least one of the precipitation surfaces. The precipitated polymer is then placed in contact with a liquid to remove at least a portion of the precipitated polymer from the precipitation surface so as to form a plurality of polymeric particles (e.g., nanoparticles).

In some embodiments of the above process for generating polymeric particles (e.g., nanoparticles), the polymer can contain one or more cyclic oligosaccharide moieties, such as α-cyclodextrin, β-cyclodextrin, and γ-cyclodextrin. The polymer can be any of a linear or branched polymer.

In some embodiments of the above process for generating polymeric particles (e.g., nanoparticles), a recirculating flow of the anti-solvent is established through the vessel and the polymer-containing fluid is introduced into the flowing anti-solvent.

In some embodiments of the above process for generating polymeric particles (e.g., nanoparticles), the medium is porous. By way of example, the medium can comprise a mesh formed at least partially, e.g., of a metal, a polymeric material or a ceramic. In some embodiments, the medium can comprise a plurality of insoluble supports, e.g., a powder of diatomaceous earth, that provide the precipitation surfaces. In some embodiments, the insoluble supports exhibit a size less than about 1 micron, e.g., less than about 500 nm, or less than about 200 nm, or less than about 100 nm, or less than about 50 nm. In some embodiments, the particles providing the precipitation surfaces comprise at least about 10%, or at least about 30%, or at least about 40%, or at least about 50%, or at least about 60%, or at least about 70%, or at least about 80%, or at least about 90% of the volume of the vessel. In many embodiments, the medium is preferably inert to any of the anti-solvent, the polymer-containing fluid and the polymers.

In some embodiments of the above process for generating polymeric particles (e.g., nanoparticles), the polymer comprises a therapeutic agent covalently attached thereto, such as an anti-cancer agent, an anti-inflammatory agent, or a cardiovascular active agent.

In some embodiments of the above process for generating polymeric particles (e.g., nanoparticles), the polymer comprises a bioactive agent, such as a diagnostic agent or an adjuvant.

In some embodiments of the above process for generating polymeric particles (e.g., nanoparticles), the polymer-containing fluid comprises any of acetone, ether, alcohol, tetrahydrofuran, 2-pyrrolidone, N-Methyl-2-pyrrolidone (NMP), dimethylformamide (DMF), dimethylacetamide (DMA), methyl acetate, ethyl formate, methyl ethyl ketone (MEK), methyl isobutyl ketone (MIBK), methyl propyl ketone, isopropyl ketone, isopropyl acetate, acetonitrile (MeCN), dimethyl sulfoxide (DMSO), or a combination thereof.

In some embodiments of the above process for generating polymeric particles (e.g., nanoparticles), the anti-solvent comprises any of an organic solvent or a mixture of two or more organic solvents. By way of example, the anti-solvent can comprise any of methanol, ethanol, acetone, n-propanol, isopropanol, n-butanol, and ethyl ether.

In another aspect, a mixture of the particles (e.g., nanoparticles) and the liquid utilized to form the particles (e.g., nanoparticles) from the precipitated polymer (e.g., a colloidal suspension) can be filtered, e.g., via tangential flow filtration, to purify and concentrate the mixture. The particles (e.g., nanoparticles) can then be optionally lyophilized and stored.

In another aspect, a plurality of polymeric particles (e.g., nanoparticles) is produced according to the above processes for fabricating polymeric particles (e.g., nanoparticles). In some embodiments, the plurality of particles (e.g., nanoparticles) includes at least about 100 grams, at least about 200 grams, at least about 300 grams, at least about 400 gram, at least about 500 grams, or at least about 1 kilogram of the particles (e.g., nanoparticles). In some embodiments, the particles (e.g., nanoparticles) exhibit an average particle size less than about 1 micron, or less than about 500 nm, or less than about 400 nm, or less than about 300 nm, or less than about 200 nm, or less than about 100 nm, or less than about 50 nm, or less than about 20 nm, or less than about 10 nm, e.g., in a range of about 5 nm to about 100 nm. In some embodiments, the particles (e.g., nanoparticles) exhibit a polydispersity index in a range of about 0.1 to about 1, e.g., in a range of about 0.1 to about 0.5.

In another aspect, the particles (e.g., nanoparticles) having a polydispersity index in a range of about 0.1 to about 1 are generated by using the above processes.

In a related aspect, a population of polymeric particles (e.g., nanoparticles) having a cyclic oligosaccharide (e.g., cyclodextrin) as at least one polymeric component is generated by using the above processes. In some embodiments, the polymer is covalently attached to a therapeutic agent. For example, the therapeutic agent can be an anti-cancer agent. In some embodiments, the anti-cancer agent is an alkylating agent, a vascular disrupting agent, a microtubule targeting agent, a mitotic inhibitor, a topoisomerase inhibitor, an anti-angiogenic agent or an anti-metabolite. In some embodiments, the anti-cancer agent is a taxane (e.g., paclitaxel, docetaxel, larotaxel or cabazitaxel). In some embodiments, the anti-cancer agent is an anthracycline (e.g., doxorubicin). In some embodiments, the anti-cancer agent is a platinum-based agent (e.g., cisplatin). In some embodiments, the anti-cancer agent is a pyrimidine analog (e.g., gemcitabine). In some embodiments, the anti-cancer agent is a taxane (e.g., paclitaxel, docetaxel, larotaxel, or cabazitaxel).

In another aspect, a pharmaceutically acceptable preparation of polymeric particles (e.g., nanoparticles) is generated by using the above processes. In an embodiment, the pharmaceutically acceptable preparation includes, e.g., a pharmaceutically acceptable excipient, e.g., a lyoprotectant. In an embodiment, the pharmaceutically acceptable preparation is a liquid or a lyophilized powder.

In an embodiment, a process described herein further includes dividing a first pharmaceutically acceptable preparation made by a process described herein into smaller aliquots and optionally packaging a plurality of aliquots into gas and/or liquid tight containers.

In an embodiment, a process described herein further includes testing the product (e.g., the preparation of the particles (e.g., nanoparticles)) to determine if it meets a preselected reference range or value, e.g., a range or value for concentration, average particle size, purity, polydispersity index, or other particle properties described herein.

In another aspect, a system for precipitating a polymer from a polymer-containing fluid is disclosed, which includes a vessel for containing an anti-solvent, where the vessel has at least one input port and an output port. The system further includes a medium housed in said vessel, where the medium provides one or more precipitation surfaces. A pump in communication with the vessel is configured to cause a flow of the anti-solvent through the vessel so that the precipitation surfaces are in at least partial contact with said flowing anti-solvent. The input port is configured to allow introduction of a polymer-containing fluid into the flowing anti-solvent so as to cause precipitation of at least a portion of the polymer on the one or more precipitation surfaces.

In some embodiments, the above system further includes a fluid passage extending between the output port and the input port of the vessel. The pump can be in communication with the fluid passage to establish a liquid recirculation loop through the vessel.

In some embodiments, the above system can further include a recovery port in communication with the fluid passage to drain any of the anti-solvent and the polymer-containing fluid from the recirculation loop.

In some embodiments, the above system includes a reservoir for storing the anti-solvent, where the reservoir is in fluid communication with the vessel to allow the introduction of the anti-solvent into the vessel.

In some embodiments, the precipitation surfaces are provided by a porous medium (e.g., within a vessel). By way of example, the porous medium can be a mesh, e.g. a mesh formed at least partly of a metal (such as stainless steel, silver and gold), a polymeric material (such as PTFE) or a ceramic material.

In some embodiments, the porous medium comprises a plurality of insoluble supports that provide the precipitation surfaces. In some cases, the insoluble supports providing the precipitation surfaces comprise a powder of diatomaceous earth.

In some embodiments, the volume of the insoluble supports providing the precipitation surfaces comprises at least about 10%, or at least about 30%, or at least about 40%, or at least about 50%, or at least about 60%, or at least about 70%, or at least about 80%, or at least about 90% of the volume of the vessel.

In some embodiments, in the above system, the vessel contains a quantity of the anti-solvent. In some cases, the pump can be configured to generate the flow of the anti-solvent through the vessel at a desired flow rate.

In some embodiments, a method described herein, e.g., a method of forming precipitation surfaces on which precipitation of at least a portion of a polymer (e.g., a cyclodextrin containing polymer) has occurred, can further include drying the precipitation surfaces. In some embodiments, the method described herein includes collecting the precipitation surfaces, e.g., before drying, for example using filtration.

In an aspect, described herein is a product produced by the process of any method described herein (e.g., a method of making a precipitation surface on which precipitation of at least a portion of a polymer (e.g., a cyclodextrin containing polymer) described herein has occurred).

In an aspect, described herein is a preparation comprising a polymer precipitated onto an insoluble support, wherein said polymer is a cyclodextrin containing polymer. In an embodiment, the polymer comprises one or more therapeutic agents covalently attached thereto. In an embodiment, the preparation contains less than 50, 40, 30, 20, 10, 5, or 1% by weight solvent. In an embodiment, the solvent is DMF, DMSO, or IPA (isopropyl alcohol). In an embodiment, the preparation comprising the insoluble support comprises a plurality of particulate solids (e.g., Celite). In an embodiment, the preparation comprising said polymer precipitated onto an insoluble support is disposed in the vessel in which aid precipitation occurred. In an embodiment, the preparation comprising polymer precipitated onto an insoluble support is not disposed in the same vessel in which aid precipitation occurred.

In an aspect, described herein is a method of making a particle (e.g., a particle described herein). The method comprise a) providing a preparation comprising a preparation of solid supports having a polymer (e.g., a cyclodextrin containing polymer) precipitated thereon; and b) placing said preparation in contact with a stripping liquid to strip at least a portion of said precipitated polymer from the precipitation surfaces so as to form a plurality of polymeric particles (e.g., nanoparticles) in said stripping liquid. In an embodiment, at least 1, 2, 3, 5, or 10 hours, or at least 1, 2, 5, 10, 20, or 30 days, elapse between the precipitation of polymer on said precipitation surfaces and providing said preparation. In an embodiment, less than 1, 2, 3, 5, or hours, or less than 1, 2, 5, 10, 20, or 30 days, elapse between the precipitation of polymer on said precipitation surfaces and step b.

Further understanding of the invention can be obtained by reference to the following detailed description in conjunction with the associated drawings, which are described briefly below.

BRIEF DESCRIPTION OF THE DRAWINGS

FIG. 5A is a schematic diagram showing an assembly of comonomer precursors cyclodextrin moieties, therapeutic agents, and/or targeting ligands and FIG. 5B is a schematic diagram showing an assembly of comonomer precursors, cyclodextrin moieties, therapeutic agents, and/or targeting ligands. The comonomer A precursor, cyclodextrin moiety, therapeutic agent and optional targeting ligand are as defined in FIG. 5A.

DETAILED DESCRIPTION

Figure 1:
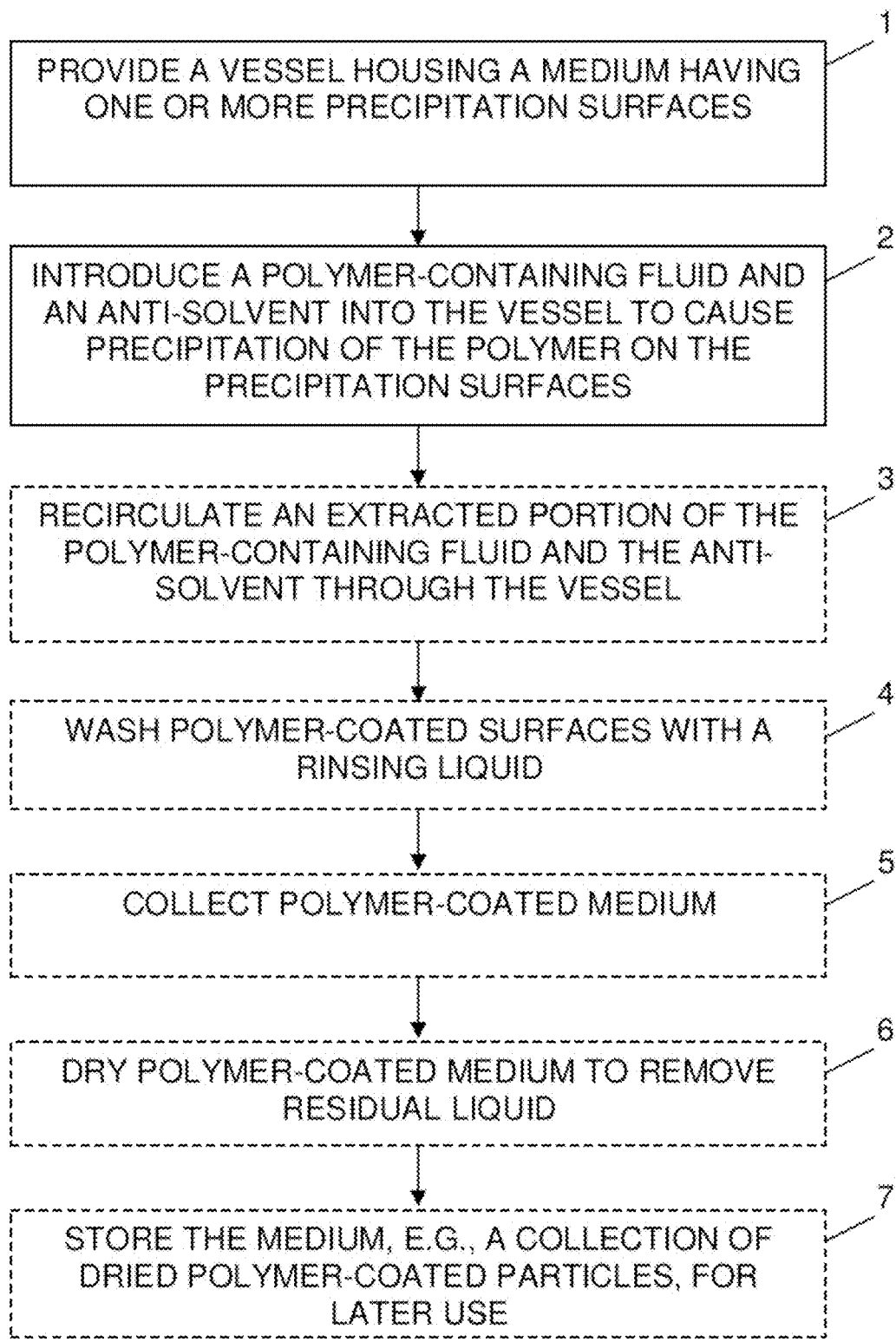
FIG. 1 is a flow chart depicting various steps in an embodiment of a process according to the teachings of the invention.

The present application relates generally to methods, systems and devices for precipitating a polymer (and in some cases a plurality of polymers), e.g., a conjugate containing a cyclodextrin-containing polymer and a linked agent (i.e., an agent covalently bound thereto), "a CDP-linked agent conjugate," from a fluid carrying the polymer. For example, the methods, systems and devices of the invention can be utilized to cause precipitation of a polymer from a polymer solution, dispersion or mixed solution/dispersion. As discussed in more detail below, in some embodiments of the invention the polymer-carrying fluid is circulated through a porous medium, e.g., a mesh, to cause precipitation of at least a portion of the polymer on surfaces of the medium. In some embodiments, the polymer-carrying fluid is introduced into a vessel housing a plurality of insoluble supports providing precipitation surfaces to cause the polymer in the fluid to precipitate on those surfaces. In some embodiments, the precipitated polymer can be subjected to further processing steps to generate, e.g., a plurality of polymeric particles (e.g., nanoparticles). In other embodiments, the polymer precipitation can be used to separate polymers having different molecular weights, e.g., via selective precipitation of a polymer whose molecular weight lies in a desired range. In the embodiments discussed below, various aspects of the invention will be discussed primarily with reference to polymers having oligosaccharide moieties, such as cyclodextrin moieties. It should, however, be understood that the teachings of the invention can also be applied to other types of polymers.

DEFINITIONS

The following definitions are provided for a variety of terms and phrases utilized herein:

Precipitate

The term "precipitate," as used herein, refers to the separation of a solid substance (e.g., a polymer) from a mixture (e.g., a solution, dispersion, or a mixed solution/dispersion) of that substance and a liquid.

Precipitation

The term "precipitation" refers to the act of precipitating.

Precipitation Surface:

The term "precipitation surface," as used herein, refers to a surface on which a substance, such as a polymer, can precipitate.

Polymer-Containing Fluid

The term "polymer-containing fluid," as used herein, refers to a fluid in which a polymer is disposed, e.g., in the form of a polymer solution, dispersion, or mixed solution/dispersion.

Anti-Solvent:

The term "anti-solvent" as used herein refers to a liquid, or a mixture of liquids, which is incapable of dissolving any appreciable concentration (e.g., a concentration equal to or greater than about 0.1% at room temperature) of a polymer of interest.

Cyclic Oligosaccharide Moiety

A cyclic carbohydrate containing from two to ten sugar molecules (e.g., glucose) linked to one another in a ring structure.

Insoluble Support:

The term "insoluble support," as used herein, refers to a solid such as a particulate solid, which is not soluble in any of the liquids and solvents used in the methods described herein. Exemplary liquids and solvents include "anti-solvent" as defined above, and solvents and liquids that include a polymer described herein such as water and DMF. A particulate solid, although solid, may also be porous.

Porous

The term "porous," as used herein, for describing a medium indicates that the medium includes a plurality of openings, typically small openings (pores) that allow passage of a fluid, e.g., a liquid or a gas, therethrough.

Polymer Solution:

The term "polymer solution" as used herein refers to a solution comprising one or more polymers dissolved in a liquid solvent, which is herein also referred to as process solvent. The polymer(s) are typically sufficiently soluble in the solvent such that a concentration of at least about 0.1 percent by weight, and preferably at least about 0.2 percent by weight, of the polymer(s) can be dissolved in the solvent at room temperature. The polymer solution can also include a variety of additives, such as therapeutic and/or imaging agents covalently attached thereto or other supplemental additives useful for the production and/or subsequent use of the particles (e.g., nanoparticles).

Nanoparticle:

The term "nanoparticle" is used herein to refer to a material structure whose size in any dimension (e.g., x, y, and z Cartesian dimensions) is less than about 1 micrometer (micron), e.g., less than about 500 nm or less than about 200 nm or less than about 100 nm, and greater than about 5 nm. A nanoparticle can have a variety of geometrical shapes, e.g., spherical, ellipsoidal, etc. The term "nanoparticles" is used as the plural of the term "nanoparticle."

Average Particle Size:

The term "average particle size," as used herein with respect to polymeric particles, is a length dimension which is designated herein as Z average or $Z_{ave}$, and as used herein refers to the intensity weighted mean hydrodynamic size of an ensemble collection of particles measured by dynamic light scattering (DLS). The Z average is derived from a Cumulants analysis of a measured autocorrelation curve, wherein a single particle size is assumed and a single exponential fit is applied to the autocorrelation function. The autocorrelation function ($G(\tau)$) is defined as follows:

$$G(\tau) = \langle I(t) \cdot I(t+\tau) \rangle = A[1 + B\exp(-2\Gamma\tau)] \quad \text{Eq. (3)}$$

wherein, $$\Gamma = Dq^2 \quad \text{Eq. (4)}$$

$$q = \frac{4\pi\tilde{n}}{\lambda_0}\sin\left(\frac{\theta}{2}\right) \quad \text{Eq. (5)}$$

$$D = \frac{kT}{6\pi\mu R_H}, \quad \text{Eq. (6)}$$

wherein,

I represents the light scattering intensity,
t represents an initial time,
$\tau$ represents the delay time, A represents an amplitude (or intercept) of the autocorrelation function,
B represents the baseline,
D represents the diffusion coefficient,
q represents the scattering vector,
k represents the Boltzmann constant,
$\lambda_0$ represents the vacuum wavelength of a laser source employed for the light scattering measurements,
ñ represents the index of refraction of the medium,
θ represents the scattering angle,
T represents the absolute temperature (Kelvin),
μ represents the viscosity of the medium, and
$R_H$ represents the hydrodynamic radius.

In the Cumulants analysis, the exponential fitting expression of Eq. (3) is expanded as indicated below as expression $y(\tau)$ in Eq. (7) to account for polydispersity, which is defined in more detail below, or peak broadening, $$y(\tau) = \frac{1}{2}\ln[G(\tau) - A] = \quad \text{Eq. (7)}$$

$$\frac{1}{2}\ln[AB\exp(-2\Gamma\tau + \mu_2\tau^2)] \cong \frac{1}{2}\ln[AB] - \langle\Gamma\rangle\tau + \frac{\mu_2}{2}\tau^2 =$$

$$a_0 - a_1\tau + a_2\tau^2$$

wherein $\mu_2$ is a fitting parameter and the other parameters are defined above.

The dynamic light scattering data can be fit to the above expression (Eq. (7)) to obtain values of the parameters $a_0$, $a_1$, and $a_2$. The first Cumulant moment ($a_1$) can be utilized to obtain $Z_{ave}$ as follows:

$$Z_{ave} = \frac{1}{a_1}\frac{kT}{3\pi\mu}\left[\frac{4\pi\tilde{n}}{\lambda_0}\sin\left(\frac{\theta}{2}\right)\right]^2 \quad \text{Eq. (8)}$$

wherein the parameters are defined above.

The first Cumulant moment ($a_1$) and the second Cumulant moment ($a_2$) can be used to calculate another parameter known as polydispersity index (PdI), which is discussed in more detail below, as follows:

$$PdI = \frac{2a_2}{a_1^2} \quad \text{Eq. (9)}$$

Polydispersity Index:

The term "polydispersity index" is used herein as a measure of the size distribution of an ensemble of particles, e.g., nanoparticles. The polydispersity index is calculated as indicated in the above Eq. (9) based on dynamic light scattering measurements.

Lyoprotectant:

The term "lyoprotectant," as used herein refers to a substance present in a lyophilized preparation. Typically it is present prior to the lyophilization process and persists in the resulting lyophilized preparation. It can be used to protect nanoparticles, liposomes, and/or micelles during lyophilization, for example to reduce or prevent aggregation, particle collapse and/or other types of damage. The lyoprotectant can be used for protection during a drying process, during a freezing process, or during both drying and the freezing processes. In some embodiments, the lyoprotectant is a cryoprotectant, which can provide protection from a freezing process.

Retentate:

The term "retentate" is used herein consistent with its common meaning in the art to refer to at least one component of a feed material (e.g., a portion of a feed fluid) that is separated from the rest of the feed material via filtration and is retained, e.g., for use or further processing.

Permeate:

The term "permeate" is used herein interchangeably with the term "filtrate" and consistent with its common meaning in the art to refer to at least one component of a feed material (e.g., a portion of a feed fluid) that is separated from the retentate, e.g., by passing through a membrane with a certain molecular weight cutoff (MWCO).

The term "about" or "approximately" means within an acceptable error range for the particular value as determined by one of ordinary skill in the art, which will depend in part on how the value is measured or determined—e.g., the limitations of the measurement system, or the degree of precision required for a particular purpose. For example, "about" can mean within 1 or more than 1 standard deviations, as per the practice in the art. Alternatively, "about" can mean a range of up to 20%, preferably up to 10%, more preferably up to 5%, and more preferably still up to 1% of a given value. Where particular values are described in the application and claims, unless otherwise stated, the term "about" meaning within an acceptable error range for the particular value should be assumed.

The term "inert" as used herein refers to chemical inactivity. For example, a medium that is inert to a solvent or a solution is a medium that is stable and chemically unaffected when exposed to that solvent or solution.

With reference to flow chart of FIG. 1, in one embodiment of a process according to the teachings of the invention, a vessel is provided that houses a medium having one or more precipitation surfaces (Step 1). A fluid containing a polymer, which can include one or more cyclic oligosaccharide moieties, and an anti-solvent are introduced into the vessel so as to cause precipitation of at least a portion of the polymer on at least one of the precipitation surfaces of the medium housed in the vessel (Step 2). By way of example, the polymer-containing fluid can be any of a polymer solution, a polymer dispersion, or a mixed polymer solution/dispersion.

In some embodiments, the process optionally includes extracting at least a portion of the polymer-containing fluid and the anti-solvent from the vessel and recirculating the mixture through the vessel to induce further precipitation of the polymer on one or more of the precipitations surfaces of the medium housed in the vessel (Step 3).

In many embodiments, the medium providing the precipitation surfaces is porous and can be implemented in a variety of ways. For example, the medium can comprise a mesh or a foam providing a network of pores through which a fluid, e.g., a mixture of the polymer-containing polymer and the anti-solvent, can pass. In some implementations, the mesh can be formed at least partially (and in many cases entirely) of a metal, such as stainless steel, gold, silver, or other suitable metals. In other implementations, the mesh can be formed at least partially of a ceramic, e.g., silicon carbide or zirconia (such as that manufactured by Selee Corp, Hendersonville, N.C.). In some other implementations, the mesh can be at least partially formed of a polymeric material, e.g. polytetrafluoroethylene (PTFE).

In some embodiments, the medium providing precipitation surfaces can be formed as a plurality of insoluble supports whose surfaces provide the precipitation surfaces on which the polymer can precipitate. In some embodiments, the insoluble supports providing the precipitation surfaces can have a size in a range of about 10 micrometers (microns) to about 1 millimeter. For example, the particles forming the precipitation surfaces can have a size in a range of about 10 microns to about 500 microns, or in a range of about 10 microns to about 400 microns, or in a range of about 10 microns to about 300 microns, or in a range of about 10 microns to about 200 microns, or in a range of about 10 microns to about 100 microns, or in a range of about 10 microns to about 50 microns.

In some embodiments, the volume of the insoluble supports providing the precipitation surfaces comprises a significant fraction of the volume of the vessel housing those particles. For example, the volume of the particles can be at least about 30%, or at least about 40%, or at least about 50%, or at least about 60%, or at least about 70%, or at least about 80%, or at least about 90%, of the volume of the vessel.

In the above process, the medium is preferably inert to any of the anti-solvent, the polymer-containing fluid and the polymer.

In many embodiments, the polymer is immiscible, or at least exhibits low miscibility in the anti-solvent. For example, in some embodiments, the miscibility of the polymer in the anti-solvent is less than about 0.1% at room temperature (e.g., at 25° C.). By way of example, in some embodiments the polymer-containing fluid comprises a polymer solution generated by dissolving a quantity of the polymer in a process solvent, where the process solvent is miscible, or at least partially miscible, with the anti-solvent.

Without being limited to any particular theory, as the polymer-containing fluid flows into the vessel and comes into contact with the anti-solvent, the fluid can diffuse into the anti-solvent due to its miscibility with the anti-solvent. In contrast, the polymer is not miscible, or exhibit low miscibility, with the anti-solvent, and hence precipitates (aggregates) on the precipitation surfaces of the medium (e.g., a mesh or plurality of insoluble supports) disposed in the vessel. Such precipitation of the polymer on the precipitation surfaces continues as fresh polymer-containing fluid is introduced into the vessel. As noted above, in some embodiments, a portion of the liquid in the vessel can be extracted and recirculated back to the vessel for precipitating at least a portion of the polymer contained in the extracted liquid on the precipitation surfaces.

Referring again to the flow chart of FIG. 1, in some embodiments, after the introduction of the polymer-containing fluid into the vessel is terminated, the precipitation surfaces, which can be partially or completely coated with the precipitated polymer, are optionally washed (Step 4) using the same anti-solvent employed during the precipitation phase or a different liquid, which is preferably selected such that the polymer is immiscible or exhibits low miscibility therein (e.g., a miscibility less than about 0.1% at room temperature).

With continued reference to the flow chart of FIG. 1, in some embodiments, the medium coated with precipitated polymer can be optionally collected, e.g., via filtration (Step 5) or sedimentation, e.g., as filter cake. For example, when the medium providing the precipitation surfaces comprises a plurality of insoluble supports, e.g., a powder of diatomaceous earth, a mixture of the polymer-coated insoluble supports and the liquid in the vessel can be filtered to remove the liquid, thereby separating the polymer-coated insoluble supports as a retentate. Alternatively, the polymer-coated insoluble supports can be separated from the liquid via centrifugation.

In some embodiments, the collected polymer-coated insoluble supports can be optionally dried, e.g., by utilizing a vacuum or a flow of a gas such as dry nitrogen, to remove at least a portion of residual liquid present in the particles (Step 6). The dried polymer-coated insoluble supports can then be stored, e.g., refrigerated or frozen for later use (Step 7). For example, as discussed in more detail below, in some embodiments the dried polymer-coated insoluble supports can be subsequently exposed to a liquid, such as water, to strip away portions of precipitated polymer as a plurality of polymeric particles (e.g., nanoparticles).

The above processes for precipitating a polymer from a polymer-containing fluid provide a number of advantages. For example, the precipitated polymer can be in the form of thin strands or a film with a large surface area, which can facilitate its exposure to rinsing solvents. In addition, the precipitated polymer can be readily dried, e.g., via introduction of a gas such as nitrogen into the vessel, which in turn can reduce, or eliminate, the need for diafiltration, e.g., tangential flow filtration, and concentration steps. Another advantage of the processes according to the teachings of the invention is that they can be temporarily paused and subsequently resumed (e.g., the vessel can be stored for later processing).

Figure 2:
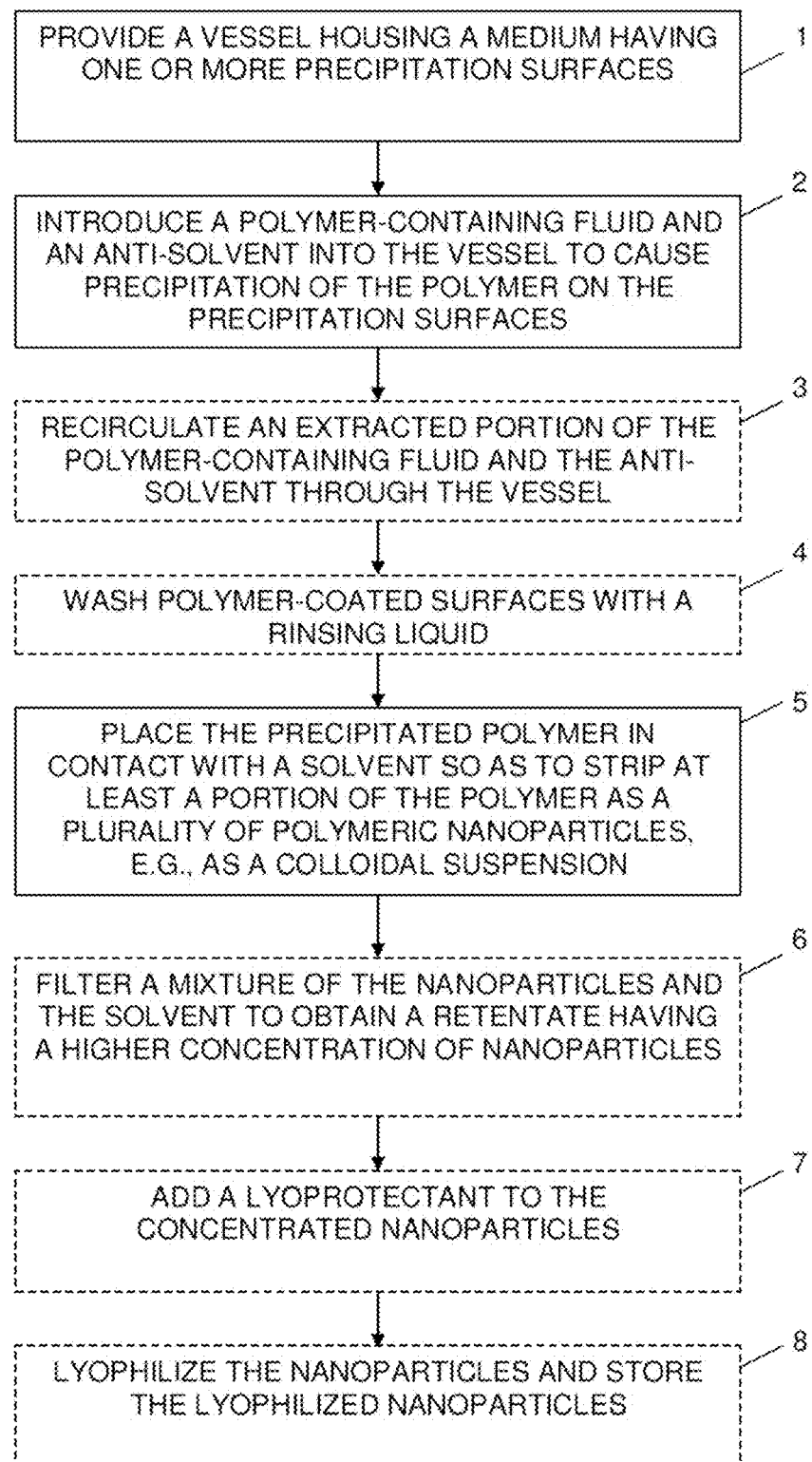
FIG. 2 is a flow chart depicting various steps in another embodiment of a process according to the teachings of the invention.

FIG. 2 is a flow chart depicting various steps in an embodiment of a process according to the teachings of the invention for generating polymeric particles (e.g., nanoparticles). In steps 1-2, a polymer, e.g., a polymer having a plurality of cyclic oligosaccharide moieties, contained in a fluid, e.g., as a polymer solution, dispersion, or mixed solution/dispersion, is precipitated on precipitation surfaces of a medium, e.g., a powder of diatomaceous earth, in a manner discussed above. As noted above, in some embodiments a recirculating flow of the anti-solvent and the polymer-containing fluid can be established through the vessel (step 3), e.g., to further induce precipitation of the polymer on the surfaces of the medium. The polymer coated surfaces can be optionally washed (step 4) with a rinsing liquid, e.g., the same anti-solvent used during the precipitation process or a different anti-solvent.

The rinsing liquid can then be drained from the vessel and the polymer-coated precipitation surfaces can be placed in contact with a liquid (herein also referred to as a "solvent" or "stripping solvent"), e.g., a polar solvent, so as to strip at least a portion of the precipitated polymer from the precipitation surfaces so as to form a plurality of polymeric particles (e.g., nanoparticles), e.g., as a colloidal suspension, in the solvent (Step 5). For example, in some embodiments in which the precipitated polymer contains a plurality of cyclodextrin moieties, the exposure of the precipitated polymer to water can result in spontaneous formation of a plurality of polymeric particles (e.g., nanoparticles), e.g., as a colloidal suspension in water.

In some embodiments, the liquid for effecting the formation of polymeric particles (e.g., nanoparticles), e.g., via stripping precipitated polymer from the precipitation surfaces, can be water, an aqueous solution, or an organic solution. In some embodiments, the stripping solvent can be water containing salt(s), wetting agent(s), pH adjusted (e.g., to a pH of 3, 4, 5, 6, 7, 8, or 9) or other additives.

In some embodiments, the mixture of the polymeric particles (e.g., nanoparticles) and the liquid, e.g., a colloidal suspension of the particles (e.g., nanoparticles) in water, can be optionally filtered (Step 6) to purify or to obtain a retentate having a higher concentration of the polymeric particles (e.g., nanoparticles). By way of example, a mixture of the polymeric particles (e.g., nanoparticles) and the liquid can be subjected to a tangential flow filtration (TFF) to provide, e.g., a concentrated suspension of the particles (e.g., nanoparticles).

With continued reference to the flow chart of FIG. 2, in this exemplary embodiment, a lyoprotectant can be optionally added to the concentrated suspension of the particles (e.g., nanoparticles) to protect the particles (e.g., nanoparticles) from damage and/or to retard permanent aggregation of the particles (e.g., nanoparticles) when subsequently subjected to lyophilization (Step 7). The lyoprotectant can also facilitate the resuspension of the particles (e.g., nanoparticles). Some examples of suitable lyoprotectants include, without limitation, conventional lyoprotectants, e.g., mannitol, lactose, trehalose, sucrose, or a derivatized cyclic oligosaccharide, e.g., a derivatized cyclodextrin, e.g., 2 hydroxy propyl-β cyclodextrin, e.g., partially etherified cyclodextrins (e.g., partially etherified β cyclodextrins) disclosed in U.S. Pat. No. 6,407,079, the contents of which are incorporated herein by this reference.

The concentrated suspension containing the particles (e.g., nanoparticles) and the lyoprotectant can then be optionally stored in one or more suitable vessels, e.g., vials, and lyophilized in a manner known in the art (Step 8). The vials can then be sealed to protect the particles (e.g., nanoparticles) from contamination. By way of example, the lyophilization can be achieved by initially freezing the concentrated suspension followed by a primary drying phase in which the ambient pressure to which the concentrated suspension is subjected is lowered (e.g. to a few millibars) while supplying enough heat to cause sublimation of bulk frozen liquid, mostly frozen water in many implementations at this stage. In a secondary drying phase, bound liquid (e.g., water molecules bound to product or lyoprotectant), if any, can be removed by raising the temperature above that in the primary. In some embodiments, upon completion of the freeze-drying process, an inert gas, such as nitrogen, can be introduced into the vessel containing the lyophilized particles (e.g., nanoparticles) prior to sealing the vessel.

In some embodiments, the polymeric particles (e.g., nanoparticles) made according to the present invention can exhibit an average particle size equal to or less than about 1 micron. For example, the polymeric nanoparticle can exhibit an average particle size equal or less than about 500 nm. For example, the polymeric nanoparticles can exhibit an average particle size in a range of about 5 nm to about 500 nm, or in a range of about 10 nm to about 500 nm, or in a range of about 20 nm to about 500 nm, or in a range of about 30 nm to about 500 nm, or in a range of about 40 nm to about 500 nm, or in a range of about 50 nm to about 500 nm.

In some embodiments, the polymeric nanoparticles can exhibit an average particle size equal to or less than about 400 nm. For example, the polymeric nanoparticles can exhibit an average particle size in a range of about 5 nm to about 400 nm, or in a range of about 10 nm to about 400 nm, or in a range of about 20 nm to about 400 nm, or in a range of about 30 nm to about 400 nm, or in a range of about 40 nm to about 400 nm, in a range of about 50 nm to about 400 nm.

In some embodiments, the polymeric nanoparticles can exhibit an average particle size equal to or less than about 300 nm. For example, the polymeric nanoparticles can exhibit an average particle size in range of about 5 nm to about 300 nm, or in a range of about 10 nm to about 300 nm, or in a range of about 20 nm to about 300 nm, or in a range of about 30 nm to about 300 nm, or in a range of about 40 nm to about 300 nm, or in a range of about 50 nm to about 300 nm.

In some embodiments, the polymeric nanoparticles can exhibit an average particle size equal to or less than about 200 nm. For example, the polymeric nanoparticles can exhibit an average particle size in a range of about 5 nm to about 200 nm, or in a range of about 10 nm to about 200 nm, or in a range of 20 nm to about 200 nm, or in a range of about 30 nm to about 200 nm, or in a range of about 40 nm to about 200 nm, or in a range of about 50 nm to about 200 nm.

In some embodiments, the polymeric nanoparticles can exhibit an average particle size equal to or less than about 100 nm. For example, the polymeric nanoparticles can exhibit an average particle size in a range of about of 5 nm to about 100 nm, or in a range of about 10 nm to about 100 nm, or in a range of about 20 nm to about 100 nm, or in a range of about 30 nm to about 100 nm, or in a range of about 40 nm to about 100 nm, or in a range of about 50 nm to about 100 nm.

Figure 3:
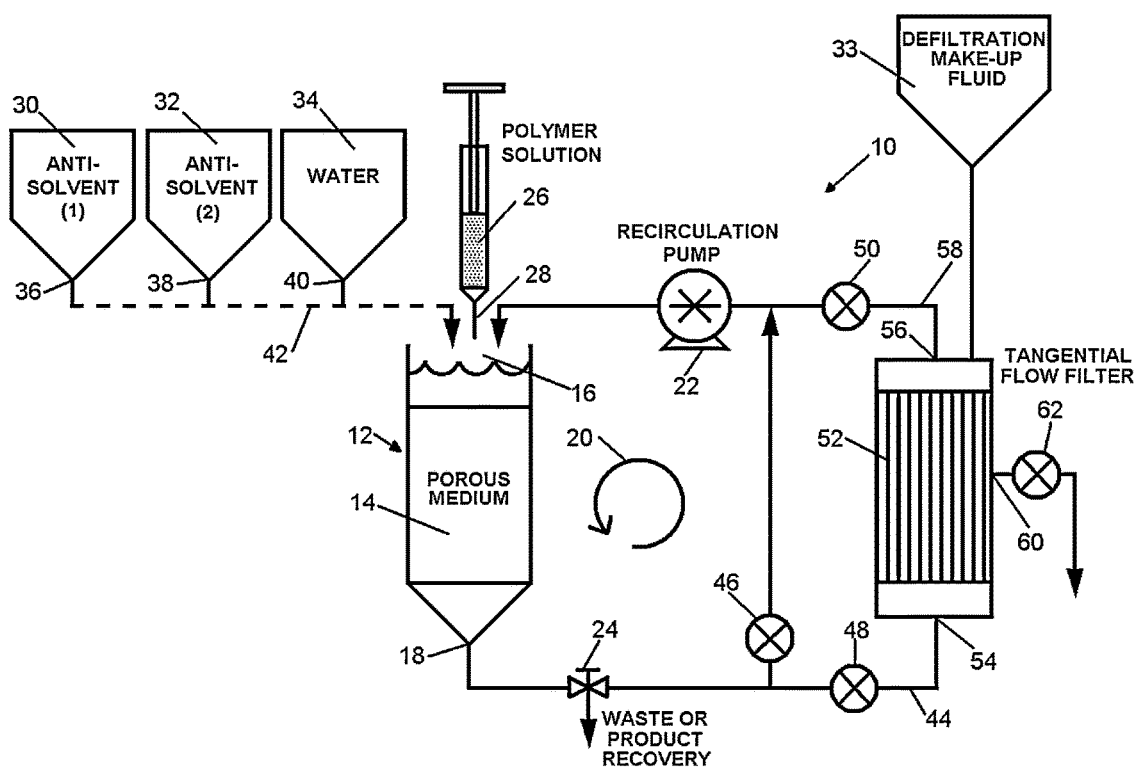
FIG. 3 is a schematic diagram of an embodiment of a system for generating particles (e.g., nanoparticles) according to the teachings of the invention.

The methods for precipitating a polymer from a polymer-containing fluid and/or generating polymeric particles (e.g., nanoparticles) can be implemented in a variety of ways. By way of example, FIG. 3 schematically depicts a system 10 according to an embodiment of the invention, which includes a vessel 12 for housing a medium 14 that provides a plurality of precipitation surfaces. In this implementation, the medium 14 comprises a metallic mesh (e.g., a stainless steel mesh) that includes pores through which a liquid can flow. In other embodiments, the medium 14 can comprise, e.g., a plurality of insoluble supports.

The vessel 12 includes an input port 16 for receiving a fluid and an output port 18 through which a fluid contained in the vessel can exit the vessel. The input and output ports 16 and 18 are in fluid communication via a loop fluid passage 20. In this implementation, a recirculation pump (e.g., peristaltic or gear pump) 22 facilitates the flow of a fluid from the output port 18 of the vessel 12 to its input port 16. Further, a valve 24 disposed in the fluid loop 20 allows recovery of a product and/or waste from the vessel 12.

The system 10 further includes a reservoir 26 for storing a polymer-containing fluid, e.g., a fluid containing an oligosaccharide polymer, e.g., a cyclic oligosaccharide polymer such as cyclodextrin. The reservoir 26 includes an output port 28 that is in fluid communication with the input port 16 of the vessel 12 to allow the flow of the polymer-containing fluid into the vessel 12.

The exemplary system 10 further includes three additional reservoirs 30, 32, and 34. In this implementation, the reservoirs 30 and 32 store two different types of anti-solvents, and the reservoir 34 stores water (e.g., de-ionized water). Each of the reservoirs 30, 32, and 34 is in fluid communication with the input port 16 of the vessel 12 via its respective output port (shown here as output ports 36, 38, and 40) and a fluid passage 42. It should be understood that the number of reservoirs is not restricted to those disclosed herein and can be more or less than that illustrated. For example, in some embodiments, only two reservoirs may be employed, one for storing a polymer-containing fluid and the other for storing an anti-solvent.

In this exemplary implementation, the system 10 can further include a filtration module 52(e.g., a TFF module) that can be placed in fluid communication with vessel 12 for optional use, e.g., in concentrating a collection of polymeric particles (e.g., nanoparticles) generated in the vessel 12.

In some implementations, in use, the vessel 12 is initially filled, or at least partially filled, with a quantity of an anti-solvent, e.g., the anti-solvent stored in the reservoir 30, by establishing a flow of the anti-solvent from the anti-solvent reservoir to the vessel 12. The pump 22 is then activated to establish a recirculating flow of the anti-solvent through the vessel 12 through a recirculation loop 20. Once the recirculating flow of the anti-solvent is established, the polymer-containing fluid stored in the reservoir 26 is injected into the vessel 12 to come into contact with the flowing anti-solvent. In some implementations, a metering valve (not shown) at the output of the reservoir 26 is employed to control the rate of the flow of the polymer-containing fluid into the flowing anti-solvent.

As discussed above, the introduction of the polymer-containing fluid into the recirculating anti-solvent results in the precipitation of the polymer contained in the fluid onto the precipitation surfaces of the medium (a metallic mesh in this embodiment) that is disposed in the vessel 12.

After a desired amount of the polymer-containing fluid has been transferred to the vessel 12—typically after the exhaustion of the polymer-containing fluid that is stored in the reservoir 26—the fluid connection between the reservoir 26 and the vessel 12 can be terminated and the liquid contained in the reaction vessel and recirculating loop 20 (which can contain a mixture of the anti-solvent and the fluid in which the polymer was initially disposed) is drained via the valve 24.

Subsequently, the vessel 12 can be at least partially filled with the anti-solvent stored in the reservoir 32 (anti-solvent (2)) and the pump 22 can be activated to recirculate the anti-solvent through the reaction vessel 12. The recirculating anti-solvent can wash the polymer-coated precipitation surfaces to remove certain impurities that can be dissolved in the anti-solvent. The rinsing of the polymer-coated precipitation surfaces can continue for a desired time period after which the recirculation of the anti-solvent can be stopped, and the liquid in the reaction vessel and the recirculating loop can be drained, e.g., via the valve 24.

In some embodiments, after rinsing the polymer-coated surfaces the vessel 12 can be swept with dry nitrogen, or other suitable gas, to dry the bed and remove solvent residuals. The polymer-coated medium can be stored for later use, or alternatively it can be exposed to a solvent, such as water, to generate a plurality of particles (e.g., nanoparticles), as discussed below.

With continued reference to FIG. 3, in some embodiments, subsequent to the precipitation of the polymer on the precipitation surfaces of the medium and an optional rinsing step, a flow of water (typically deionized water) can be established between the reservoir 34 and the reaction vessel 12 via the fluid passage 42 to add water to the vessel 12, and the recirculating pump 22 is used to recirculate the water via the fluid loop 20 through the reaction vessel. As the water contacts the polymer-coated precipitation surfaces of the medium 14 it can strip at least a portion of the precipitated polymer from those surfaces as a plurality of polymeric particles (e.g., nanoparticles). The recirculation of water through the reaction vessel can be terminated after a desired portion (typically most or all) of the precipitated polymer has been converted into particles (e.g., nanoparticles) via contact with water.

The suspension of the particles (e.g., nanoparticles) in water can be optionally subjected to a filtration step for purification and concentration. The concentrated suspension of the particles (e.g., nanoparticles) can be optionally lyophilized and stored for later use.

For example, the aqueous suspension of the polymeric particles (e.g., nanoparticles) can be drained from the reaction vessel and routed through a second recirculating loop 44 using a plurality of control valves 46, 48, 50. In particular, the control valve 46 can be closed and the control valves 48 and 50 can be opened to route the aqueous suspension of the polymeric particles (e.g., nanoparticles) through the second recirculating loop 44 and through a tangential flow filter 52, where the suspension is subjected to tangential flow filtration (TFF). For example, a recirculating flow of the particle suspension can be established between the vessel 12 and the TFF module 52, e.g., by shutting off valve 46, opening valves 48 and 50 and activating the pump 22. During diafiltration, a flow of a make-up fluid (e.g., water) stored in a reservoir 33 can be established from the reservoir 33 to the filtration module 52. The particle suspension enters the filtration module 52 via an input port 54. The retentate generated through the filtration process exits the TFF module via an output port 56 and is returned via a return fluid passage 58 to the reservoir 12. The filtrate is drained from the filtration module 52 via another output port 60 and associated valve 62. The filtration process continues for a desired time period, e.g., until a desired concentration of the polymeric particles (e.g., nanoparticles) in the vessel 12 is achieved. In some implementations, the concentrated particles (e.g., nanoparticles) can then be collected and lyophilized for storage.

Figure 4:
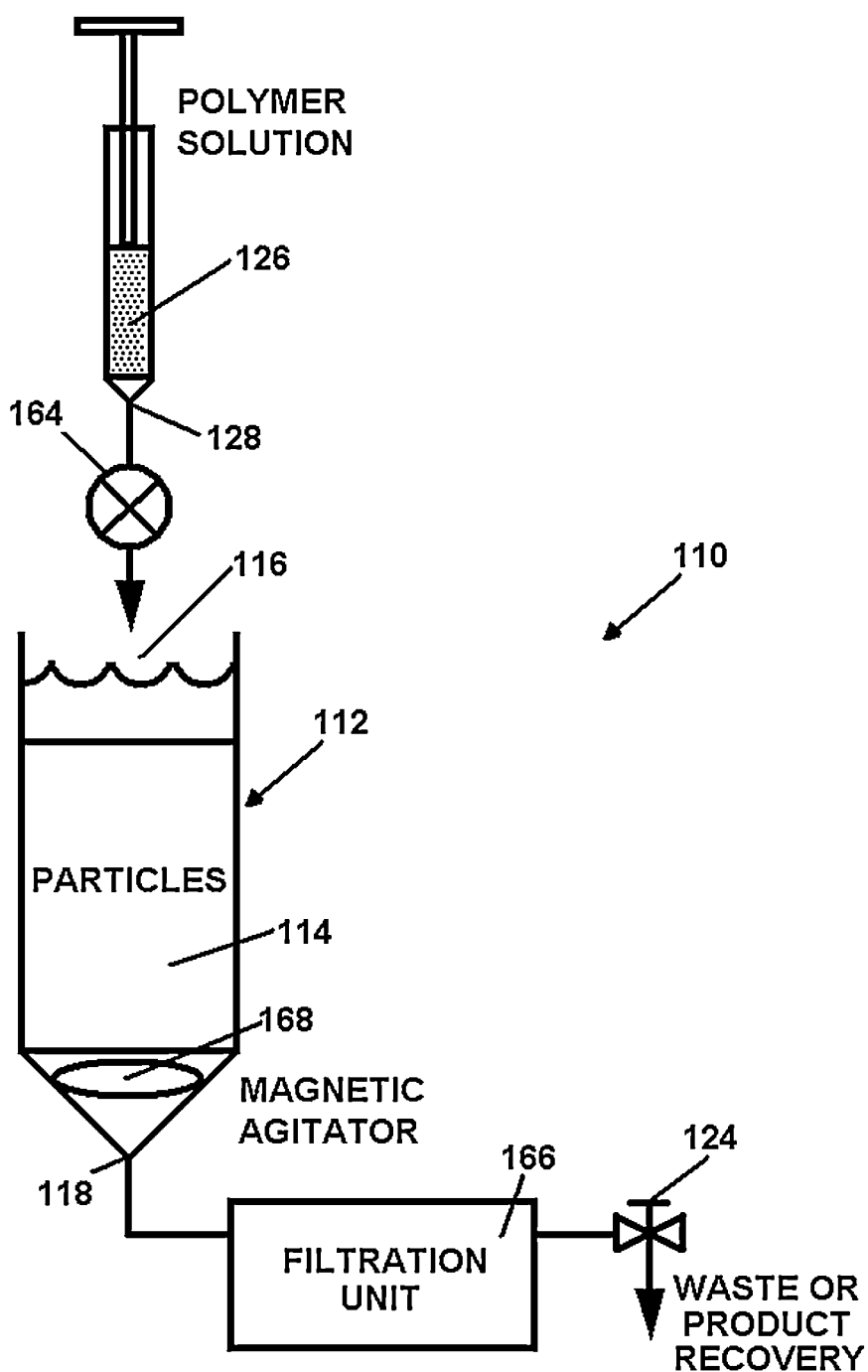
FIG. 4 is a schematic diagram of another embodiment of a system for generating particles (e.g., nanoparticles) according to the teachings of the invention.

FIG. 4 schematically illustrates a system 110 according to another embodiment of the invention for precipitating a polymer contained in a fluid and for generating polymeric particles (e.g., nanoparticles). The system 110 includes a vessel 112 having an input port 116, and in some cases an output port 118 to which a valve 124 is coupled. A plurality of insoluble supports 114 providing precipitation surfaces is disposed in the vessel 112. In this implementation, the insoluble supports 114 comprise a powder of diatomaceous earth (e.g., Celite®), though in other implementations other insoluble supports providing suitable precipitation surfaces can be utilized.

In some embodiments, the volume of the insoluble supports 114 can constitute a significant fraction of the volume of the vessel 112. For example, the volume of the insoluble supports 114 can be at least about 30%, or at least about 40%, or at least about 50%, or at least about 60%, or at least about 70%, or at least about 80%, or at least about 85%, or at least about 90%, or at least about 95% of the volume of the vessel 112.

The vessel 112 also contains a quantity of an anti-solvent, such as the anti-solvents discussed above, where the anti-solvent is in contact with the surfaces of the particles. The vessel 112 can optionally include a magnetic agitator 168 for mixing the contents of the vessel 112. In some embodiments, the vessel 112 can optionally include a mechanical agitator (not shown), such as an overhead stirrer, for mixing the contents of the vessel 112.

The system 110 further includes a reservoir 126 for storing a fluid containing a polymer, e.g., a drug-conjugated cyclodextrin polymer. While in many embodiments the polymer-containing fluid is a solution, in other embodiments it can be a polymer dispersion or a mixed solution/dispersion. The reservoir 126 includes an output port 128 to which a valve 164 is coupled. The valve can be opened to establish a flow of the polymer-containing fluid into the vessel 112. In some implementations, the reservoir 126 can include an injection nozzle (not shown) that allows dropwise introduction of the polymer-containing fluid into the anti-solvent stored in the vessel 112. As discussed above, the introduction of the polymer-containing fluid into the anti-solvent results in the precipitation of at least a portion of the polymer on the surfaces of the insoluble supports 114. In some cases, the precipitated polymer can be in the form of thin strands or a film.

In some implementations, the system 110 can optionally include a filtration unit 166 that can be utilized to separate the polymer-coated insoluble supports from a liquid in the vessel (such as mixture of anti-solvent and the solvent of the polymer solution), e.g., once the introduction of the polymer-carrying fluid from the reservoir 126 into the vessel 112 is completed. The content of the vessel 112 can be introduced into the filtration unit 166 via a conduit 130 which then separates the liquid portion as a permeate from the polymer-coated particles as a retentate. The polymer-coated insoluble supports can be collected, rinsed, and in some cases lyophilized for storage.

As discussed above, the stored polymer-coated insoluble supports can be subsequently exposed to a liquid, e.g., water, to strip the polymer from the surfaces of the insoluble supports as a plurality of polymeric particles (e.g., nanoparticles).

A variety of oligosaccharide polymers, liquids and anti-solvents can be employed in the methods and systems according to the teachings of the invention. Some examples of such polymers, liquids and anti-solvents are provided below.

Polymers

In some embodiments, a variety of polymers containing one or more oligosaccharide moieties can be employed in the above process. In some embodiments, at least one oligosaccharide moiety is a cyclodextrin moiety. In some embodiments, the polymer can have an average molecular weight in a range of about 40 kDa to about 100 kDa, e.g., in a range of about 50 kDa to about 100 kDa, or about 70 kDa to about 80 kDa.

By way of example, the polymer can comprise a plurality of cyclodextrin moieties, such as α-cyclodextrin, β-cyclodextrin, and γ-cyclodextrin. In some cases, the cyclodextrin can contain 5 or more α-D-glucopyranoside units. Particularly preferred cyclodextrins contain 6 sugars (α-cyclodextrin), 7 sugar units (β-cyclodextrin), or 8 sugar units (γ-cyclodextrin).

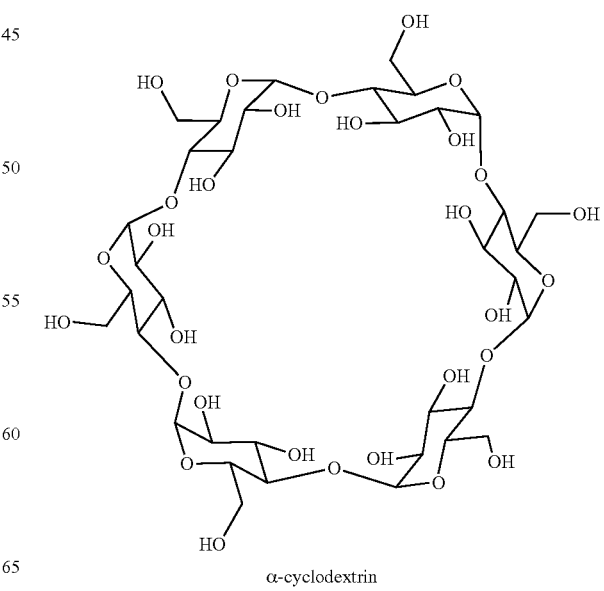

α-cyclodextrin

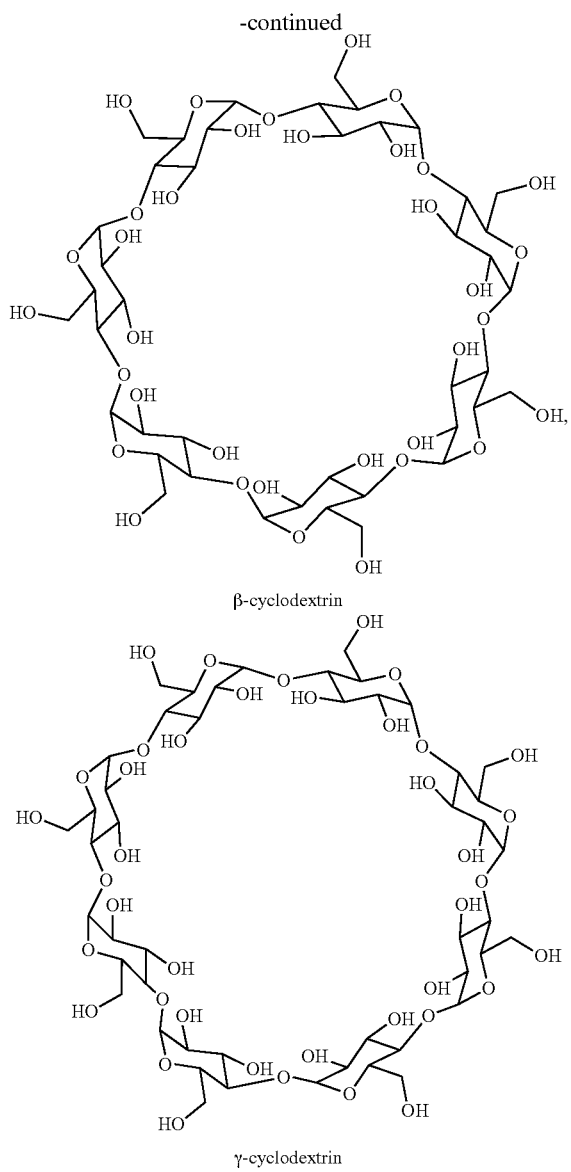

β-cyclodextrin

γ-cyclodextrin

The polymer can comprise linear or branched cyclodextrin-containing polymers and polymers grafted with cyclodextrin. Exemplary cyclodextrin-containing polymers that may be modified as described herein are taught in U.S. Pat. Nos. 7,270,808, 6,509,323, 7,091,192, 6,884,789, U.S. Publication Nos. 20040087024, 20040109888 and 20070025952.

In some embodiments, the cyclodextrin moiety can link to one or more amino acid moieties, preferably two or more amino acid moieties. Thus, the cyclodextrin moieties can form any of a linear or a branched polymer.

The cyclodextrin-based polymer can be a polycation, a polyanion, or a non-ionic polymer.

In some such embodiments, the cyclodextrin-based polymer can include cyclodextrin moieties alternating with linker moieties that connect the cyclodextrin moieties into linear or branched polymers. Some examples of such linker moieties include, without limitation, amino acids, peptides, ethylene glycol and poly ethylene glycol. In some embodiments, the amino acids are selected from the 22 standard alpha amino acids. In other embodiments, the amino acid may be a gamma amino acid, and unnatural amino acid such as those sold by SigmaAldrich. In some embodiments, the peptide is a 2-20-amino acid peptide. In some embodiments, the peptide is a 2-10 amino acid peptide. Two or more different types of linker moieties may be combined to connect the cyclodextrin polymer.

In certain embodiments, the cyclodextrin moieties make up at least about 2%, 5% or 10% by weight, up to 20%, 30%, 50% or even 80% by weight of the CDP as precipitated by the methods as described herein. Number-average molecular weight (MO may also vary widely, but generally fall in the range of about 1,000 to about 500,000 daltons, preferably from about 5000 to about 200,000 daltons. Within a given sample of a subject polymer, a wide range of molecular weights may be present. For example, molecules within the sample may have molecular weights that differ by a factor of 2, 5, 10, 20, 50, 100, or more, or that differ from the average molecular weight by a factor of 2, 5, 10, 20, 50, 100, or more. Exemplary cyclodextrin moieties include cyclic structures consisting essentially of from 7 to 9 saccharide moieties, such as cyclodextrin and oxidized cyclodextrin. A cyclodextrin moiety optionally comprises a linker moiety that forms a covalent linkage between the cyclic structure and the polymer backbone, preferably having from 1 to 20 atoms in the chain, such as alkyl chains, including dicarboxylic acid derivatives (such as glutaric acid derivatives, succinic acid derivatives, and the like), and heteroalkyl chains, such as oligoethylene glycol chains.

Cyclodextrins are cyclic polysaccharides containing naturally occurring D-(+)-glucopyranose units in an α-(1,4) linkage. The most common cyclodextrins are alpha ((α)-cyclodextrins, beta (β)-cyclodextrins and gamma (γ)-cyclodextrins which contain, respectively six, seven, or eight glucopyranose units. Structurally, the cyclic nature of a cyclodextrin forms a torus or donut-like shape having an inner apolar or hydrophobic cavity, the secondary hydroxyl groups situated on one side of the cyclodextrin torus and the primary hydroxyl groups situated on the other. Thus, using (β)-cyclodextrin as an example, a cyclodextrin is often represented schematically as:

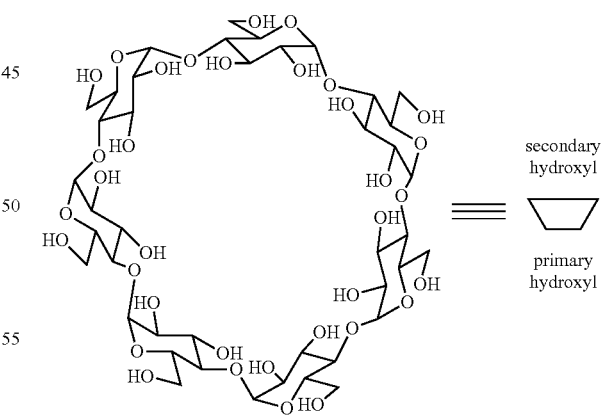

Attachment on the trapezoid representing the cyclodextrin depicts only whether the moiety is attached through a primary hydroxyl on the cyclodextrin, i.e., by depicting attachment through the base of the trapezoid, or depicting whether the moiety is attached through a secondary hydroxyl on the cyclodextrin, i.e., by depicting attachment through the top of the trapezoid. For example, a trapezoid with two moieties attached at the right and left bottom of the trapezoid does not indicate anything about the relative position of the moieties around the cyclodextrin ring. The attachment of the moieties can be on any glucopyranose in the cyclodextrin ring. Exemplary relative positions of two moieties on a cyclodextrin ring include the following: moieties positioned such that the derivatization on the cyclodextrin is on the A and D glucopyranose moieties, moieties positioned such that the derivatization on the cyclodextrin is on the A and C glucopyranose moieties, moieties positioned such that the derivatization on the cyclodextrin is on the A and F glucopyranose moieties, or moieties positioned such that the derivatization on the cyclodextrin is on the A and E glucopyranose moieties.

The side on which the secondary hydroxyl groups are located has a wider diameter than the side on which the primary hydroxyl groups are located. One embodiment contemplates covalent linkages to cyclodextrin moieties on the primary and/or secondary hydroxyl groups. The hydrophobic nature of the cyclodextrin inner cavity allows for host-guest inclusion complexes of a variety of compounds, e.g., adamantane. (Comprehensive Supramolecular Chemistry, Volume 3, J. L. Atwood et al., eds., Pergamon Press (1996); T. Cserhati, Analytical Biochemistry, 225:328-332 (1995); Husain et al., Applied Spectroscopy, 46:652-658 (1992); FR 2 665 169). Additional methods for modifying polymers are disclosed in Suh, J. and Noh, Y., *Bioorg. Med. Chem. Lett.* 1998, 8, 1327-1330.

In certain embodiments, the compounds comprise cyclodextrin moieties and wherein at least one or a plurality of the cyclodextrin moieties of the CDP-linked agent conjugate is oxidized. In certain embodiments, the cyclodextrin moieties defined herein as included in "P" alternate with linker moieties in the polymer chain.

Linkers/Tethers

The CDPs described herein can include one or more linkers. In some embodiments, a linker can link a linked agent as described herein to a CDP. In some embodiments, for example, when referring to a linker that links a linked agent to the CDP, the linker can be referred to as a tether. In certain embodiments, a plurality of the linker moieties are covalently attached to a therapeutic agent or prodrug thereof and are cleaved under biological conditions.

Described herein are CDP-linked agent conjugates comprising a CDP covalently attached to a linked agent through attachments that are cleaved under biological conditions to release the linked agent. In certain embodiments, a CDP-linked agent conjugate comprises a therapeutic agent covalently attached to a polymer, preferably a biocompatible polymer, through a tether, e.g., a linker, wherein the tether comprises a selectivity-determining moiety and a self-cyclizing moiety which are covalently attached to one another in the tether, e.g., between the polymer and the therapeutic agent.

In some embodiments, such linked agents, such as therapeutic agents are covalently attached to CDPs through functional groups comprising one or more heteroatoms, for example, hydroxy, thiol, carboxy, amino, and amide groups. Such groups may be covalently attached to the subject polymers through linker groups as described herein, for example, biocleavable linker groups, and/or through tethers, such as a tether comprising a selectivity-determining moiety and a self-cyclizing moiety which are covalently attached to one another.

In certain embodiments, the selectivity-determining moiety is a moiety that promotes selectivity in the cleavage of the bond between the selectivity-determining moiety and the self-cyclizing moiety. Such a moiety may, for example, promote enzymatic cleavage between the selectivity-determining moiety and the self-cyclizing moiety. Alternatively, such a moiety may promote cleavage between the selectivity-determining moiety and the self-cyclizing moiety under acidic conditions or basic conditions.

In some embodiments, the selectivity-determining moiety is bonded to the self-cyclizing moiety between the self-cyclizing moiety and the CDP.

In certain embodiments, any combination of the foregoing is contemplated. Those skilled in the art will recognize that, for example, any therapeutic agent described herein in combination with any linker (e.g., self-cyclizing moiety, any selectivity-determining moiety, and/or any therapeutic agent described herein) are within the scope of the invention.

In certain embodiments, the linker is a selectivity-determining moiety is selected such that the bond is cleaved under acidic conditions. In certain embodiments, where the selectivity-determining moiety is selected such that the bond is cleaved under basic conditions, the selectivity-determining moiety is an aminoalkylcarbonyloxyalkyl moiety. In certain embodiments, the selectivity-determining moiety has a structure

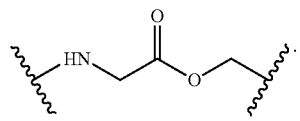 [SMILES: *COC(=O)CN*]

In certain embodiments where the selectivity-determining moiety is selected such that the bond is cleaved enzymatically, it may be selected such that a particular enzyme or class of enzymes cleaves the bond. In certain preferred such embodiments, the selectivity-determining moiety may be selected such that the bond is cleaved by a cathepsin, preferably cathepsin B.

In certain embodiments the selectivity-determining moiety comprises a peptide, preferably a dipeptide, tripeptide, or tetrapeptide. In certain such embodiments, the peptide is a dipeptide is selected from KF and FK, In certain embodiments, the peptide is a tripeptide is selected from GFA, GLA, AVA, GVA, GIA, GVL, GVF, and AVF. In certain embodiments, the peptide is a tetrapeptide selected from GFYA and GFLG, preferably GFLG.

In certain such embodiments, a peptide, such as GFLG, is selected such that the bond between the selectivity-determining moiety and the self-cyclizing moiety is cleaved by a cathepsin, preferably cathepsin B.

In certain embodiments, the selectivity-determining moiety is represented by Formula A:

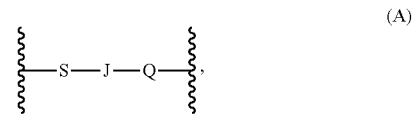

(A)

wherein
S a sulfur atom that is part of a disulfide bond;
J is optionally substituted hydrocarbyl; and
Q is O or $NR^{13}$, wherein $R^{13}$ is hydrogen or alkyl.

In certain embodiments, J may be polyethylene glycol, polyethylene, polyester, alkenyl, or alkyl. In certain embodiments, J may represent a hydrocarbylene group comprising one or more methylene groups, wherein one or more methylene groups is optionally replaced by a group Y (provided that none of the Y groups are adjacent to each other), wherein each Y, independently for each occurrence, is selected from, substituted or unsubstituted aryl, heteroaryl, cycloalkyl, heterocycloalkyl, or —O—, C(=X) (wherein X is $NR^{30}$, O or S), —OC(O)—, —C(=O)O, —$NR^{30}$—, —$NR_1CO$—, —C(O)$NR^{30}$—, —S(O)$_n$— (wherein n is 0, 1, or 2), —OC(O)—$NR^{30}$, —$NR^{30}$—C(O)—$NR^{30}$—, —$NR^{30}$—C($NR^{30}$)—$NR^{30}$—, and —B(O$R^{30}$)—; and $R^{30}$, independently for each occurrence, represents H or a lower alkyl. In certain embodiments, J may be substituted or unsubstituted lower alkylene, such as ethylene. For example, the selectivity-determining moiety may be

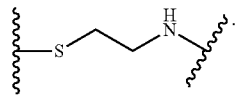

In certain embodiments, the selectivity-determining moiety is represented by Formula B:

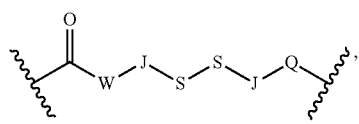

(B)

wherein
W is either a direct bond or selected from lower alkyl, $NR^{14}$, S, O;
S is sulfur;
J, independently and for each occurrence, is hydrocarbyl or polyethylene glycol;
Q is O or $NR^{13}$, wherein $R^{13}$ is hydrogen or alkyl; and
$R^{14}$ is selected from hydrogen and alkyl.

In certain such embodiments, J may be substituted or unsubstituted lower alkyl, such as methylene. In certain such embodiments, J may be an aryl ring. In certain embodiments, the aryl ring is a benzo ring. In certain embodiments W and S are in a 1,2-relationship on the aryl ring. In certain embodiments, the aryl ring may be optionally substituted with alkyl, alkenyl, alkoxy, aralkyl, aryl, heteroaryl, halogen, —CN, azido, —$NR^xR^x$, —$CO_2OR^x$, —C(O)—$NR^xR^x$, —C(O)—$R^X$, —$NR^x$—C(O)—$R^x$, —$NR^xSO_2R^x$, —$SR^x$, —S(O)$R^x$, —$SO_2R^x$, —$SO_2NR^xR^x$, —$(C(R^x)_2)_n$—$OR^x$, —$(C(R^x)_2)_n$—$NR^xR^x$, and —$(C(R^x)_2)_n$—$SO_2R^x$; wherein $R^x$ is, independently for each occurrence, H or lower alkyl; and n is, independently for each occurrence, an integer from 0 to 2.

In certain embodiments, the aryl ring is optionally substituted with alkyl, alkenyl, alkoxy, aralkyl, aryl, heteroaryl, halogen, —CN, azido, —$NR^xR^x$, —$CO_2OR^x$, —C(O)—$NR^xR^x$, —C(O)—$R^x$, —$NR^x$—C(O)—$R^x$, —$NR^xSO_2R^x$, —$SR^x$, —S(O)R', —$SO_2R^x$, —$SO_2NR^xR^x$, —$(C(R^x)_2)_n$—$OR^x$, —$(C(R^x)_2)_n$—$NR^xR^x$, and —$(C(R^x)_2)_n$—$SO_2R^x$; wherein $R^x$ is, independently for each occurrence, H or lower alkyl; and n is, independently for each occurrence, an integer from 0 to 2.

In certain embodiments, J, independently and for each occurrence, is polyethylene glycol, polyethylene, polyester, alkenyl, or alkyl.

In certain embodiments, independently and for each occurrence, the linker comprises a hydrocarbylene group comprising one or more methylene groups, wherein one or more methylene groups is optionally replaced by a group Y (provided that none of the Y groups are adjacent to each other), wherein each Y, independently for each occurrence, is selected from, substituted or unsubstituted aryl, heteroaryl, cycloalkyl, heterocycloalkyl, or —O—, C(=X) (wherein X is $NR^{30}$, O or S), —OC(O)—, —C(=O)O, —$NR^{30}$—, —$NR_1CO$—, —C(O)$NR^{30}$—, —S(O)$_n$— (wherein n is 0, 1, or 2), —OC(O)—$NR^{30}$, —$NR^{30}$—C(O)—$NR^{30}$—, —$NR^{30}$—C($NR^{30}$)—$NR^{30}$—, and —B(O$R^{30}$)—; and $R^{30}$, independently for each occurrence, represents H or a lower alkyl.

In certain embodiments, J, independently and for each occurrence, is substituted or unsubstituted lower alkylene. In certain embodiments, J, independently and for each occurrence, is substituted or unsubstituted ethylene.

In certain embodiments, the selectivity-determining moiety is selected from

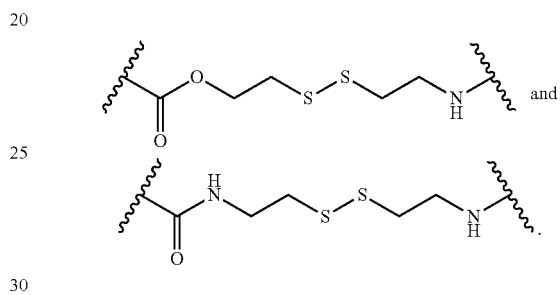

The selectivity-determining moiety may include groups with bonds that are cleavable under certain conditions, such as disulfide groups. In certain embodiments, the selectivity-determining moiety comprises a disulfide-containing moiety, for example, comprising aryl and/or alkyl group(s) bonded to a disulfide group. In certain embodiments, the selectivity-determining moiety has a structure

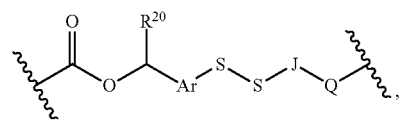

wherein
Ar is a substituted or unsubstituted benzo ring;
J is optionally substituted hydrocarbyl; and
Q is O or $NR^{13}$,
wherein $R^{13}$ is hydrogen or alkyl.

In certain embodiments, Ar is unsubstituted. In certain embodiments, Ar is a 1,2-benzo ring. For example, suitable moieties within Formula B include:

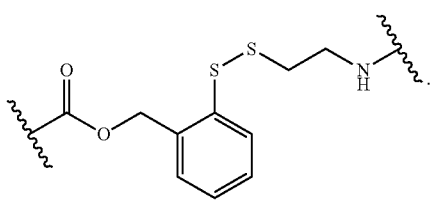 [SMILES: *NCCSSc1ccccc1COC(*)=O]

In certain embodiments, the self-cyclizing moiety is selected such that upon cleavage of the bond between the selectivity-determining moiety and the self-cyclizing moiety, cyclization occurs thereby releasing the therapeutic agent. Such a cleavage-cyclization-release cascade may occur sequentially in discrete steps or substantially simultaneously. Thus, in certain embodiments, there may be a temporal and/or spatial difference between the cleavage and the self-cyclization. The rate of the self-cyclization cascade may depend on pH, e.g., a basic pH may increase the rate of self-cyclization after cleavage. Self-cyclization may have a half-life after introduction in vivo of 24 hours, 18 hours, 14 hours, 10 hours, 6 hours, 3 hours, 2 hours, 1 hour, 30 minutes, 10 minutes, 5 minutes, or 1 minute.

In certain such embodiments, the self-cyclizing moiety may be selected such that, upon cyclization, a five- or six-membered ring is formed, preferably a five-membered ring. In certain such embodiments, the five- or six-membered ring comprises at least one heteroatom selected from oxygen, nitrogen, or sulfur, preferably at least two, wherein the heteroatoms may be the same or different. In certain such embodiments, the heterocyclic ring contains at least one nitrogen, preferably two. In certain such embodiments, the self-cyclizing moiety cyclizes to form an imidazolidone.

In certain embodiments, the self-cyclizing moiety has a structure

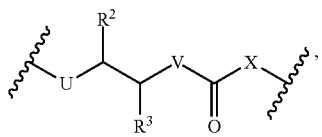

wherein
U is selected from $NR^1$ and S;
X is selected from O, $NR^S$, and S, preferably O or S;
V is selected from O, S and $NR^4$, preferably O or $NR^4$;
$R^2$ and $R^3$ are independently selected from hydrogen, alkyl, and alkoxy; or $R^2$ and $R^3$ together with the carbon atoms to which they are attached form a ring; and
$R^1$, $R^4$, and $R^5$ are independently selected from hydrogen and alkyl.

In certain embodiments, U is $NR^1$ and/or V is $NR^4$, and $R^1$ and $R^4$ are independently selected from methyl, ethyl, propyl, and isopropyl. In certain embodiments, both $R^1$ and $R^4$ are methyl. On certain embodiments, both $R^2$ and $R^3$ are hydrogen. In certain embodiments $R^2$ and $R^3$ are independently alkyl, preferably lower alkyl. In certain embodiments, $R^2$ and $R^3$ together are —$(CH_2)_n$— wherein n is 3 or 4, thereby forming a cyclopentyl or cyclohexyl ring. In certain embodiments, the nature of $R^2$ and $R^3$ may affect the rate of cyclization of the self-cyclizing moiety. In certain such embodiments, it would be expected that the rate of cyclization would be greater when $R^2$ and $R^3$ together with the carbon atoms to which they are attached form a ring than the rate when $R^2$ and $R^3$ are independently selected from hydrogen, alkyl, and alkoxy. In certain embodiments, U is bonded to the self-cyclizing moiety.

In certain embodiments, the self-cyclizing moiety is selected from

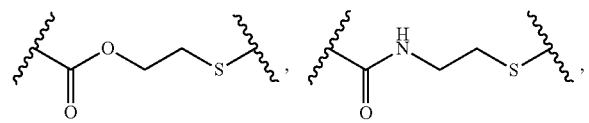

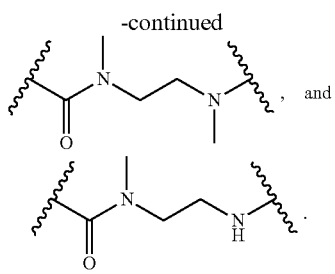

In certain embodiments, the selectivity-determining moiety may connect to the self-cyclizing moiety through carbonyl-heteroatom bonds, e.g., amide, carbamate, carbonate, ester, thioester, and urea bonds.

In certain embodiments, a therapeutic agent is covalently attached to a polymer through a tether, wherein the tether comprises a selectivity-determining moiety and a self-cyclizing moiety which are covalently attached to one another. In certain embodiments, the self-cyclizing moiety is selected such that after cleavage of the bond between the selectivity-determining moiety and the self-cyclizing moiety, cyclization of the self-cyclizing moiety occurs, thereby releasing the therapeutic agent. As an illustration, ABC may be a selectivity-determining moiety, and DEFGH maybe be a self-cyclizing moiety, and ABC may be selected such that enzyme Y cleaves between C and D. Once cleavage of the bond between C and D progresses to a certain point, D will cyclize onto H, thereby releasing therapeutic agent X, or a prodrug thereof.

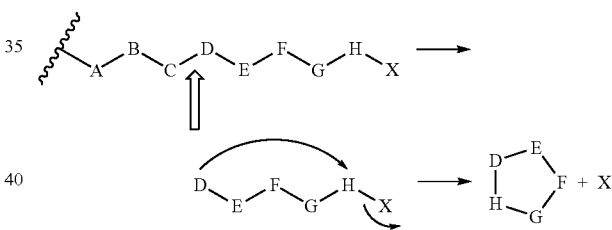

In certain embodiments, the conjugate may further comprise additional intervening components, including, but not limited to another self-cyclizing moiety or a leaving group linker, such as $CO_2$ or methoxymethyl, that spontaneously dissociates from the remainder of the molecule after cleavage occurs.

In some embodiments, a linker may be and/or comprise an alkylene chain, a polyethylene glycol (PEG) chain, polysuccinic anhydride, poly-L-glutamic acid, poly(ethyleneimine), an oligosaccharide, an amino acid (e.g., glycine or cysteine), an amino acid chain, or any other suitable linkage. In certain embodiments, the linker group itself can be stable under physiological conditions, such as an alkylene chain, or it can be cleavable under physiological conditions, such as by an enzyme (e.g., the linkage contains a peptide sequence that is a substrate for a peptidase), or by hydrolysis (e.g., the linkage contains a hydrolyzable group, such as an ester or thioester). The linker groups can be biologically inactive, such as a PEG, polyglycolic acid, or polylactic acid chain, or can be biologically active, such as an oligo- or polypeptide that, when cleaved from the moieties, binds a receptor, deactivates an enzyme, etc. Various oligomeric linker groups that are biologically compatible and/or bioerodible are known in the art, and the selection of the linkage may influence the ultimate properties of the material, such as whether it is durable when implanted, whether it gradually deforms or shrinks after implantation, or whether it gradually degrades and is absorbed by the body. The linker group may be attached to the moieties by any suitable bond or functional group, including carbon-carbon bonds, esters, ethers, amides, amines, carbonates, carbamates, sulfonamides, etc.

In certain embodiments, the linker group(s) represent a hydrocarbylene group wherein one or more methylene groups is optionally replaced by a group Y (provided that none of the Y groups are adjacent to each other), wherein each Y, independently for each occurrence, is selected from, substituted or unsubstituted aryl, heteroaryl, cycloalkyl, heterocycloalkyl, or —O—, C(=X) (wherein X is $NR_1$, O or S), —OC(O)—, —C(=O)O, —$NR_1$—, —$NR_1$CO—, —C(O)$NR_1$—, —S(O)$_n$— (wherein n is 0, 1, or 2), —OC(O)—$NR_1$, —$NR_1$—C(O)—$NR_1$—, —$NR_1$—C($NR_1$)—$NR_1$—, and —B(O$R_1$)—; and $R_1$, independently for each occurrence, represents H or a lower alkyl.

In certain embodiments, the linker group represents a derivatized or non-derivatized amino acid (e.g., glycine or cysteine). In certain embodiments, linker groups with one or more terminal carboxyl groups may be conjugated to the polymer. In certain embodiments, one or more of these terminal carboxyl groups may be capped by covalently attaching them to a therapeutic agent, a targeting moiety, or a cyclodextrin moiety via an (thio)ester or amide bond.

In still other embodiments, linker groups with one or more terminal hydroxyl, thiol, or amino groups may be incorporated into the polymer. In preferred embodiments, one or more of these terminal hydroxyl groups may be capped by covalently attaching them to a therapeutic agent, a targeting moiety, or a cyclodextrin moiety via an (thio)ester, amide, carbonate, carbamate, thiocarbonate, or thiocarbamate bond. In certain embodiments, these (thio)ester, amide, (thio)carbonate or (thio)carbamates bonds may be biohydrolyzable, e.g., capable of being hydrolyzed under biological conditions.

In certain embodiments, a linker group represents a hydrocarbylene group wherein one or more methylene groups is optionally replaced by a group Y (provided that none of the Y groups are adjacent to each other), wherein each Y, independently for each occurrence, is selected from, substituted or unsubstituted aryl, heteroaryl, cycloalkyl, heterocycloalkyl, or —O—, C(=X) (wherein X is $NR_1$, O or S), —OC(O)—, —C(=O)O, —$NR_1$—, —$NR_1$CO—, —C(O)$NR_1$—, —S(O)$_n$— (wherein n is 0, 1, or 2), —OC(O)—$NR_1$, —$NR_1$—C(O)—$NR_1$—, —$NR_1$—C($NR_1$)—$NR_1$—, and —B(O$R_1$)—; and $R_1$, independently for each occurrence, represents H or a lower alkyl.

In certain embodiments, a linker group, e.g., between a therapeutic agent described herein and the CDP, comprises a self-cyclizing moiety. In certain embodiments, a linker group, e.g., between a therapeutic agent described herein and the CDP, comprises a selectivity-determining moiety.

In certain embodiments as disclosed herein, a linker group, e.g., between a therapeutic agent and the CDP, comprises a self-cyclizing moiety and a selectivity-determining moiety.

In certain embodiments as disclosed herein, the therapeutic agent or targeting ligand is covalently bonded to the linker group via a biohydrolyzable bond (e.g., an ester, amide, carbonate, carbamate, or a phosphate).

In certain embodiments as disclosed herein, the CDP comprises cyclodextrin moieties that alternate with linker moieties in the polymer chain.

In certain embodiments, the linker moieties are attached to therapeutic agents or prodrugs thereof that are cleaved under biological conditions.

In certain embodiments, at least one linker that connects the therapeutic agent or prodrug thereof to the polymer comprises a group represented by the formula

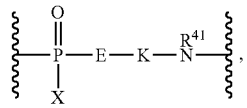

wherein
P is phosphorus;
O is oxygen;
E represents oxygen or $NR^{40}$;
K represents hydrocarbyl;
X is selected from $OR^{42}$ or $NR^{43}R^{44}$; and
$R^{40}$, $R^{41}$, $R^{42}$, $R^{43}$, and $R^{44}$ independently represent hydrogen or optionally substituted alkyl.

In certain embodiments, E is $NR^{40}$ and $R^{40}$ is hydrogen.

In certain embodiments, K is lower alkylene (e.g., ethylene).

In certain embodiments, at least one linker comprises a group selected from

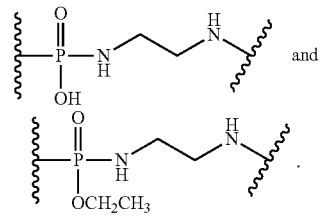

In certain embodiments, X is $OR^{42}$.

In certain embodiments, the linker group comprises an amino acid or peptide, or derivative thereof (e.g., a glycine or cysteine).

In certain embodiments as disclosed herein, the linker is connected to the therapeutic agent through a hydroxyl group. In certain embodiments as disclosed herein, the linker is connected to the therapeutic agent through an amino group.

In certain embodiments, the linker group that connects to the therapeutic agent may comprise a self-cyclizing moiety, or a selectivity-determining moiety, or both. In certain embodiments, the selectivity-determining moiety is a moiety that promotes selectivity in the cleavage of the bond between the selectivity-determining moiety and the self-cyclizing moiety. Such a moiety may, for example, promote enzymatic cleavage between the selectivity-determining moiety and the self-cyclizing moiety. Alternatively, such a moiety may promote cleavage between the selectivity-determining moiety and the self-cyclizing moiety under acidic conditions or basic conditions.

In certain embodiments, any of the linker groups may comprise a self-cyclizing moiety or a selectivity-determining moiety, or both. In certain embodiments, the selectivity-determining moiety may be bonded to the self-cyclizing moiety between the self-cyclizing moiety and the polymer.

In certain embodiments, any of the linker groups may independently be or include an alkyl chain, a polyethylene glycol (PEG) chain, polysuccinic anhydride, poly-L-glutamic acid, poly(ethyleneimine), an oligosaccharide, an amino acid chain, or any other suitable linkage. In certain embodiments, the linker group itself can be stable under physiological conditions, such as an alkyl chain, or it can be cleavable under physiological conditions, such as by an enzyme (e.g., the linkage contains a peptide sequence that is a substrate for a peptidase), or by hydrolysis (e.g., the linkage contains a hydrolyzable group, such as an ester or thioester). The linker groups can be biologically inactive, such as a PEG, polyglycolic acid, or polylactic acid chain, or can be biologically active, such as an oligo- or polypeptide that, when cleaved from the moieties, binds a receptor, deactivates an enzyme, etc. Various oligomeric linker groups that are biologically compatible and/or bioerodible are known in the art, and the selection of the linkage may influence the ultimate properties of the material, such as whether it is durable when implanted, whether it gradually deforms or shrinks after implantation, or whether it gradually degrades and is absorbed by the body. The linker group may be attached to the moieties by any suitable bond or functional group, including carbon-carbon bonds, esters, ethers, amides, amines, carbonates, carbamates, sulfonamides, etc.

In certain embodiments, any of the linker groups may independently be an alkyl group wherein one or more methylene groups is optionally replaced by a group Y (provided that none of the Y groups are adjacent to each other), wherein each Y, independently for each occurrence, is selected from aryl, heteroaryl, carbocyclyl, heterocyclyl, or —O—, C(=X) (wherein X is $NR^1$, O or S), —OC(O)—, —C(=O)O—, —$NR^1$—, —$NR^1$CO—, —C(O)$NR^1$—, —S(O)$_n$—, (wherein n is 0, 1, or 2), —OC(O)—$NR^1$—, —$NR^1$—C(O)—$NR^1$—, —$NR^1$—C($NR^1$)—$NR^1$—, and —B(O$R^1$)—; and $R^1$, independently for each occurrence, is H or lower alkyl.

As described herein, two or more linker groups as described herein may be covalently bonded to form the linker group attaching the CDP to the linked agent. For example, a self-cyclizing moiety and a PEG chain are within the scope of "L". In certain embodiments, the linker comprises a self-cyclizing moiety and a selectivity-determining moiety. Thus, a polymer conjugate comprising a therapeutic agent covalently attached to a polymer, preferably a biocompatible polymer, through a tether, wherein the tether comprises a selectivity-determining moiety and a self-cyclizing moiety which are covalently attached to one another is contemplated.

Linked Agent

In some embodiments, the polymer can comprise a linked agent. The term "linked agent," as used herein, is an agent linked to the cyclodextrin containing polymer through one or more covalent bonds which is a therapeutic agent or a prodrug thereof, a bioactive agent or a precursor thereof, an adjuvant, a targeting ligand or a precursor thereof, or a reactive group. In one embodiment, the linked agent is a therapeutic agent. In some embodiments, the linked agent is a therapeutic agent or a prodrug thereof, a bioactive agent or a precursor thereof, an adjuvant, or a targeting ligand or a precursor thereof. In some embodiments, the linked agent is a therapeutic agent, a bioactive agent, or a targeting ligand. In some embodiments, the polymer comprises at least one therapeutic agent or prodrug thereof and at least one targeting ligand or a precursor thereof. In some embodiments, the polymer comprises more than one therapeutic agents, bioactive agents, and/or targeting agents covalently attached thereto. In some embodiments, the bioactive and/or therapeutic agent and/or targeting ligand can comprise at least about 5%, or at least about 10%, or at least about 15%, or at least about 20%, or at least about 25%, or at least about 30%, or at least about 35%, or at least about 40%, or at least about 50% by weight of the polymer.

The term "therapeutic agent" includes an agent that may be used in the treatment of a disease in a patient, as well as any agent that is capable of exerting or responsible to exert a biological or physiological effect in vitro and/or in vivo. The term "therapeutic agent" includes pharmaceutical agents, an anti-cancer agent (e.g., a cytotoxic agent, a chemotherapy agent, or a radiotherapeutic agent), an anti-inflammatory agent, or a cardiovascular agent. In some embodiments, the anti-cancer agent is an alkylating agent, a vascular disrupting agent, a microtubule targeting agent, a mitotic inhibitor, a topoisomerase inhibitor, an anti-angiogenic agent or an anti-metabolite. In some embodiments, the anti-cancer agent is a taxane (e.g., paclitaxel, docetaxel, larotaxel or cabazitaxel). In some embodiments, the anti-cancer agent is an anthracycline (e.g., doxorubicin). In some embodiments, the anti-cancer agent is a platinum-based agent (e.g., cisplatin). In some embodiments, the anti-cancer agent is a pyrimidine analog (e.g., gemcitabine). In some embodiments, the therapeutic agent is one or more of a taxane, an epothilone, a boronic acid proteasome inhibitor, an anti-biotic, or an anti-metabolite. Other examples of therapeutic agents include topoisomerase inhibitors, a topoisomerase I inhibitor (e.g., camptothecin, irinotecan, SN-38, topotecan, lamellarin D, lurotecan, exatecan, diflomotecan, or derivatives thereof), or a topoisomerase II inhibitor (e.g., an etoposide, a tenoposide, amsacrine, or derivatives thereof), an anti-metabolic agent (e.g., an antifolate (e.g., pemetrexed, floxuridine, or raltitrexed), a pyrimidine conjugate (e.g., capecitabine, cytarabine, gemcitabine, or 5FU), an alkylating agent, an anthracycline, an anti-tumor antibiotic (e.g., a HSP90 inhibitor such as geldanamycin), a platinum based agent (e.g., cisplatin, carboplatin, or oxaliplatin), a microtubule inhibitor, a kinase inhibitor (e.g., a seronine/threonine kinase inhibitor, a mTOR inhibitor such as rapamycin) or a proteasome inhibitor. A prodrug of a therapeutic agent is an agent that, upon metabolism in the body, produces the active drug moiety.

The term "bioactive agent" can be an agent having biological activity, such as a therapeutic or diagnostic agent. Examples include a radiosensitizer. A precursor of a bioactive agent is an agent that, upon metabolism in the body, produces a bioactive agent.

The term "adjuvant" can be a compound that lacks significant activity administered alone but can potentiate the activity of another therapeutic agent.

The term "targeting ligand" includes moieties which are capable of binding to a determined target or region within a body, so to selectively enhance the delivery of the CDP conjugate to said target or region. Examples of targeting ligands include, for example, peptides, proteins or antibodies, capable of binding to a specific organ or tissue such as, for instance, an antibody specific for a tumor antigen.

The term "reactive group", is a moiety that is readily cleaved from the substrate during a reaction. The reactive group is thus readily replaceable by, for example, a therapeutic agent, a bioactive agent, an adjuvant, or a targeting ligand. Useful reactive groups include, but are not limited to, carboxylic acids, alcohols, thiols, amines, epoxides, etc., capable of forming a covalent bond with a reactive group of the polymer. Additional reactive groups include halogens, azides, sulfonic esters (e.g., alkylsulfonyl, arylsulfonyl), oxonium ions, alkyl perchlorates, ammonioalkanesulfonate esters, alkylfluorosulfonates and fluorinated compounds (e.g., triflates, nonaflates, tresylates) and the like. The active group may simply be a H on an OH moiety. The choice of these and other reactive groups appropriate for a particular set of reaction conditions is within the abilities of those of skill in the art.

In some examples, if the CDP includes alcohols, thiols, or amines as reactive groups, the reactive groups are moieties that react with them, such as isocyanates, isothiocyanates, acid chlorides, acid anhydrides, epoxides, ketenes, sulfonyl chlorides, activated carboxylic acids (e.g., carboxylic acids treated with an activating agent such as PyBrOP, carbonyldiimidazole, or another reagent that reacts with a carboxylic acid to form a moiety susceptible to nucleophilic attack), or other electrophilic moieties known to those of skill in the art. In certain embodiments, a catalyst may be needed to cause the reaction to take place (e.g., a Lewis acid, a transition metal catalyst, an amine base, etc.) as will be understood by those of skill in the art.

In some embodiments, the linker is coupled to the linked agent via covalent attachments that can be cleaved under biological conditions to release the linked agents. In some embodiments the rate of release of the linked agents, such as therapeutic or bioactive agent(s), depends primarily on the rate of hydrolysis. In some other embodiments, the rate of release of the therapeutic or bioactive agent(s) depends primarily on the rate of enzymatic cleavage.

Certain embodiments include the process of precipitating a CDP, wherein a plurality of linked agents which are therapeutic agents are covalently attached to the polymer through attachments that are cleaved under biological conditions to release the therapeutic agents as discussed above, wherein administration of the polymer to a subject results in release of the therapeutic agent over a period of at least 2, 3, 5, 6, 8, 10, 15, 20, 24, 36, 48 or even 72 hours.

In some embodiments, the conjugation of the therapeutic agent to the CDP improves the aqueous solubility of the therapeutic agent and hence the bioavailability. Accordingly, in one embodiment, the therapeutic agent has a log P>0.4, >0.6, >0.8, >1, >2, >3, >4, or even >5.

In certain embodiments, the present invention contemplates the process of precipitating polymers having an attenuated rate of release of the therapeutic agent by introducing various tether and/or linking groups between the therapeutic agent and the polymer. Thus, in certain embodiments, the CDP-linked agent conjugates are compositions for controlled delivery of the therapeutic agent.

Comonomers

In addition to a cyclodextrin moiety, the CDP can also include a comonomer, for example, a comonomer described herein. In some embodiments, a comonomer of the CDP-topoisomerase inhibitor conjugate comprises a moiety selected from the group consisting of: an alkylene chain, polysuccinic anhydride, poly-L-glutamic acid, poly(ethyleneimine), an oligosaccharide, and an amino acid chain. In some embodiments, a CDP-topoisomerase inhibitor conjugate comonomer comprises a polyethylene glycol chain. In some embodiments, a comonomer comprises a moiety selected from: polyglycolic acid and polylactic acid chain. In some embodiments, a comonomer comprises a hydrocarbylene group wherein one or more methylene groups is optionally replaced by a group Y (provided that none of the Y groups are adjacent to each other), wherein each Y, independently for each occurrence, is selected from, substituted or unsubstituted aryl, heteroaryl, cycloalkyl, heterocycloalkyl, or —O—, C(=X) (wherein X is $NR_1$, O or S), —OC(O)—, —C(=O)O, —$NR_1$—, —$NR_1$CO—, —C(O)$NR_1$—, —S(O)$_n$—, (wherein n is 0, 1, or 2), —OC(O)—$NR_1$, —$NR_1$—C(O)—$NR_1$—, —$NR_1$1-C($NR_1$)—$NR_1$—, and —B(O$R_1$)—; and $R_1$, independently for each occurrence, represents H or a lower alkyl.

In some embodiments, a comonomer can be and/or can comprise a linker such as a linker described herein.

In some embodiments, a CDP comprises: cyclodextrin moieties, and comonomers which do not contain cyclodextrin moieties (comonomers), and wherein the CDP comprises at least four, five six, seven, eight, nine, ten, eleven, twelve, thirteen, fourteen, fifteen, sixteen, seventeen, eighteen, nineteen or twenty cyclodextrin moieties and at least four, five six, seven, eight, nine, ten, eleven, twelve, thirteen, fourteen, fifteen, sixteen, seventeen, eighteen, nineteen or twenty comonomers.

In some embodiments, the at least four, five six, seven, eight, etc., cyclodextrin moieties and at least four, five six, seven, eight, nine, ten, eleven, twelve, thirteen, fourteen, fifteen, sixteen, seventeen, eighteen, nineteen or twenty comonomers alternate in the water soluble linear polymer.

In some embodiments, the comonomer is a compound containing residues of least two functional groups through which reaction and thus linkage of the cyclodextrin monomers is achieved. In some embodiments, the functional groups, which may be the same or different, terminal or internal, of each comonomer comprise an amino, acid, imidazole, hydroxyl, thio, acyl halide, —HC=CH—, —C≡C— group, or derivative thereof. In some embodiments, the residues of the two functional groups are the same and are located at termini of the comonomer. In some embodiments, a comonomer contains one or more pendant groups with at least one functional group through which reaction and thus linkage of a therapeutic agent can be achieved. In some embodiments, the functional groups, which may be the same or different, terminal or internal, of each comonomer pendant group comprise an amino, acid, imidazole, hydroxyl, thiol, acyl halide, ethylene, ethyne group, or derivative thereof. In some embodiments, the pendant group is a substituted or unsubstituted branched, cyclic or straight chain $C_1$-$C_{10}$ alkyl, or arylalkyl optionally containing one or more heteroatoms within the chain or ring.

In some embodiments, the CDP comprises a comonomer selected from the group consisting of: an alkylene chain, polysuccinic anhydride, poly-L-glutamic acid, poly(ethyleneimine), an oligosaccharide, and an amino acid chain. In some embodiments, a comonomer comprises a polyethylene glycol chain. In some embodiments, the CDP comprises a comonomer selected from the group consisting of: polyglycolic acid and polylactic acid chain.

In some embodiments, a comonomer comprises a hydrocarbylene group wherein one or more methylene groups is optionally replaced by a group Y (provided that none of the Y groups are adjacent to each other), wherein each Y, independently for each occurrence, is selected from, substituted or unsubstituted aryl, heteroaryl, cycloalkyl, heterocycloalkyl, or —O—, C(=X) (wherein X is $NR_1$, O or S), —OC(O)—, —C(=O)O, —$NR_1$—, —$NR_1$CO—, —C(O)$NR_1$—, —S(O)$_n$—, (wherein n is 0, 1, or 2), —OC(O)—$NR_1$, —$NR_1$—C(O)—$NR_1$—, —$NR_1$1-C($NR_1$)—$NR_1$—, and —B(O$R_1$)—; and $R_1$, independently for each occurrence, represents H or a lower alkyl.

CDP-Linked Agent Conjugates

The process for precipitating a polymer such as a CDP-linked agent from a polymer-containing fluid provides cyclodextrin containing polymer ("CDP")-linked agent conjugates, wherein one or more linked agents are covalently attached to the CDP (e.g., either directly or through a linker).

The CDP-linked agent conjugate can include a therapeutic agent such that the CDP-linked agent conjugate can be used to treat an autoimmune disease, inflammatory disease, or cancer. Exemplary therapeutic agents that can be used in a conjugate described herein include the following: a topisomerase inhibitor, an anti-metabolic agent, a pyrimide analog, an alkylating agent, an anthracycline an anti-tumor antibiotic, a platinum based agent, a microtubule inhibitor, a proteasome inhibitor, and a corticosteroid.

In one embodiment, the CDP-linked agent conjugate has the following formula:

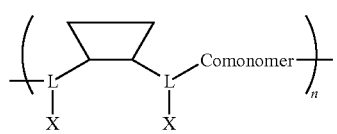

wherein each L is independently a linker, and each X is independently a therapeutic agent or a prodrug thereof, a bioactive agent or a precursor thereof, an adjuvant, a targeting ligand or a precursor thereof, or absent; and each comonomer is independently a comonomer described herein,

is a cyclodextrin wherein substitution at the bottom of the parallelogram indicates a substitution off of a primary hydroxyl group on the cyclodextrin and substitution at the top of the parallelogram indicates a substitution off a secondary hydroxyl group on the cyclodextrin, and n is at least 4, 5, 6, 7, 8, 9, 10, 11, 12, 13, 14, 15, 16, 17, 18, 19 or 20, provided that the polymer comprises at least one linked agent and in some embodiments, at least two linked agents. In some embodiments, the polymer comprises at least one therapeutic agent. In some embodiments, the polymer comprises at least one therapeutic agent and one diagnostic agent. In some embodiments, the molecular weight of the comonomer is from about 2000 to about 5000 Da (e.g., from about 3000 to about 4000 Da (e.g., about 3.4 kDa).

In some embodiments,

is alpha, beta or gamma cyclodextrin, e.g., beta cyclodextrin.

In some embodiments, the linked agent is a therapeutic agent described herein (e.g., a cytotoxic agent or an immunomodulator). The therapeutic agent can be attached to the CDP via a functional group such as a hydroxyl group, or where appropriate, an amino group. In some embodiments, one or more of the therapeutic agent in the CDP-linked agent conjugate can be replaced with another therapeutic agent, e.g., another cytotoxic agent or immunomodulator.

In some embodiments, the CDP-linked agent conjugate has the following formula:

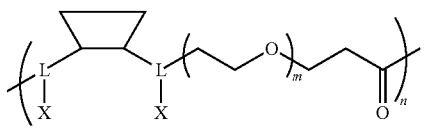

wherein each L is independently a linker, and each X is independently a linked agent or absent, provided that the polymer comprises at least one linked agent which is a therapeutic agent or a prodrug thereof, a bioactive agent or a precursor thereof, an adjuvant, a targeting ligand or a precursor thereof, and in some embodiments, at least two therapeutic agent moieties; and wherein the group

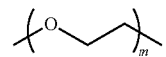

has a Mw of 3.4 kDa or less and n is at least 4, 5, 6, 7, 8, 9, 10, 11, 12, 13, 14, 15, 16, 17, 18, 19 or 20.

In some embodiments, the linked agent is a therapeutic agent described herein (e.g., a cytotoxic agent or an immunomodulator). The therapeutic agent can be attached to the CDP via a functional group such as a hydroxyl group, or where appropriate, an amino group. In some embodiments, one or more of the therapeutic agent in the CDP-linked agent conjugate can be replaced with another therapeutic agent, e.g., another cytotoxic agent or immunomodulator.

In some embodiments, less than all of the L moieties are attached to X moieties, meaning in some embodiments, at least one X is absent. In some embodiments, the loading of the X moieties on the CDP-linked agent conjugate is from about 1 to about 50% (e.g., from about 1 to about 40%, from about 1 to about 25%, from about 5 to about 20% or from about 5 to about 15%). In some embodiments, each L independently comprises an amino acid or a derivative thereof. In some embodiments, each L independently comprises a plurality of amino acids or derivatives thereof. In some embodiments, each L is independently a dipeptide or derivative thereof. In one embodiment, L is one or more of: alanine, arginine, histidine, lysine, aspartic acid, glutamic acid, serine, threonine, asparganine, glutamine, cysteine, glycine, proline, isoleucine, leucine, methionine, phenylalanine, tryptophan, tyrosine and valine.

In one embodiment, the CDP-linked agent conjugate (e.g., the CDP-cytotoxic agent conjugate) has the following formula:

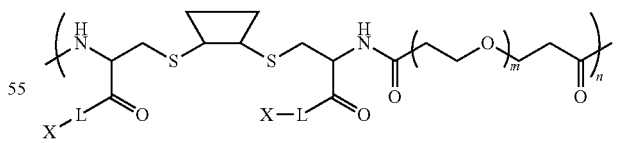

wherein each L is independently a linker or absent and each X is independently a linked agent or absent, and wherein the group

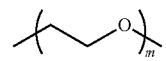

has a Mw of 5,000 Da or less (e.g., 3,400 Da) and n is at least 4, 5, 6, 7, 8, 9, 10, 11, 12, 13, 14, 15, 16, 17, 18, 19 or 20, provided that the polymer comprises at least one linked agent which is a therapeutic agent or a prodrug thereof (e.g., at least one cytotoxic agent immunomodulator, a prodrug thereof), bioactive agent or a precursor thereof, an adjuvant, a targeting ligand or a precursor thereof. When L and X or X is absent, the CDP-linked agent conjugate will comprise an —OH moiety can replace L-X or X. In one embodiment, the linked agent is a cytotoxic agent described herein. In one embodiment, the linked agent is an immunomodulator described herein.

In one embodiment, the CDP is not biodegradable. In one embodiment, the CDP is biodegradable. In one embodiment, the CDP is biocompatible. In one embodiment, the conjugate includes a combination of one or more therapeutic agents.

In one embodiment, each L of the CDP-linked agent conjugate (e.g., the CDP-cytotoxic agent conjugate) is independently an amino acid derivative. In one embodiment, at least a portion of the CDP is covalently attached to the therapeutic agent (e.g., the cytotoxic agent) through a cysteine moiety. In one embodiment, the linker comprises a moiety formed using "click chemistry" (e.g., as described in WO 2006/115547). In one embodiment, the linker comprises an amide bond, an ester bond, a disulfide bond, or a triazole. In one embodiment, the linker comprises a bond that is cleavable under physiological conditions. In one embodiment, the linker is hydrolysable under physiologic conditions or the linker is enzymatically cleavable under physiological conditions (e.g., the linker comprises a disulfide bond which can be reduced under physiological conditions). In one embodiment, the linker is not cleavable under physiological conditions. In one embodiment, at least a portion of the CDP is covalently attached to the therapeutic agent (e.g., the cytotoxic agent or immunomodulator) through a carboxy terminal of the therapeutic agent.

In one embodiment, the linked agents (e.g., the therapeutic agent which may be cytotoxic agents or immunomodulators) are from about 1 to about 100 weight % of the conjugate, e.g., from 1 to about 80 weight % of the conjugate, e.g., from 1 to about 70 weight % of the conjugate, e.g., from 1 to about 60 weight % of the conjugate, e.g., from 1 to about 50 weight % of the conjugate, e.g., from 1 to about 40 weight % of the conjugate, e.g., from 1 to about 30 weight % of the conjugate, e.g., from 1 to about 20 weight % of the conjugate, e.g., from 1 to about 10 weight % of the conjugate.

In one embodiment, the CDP-linked agent conjugate (e.g., the CDP-cytotoxic agent conjugate or immunomodulator) comprises a subunit of the following formula:

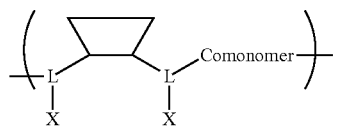

wherein each L is independently a linker, and each X is independently a linked agent or absent (e.g., X is —OH); and each comonomer is independently a comonomer described herein provided that the subunit comprises at least one therapeutic agent.

In one embodiment, the CDP-linked agent conjugate (e.g., the CDP-cytotoxic agent conjugate or immunomodulator) comprises a subunit of the following formula:

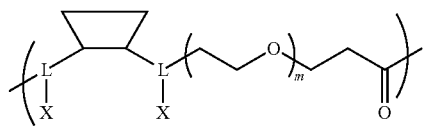

wherein each L is independently a linker, and each X is independently a linked agent or absent (e.g., X is —OH), provided that the subunit comprises at least one therapeutic agent or a prodrug thereof, a bioactive agent or a precursor thereof, an adjuvant, a targeting ligand or a precursor thereof; and wherein the group

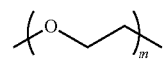

has a Mw of 3.4 kDa or less.

In one embodiment, the CDP-linked agent conjugate (e.g., the CDP-cytotoxic agent conjugate or immunomodulator) comprises a subunit of the following formula:

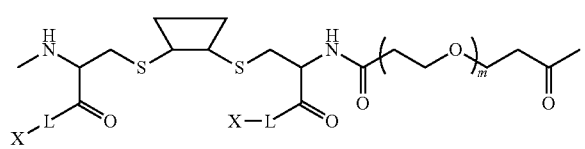

wherein each L is independently a linker and each X is independently a linked agent (e.g., a therapeutic agent which is a cytotoxic agent or a prodrug thereof) and wherein the group

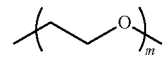

has a Mw of 5,000 Da or less (e.g., 3,400 Da), provided that the subunit comprises at least one X which is a therapeutic agent or a prodrug thereof, a bioactive agent or a precursor thereof, an adjuvant, a targeting ligand or a precursor thereof. In one embodiment, the cytotoxic agent is a cytotoxic agent described herein. In one embodiment, the immunomodulator is an immunomodulator described herein.

In some embodiments, each L independently comprises an amino acid or a derivative thereof. In some embodiments, at least one L comprises cysteine or a derivative thereof. In some embodiments, each L comprises cysteine. In some embodiments, each L is cysteine and the cysteine is connected to the CD by way of a thiol linkage.

In some embodiments, the CDP is a polymer of the following formula:

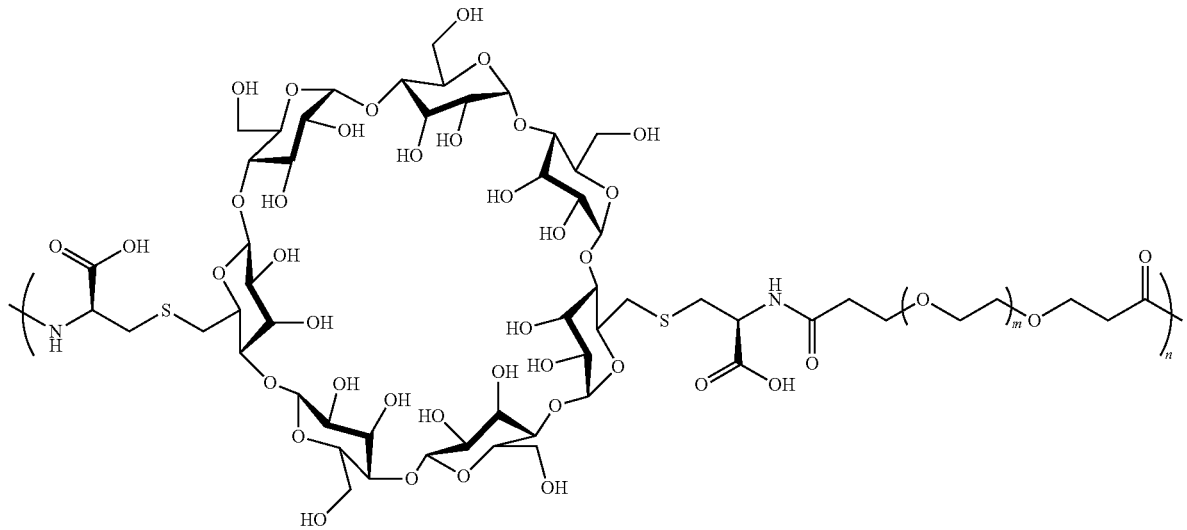

wherein
m is from about 50-100, or 70-80, or 75-08, or about 77. In some embodiments the group

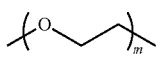

has a Mw of between about 3060 to about 3740, and in some embodiments, it has a Mw of 3.4 kDa or less and
n is at least 4, 5, 6, 7, 8, 9, 10, 11, 12, 13, 14, 15, 16, 17, 18, 19, or 20. In some embodiments, n is from about 10-18, and in some embodiments, n is about 14.

In some embodiments, the group

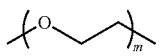

has a Mw of 3.4 kDa and the Mw of the compound as a whole is from 27,000 Da to 99,600 Da.

In one embodiment, the CDP is not biodegradable. In one embodiment, the CDP is biodegradable. In one embodiment, the CDP is biocompatible.

In one embodiment, the CDP-linked agent conjugate, e.g., the CDP-cytotoxic agent conjugate or the CDP-immunomodulator conjugate, e.g., a CDP-cytotoxic agent conjugate or CDP-immunomodulator conjugate described herein, forms an inclusion complex between a therapeutic agent attached or conjugated to the CDP, e.g., via a covalent linkage, and another moiety in the CDP (e.g., a cyclodextrin in the CDP) or a moiety (e.g., a cyclodextrin) in another CDP-linked agent conjugate. In one embodiment plurality of CDP-linked agent conjugates can form a particle (e.g., where the particle is self-assembled), e.g., through the formation of intramolecular or intermolecular inclusion complexes. In some embodiments, the zeta potential of the particle surface is from about −80 mV to about 50 mV, about −20 mV to about 20 mV, about −20 mV to about −10 mV, or about −10 mV to about 0.

Accordingly, in one embodiment the CDP-linked agent conjugate is represented by Formula I:

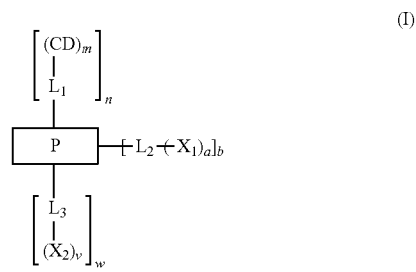

(I)

wherein
P represents a linear or branched polymer chain;
CD represents a cyclic moiety such as a cyclodextrin moiety;
$L_1$, $L_2$ and $L_3$, independently for each occurrence, may be absent or represent a linker group;
$X_1$ and $X_2$, independently for each occurrence, represents a linked agent or a prodrug thereof or is an —OH, wherein the conjugate contains at least one $X_1$ or $X_2$ which is a linked agent or a prodrug thereof;
T, independently for each occurrence, represents a targeting ligand or precursor thereof;
a, m, and v, independently for each occurrence, represent integers in the range of 1 to 10 (preferably 1 to 8, 1 to 5, or even 1 to 3);
n and w, independently for each occurrence, represent an integer in the range of 0 to about 30,000 (preferably <25,000, <20,000, <15,000, <10,000, <5,000, <1,000, <500, <100, <50, <25, <10, or even <5); and
b represents an integer in the range of 1 to about 30,000 (preferably <25,000, <20,000, <15,000, <10,000, <5,000, <1,000, <500, <100, <50, <25, <10, or even <5),
wherein either P comprises cyclodextrin moieties or n is at least 1.

In some embodiments, one or more of one type of therapeutic agent in the CDP-linked agent conjugate can be replaced with another, different type of linked agent such as a therapeutic agent, e.g., a cytotoxic agent or immunomodulator, bioactive agent, or targeting ligand. Examples of other cytotoxic agents are described herein. Examples of immunomodulators include a steroid, e.g., prednisone, and a NSAID.

In certain embodiments, P contains a plurality of cyclodextrin moieties within the polymer chain as opposed to the cyclodextrin moieties being grafted on to pendant groups off of the polymeric chain. Thus, in certain embodiments, the polymer chain of formula I further comprises n' units of U, wherein n' represents an integer in the range of 1 to about 30,000, e.g., from 4-100, 4-50, 4-25, 4-15, 6-100, 6-50, 6-25, and 6-15 (preferably <25,000, <20,000, <15,000, <10,000, <5,000, <1,000, <500, <100, <50, <25, <20, <15, <10, or even <5); and U is represented by one of the general formulae below:

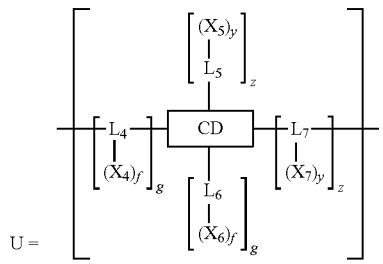

wherein

CD represents a cyclic moiety, such as a cyclodextrin moiety, or derivative thereof;

$L_4$, $L_5$, $L_6$, and $L_7$, independently for each occurrence, may be absent or represent a linker group;

$X_4$, $X_5$, $X_6$, and $X_7$, independently for each occurrence, represent the same or different linked agents or —OH, wherein U contains at least one $X_4$, $X_5$, $X_6$, and $X_7$, which is a linked agent;

f and y, independently for each occurrence, represent an integer in the range of 1 and 10; and g and z, independently for each occurrence, represent an integer in the range of 0 and 10.

In some embodiments, one g is 0 and one g is 1-10. In some embodiments, one z is 0 and one z is 1-10.

Preferably the polymer has a plurality of X. In some embodiments, at least 50% of the U units have at least one X which is a therapeutic agent or a prodrug thereof, a bioactive agent or a precursor thereof, an adjuvant, a targeting ligand or a precursor thereof. In some embodiments, several X are therapeutic agents and several other X are targeting ligands. In some embodiments, at least one X is one type of therapeutic agent, and at least one X is another type of therapeutic agents, e.g., another cytotoxic agent or immunomodulator.

In preferred embodiments, $L_4$ and $L_7$ represent linker groups.

In some embodiments, the X moieties are therapeutic agents or prodrugs thereof and/or targeting ligands and the moiety U is described by:

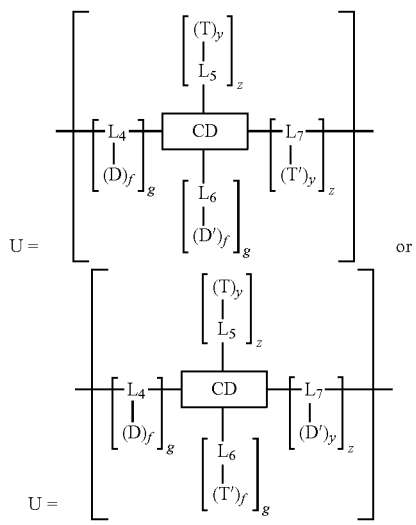

D and D', independently for each occurrence, represent the same or different therapeutic agent or prodrug forms thereof or —OH, wherein U contains at least one D or D' which is a therapeutic agent or prodrug form thereof;

T and T', independently for each occurrence, represent the same or different targeting ligand or precursor thereof or —OH, wherein U contains at least one T or TD' which is a targeting ligand or precursor thereof;

Preferably the polymer has a plurality of D or D' moieties. In some embodiments, at least 50% of the U units have at least one D or D'. In some embodiments, one or more of one type of therapeutic agent in the CDP-linked agent conjugate can be replaced with another, different type of therapeutic agent, e.g., another cytotoxic agent or immunomodulator.

The CDP may include a polycation, polyanion, or non-ionic polymer. A polycationic or polyanionic polymer has at least one site that bears a positive or negative charge, respectively. In certain such embodiments, at least one of the linker moiety and the cyclic moiety comprises such a charged site, so that every occurrence of that moiety includes a charged site. In some embodiments, the CDP is biocompatible.

In certain embodiments, the CDP may include polysaccharides, and other non-protein biocompatible polymers, and combinations thereof, that contain at least one terminal hydroxyl group, such as polyvinylpyrrollidone, poly(ethylene glycol) (PEG), polysuccinic anhydride, polysebacic acid, PEG-phosphate, polyglutamate, polyethylenimine, maleic anhydride divinylether (DIVMA), cellulose, pullulans, inulin, polyvinyl alcohol (PVA), N-(2-hydroxypropyl) methacrylamide (HPMA), dextran and hydroxyethyl starch (HES), and have optional pendant groups for grafting therapeutic agents, targeting ligands and/or cyclodextrin moieties. In certain embodiments, the polymer may be biodegradable such as poly(lactic acid), poly(glycolic acid), poly (alkyl 2-cyanoacrylates), polyanhydrides, and polyorthoesters, or bioerodible such as polylactide-glycolide copolymers, and derivatives thereof, non-peptide polyaminoacids, polyiminocarbonates, poly alpha-amino acids, polyalkyl-cyano-acrylate, polyphosphazenes or acyloxymethyl poly aspartate and polyglutamate copolymers and mixtures thereof.

In another embodiment the CDP-linked agent conjugate is represented by Formula II:

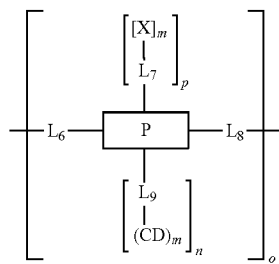

(II)

wherein

P represents a monomer unit of a polymer that comprises cyclodextrin moieties;

X, independently for each occurrence, represents a linked agent or —OH, wherein the conjugate contains at least one X is a linked agent;

$L_6$, $L_7$, $L_8$, and $L_9$, independently for each occurrence, may be absent or represent a linker group;

CD, independently for each occurrence, represents a cyclodextrin moiety or a derivative thereof;

m, independently for each occurrence, represents an integer in the range of 1 to 10 (preferably 1 to 8, 1 to 5, or even 1 to 3);

o represents an integer in the range of 1 to about 30,000 (preferably <25,000, <20,000, <15,000, <10,000, <5,000, <1,000, <500, <100, <50, <25, <10, or even <5); and p, and n, independently for each occurrence, represent an integer in the range of 0 to 10 (preferably 0 to 8, 0 to 5, 0 to 3, or even 0 to about 2), wherein CD and X are preferably each present at least 1 location (preferably at least 5, 10, 25, or even 50 or 100 locations) in the compound and further whereih X is a therapeutic agent or a prodrug thereof.

In some embodiments, one or more of the therapeutic agents in the CDP-linked agent conjugate can be replaced with another, different therapeutic agent, e.g., another cytotoxic agent or immunomodulator. Examples of cytotoxic agents are described herein. Examples of immunomodulators include a steroid, e.g., prednisone, or a NSAID.

In another embodiment the CDP-linked agent conjugate is represented either of the formulae below:

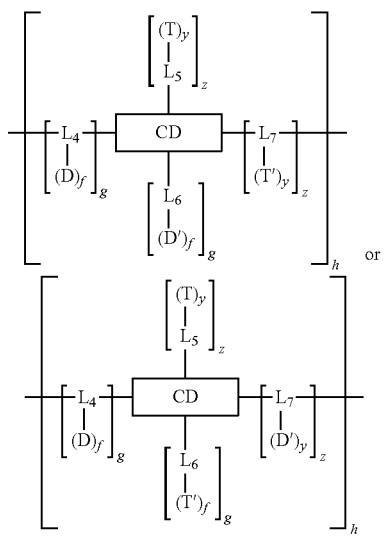

wherein

CD represents a cyclic moiety, such as a cyclodextrin moiety, or derivative thereof;

$L_4$, $L_5$, $L_6$, and $L_7$, independently for each occurrence, may be absent or represent a linker group;

D and D', independently for each occurrence, represent the same or different therapeutic agent or an —OH, wherein the conjugate contains at least one D or D' which is a therapeutic agent;

T and T', independently for each occurrence, represent the same or different targeting ligand or precursor thereof or an —OH, wherein the conjugate contains at least one T or T' which is a targeting ligand or precursor thereof;

f and y, independently for each occurrence, represent an integer in the range of 1 and 10 (preferably 1 to 8, 1 to 5, or even 1 to 3);

g and z, independently for each occurrence, represent an integer in the range of 0 and 10 (preferably 0 to 8, 0 to 5, 0 to 3, or even 0 to about 2); and h represents an integer in the range of 1 and 30,000, e.g., from 4-100, 4-50, 4-25, 4-15, 6-100, 6-50, 6-25, and 6-15 (preferably <25,000, <20,000, <15,000, <10,000, <5,000, <1,000, <500, <100, <50, <25, <20, <15, <10, or even <5), wherein at least one occurrence (and preferably at least 5, 10, or even at least 20, 50, or 100 occurrences) of g represents an integer greater than 0.

In some embodiments, one g is 0 and one g is 1-10. In some embodiments, one z is 0 and one z is 1-10.

Preferably the polymer has a plurality of D or D' moieties. In some embodiments, at least 50% of the polymer repeating units have at least one D or D'. In some embodiments, one or more of the therapeutic agent in the CDP-linked agent conjugate can be replaced with another therapeutic agent, e.g., another cytotoxic agent or immunomodulator.

In preferred embodiments, L4 and L7 represent linker groups.

In certain such embodiments, the CDP comprises cyclic moieties alternating with linker moieties that connect the cyclic structures, e.g., into linear or branched polymers, preferably linear polymers. The cyclic moieties may be any suitable cyclic structures, such as cyclodextrins, crown ethers (e.g., 18-crown-6,15-crown-5,12-crown-4, etc.), cyclic oligopeptides (e.g., comprising from 5 to 10 amino acid residues), cryptands or cryptates (e.g., cryptand [2.2.2], cryptand-2,1,1, and complexes thereof), calixarenes, or cavitands, or any combination thereof. Preferably, the cyclic structure is (or is modified to be) water-soluble. In certain embodiments, e.g., for the preparation of a linear polymer, the cyclic structure is selected such that under polymerization conditions, exactly two moieties of each cyclic structure are reactive with the linker moieties, such that the resulting polymer comprises (or consists essentially of) an alternating series of cyclic moieties and linker moieties, such as at least four of each type of moiety. Suitable difunctionalized cyclic moieties include many that are commercially available and/ or amenable to preparation using published protocols. In certain embodiments, conjugates are soluble in water to a concentration of at least 0.1 g/mL, preferably at least 0.25 g/mL.

Thus, in certain embodiments, compositions of therapeutic cyclodextrin-containing polymeric compounds designed for delivery of a therapeutic agent, their precipitation, and described herein. In certain embodiments, these CDPs improve drug stability and/or solubility, and/or reduce toxicity, and/or improve efficacy of the therapeutic agent when used in vivo. Furthermore, by selecting from a variety of linker groups, and/or targeting ligands, the rate of therapeutic agent release from the CDP can be attenuated for controlled delivery.

Disclosed herein are various types of linear, branched, or grafted CDPs wherein a therapeutic agent is covalently bound to the polymer. In certain embodiments, the therapeutic agent is covalently linked via a biohydrolyzable bond, for example, an ester, amide, carbamates, or carbonate. General strategies for synthesizing linear, branched or grafted cyclodextrin-containing polymers (CDPs) for loading therapeutic agents, and optional targeting ligands are described in U.S. Pat. Nos. 7,270,808, 6,509,323, 7,091,192, 6,884,789, U.S. Publication Nos. 20040087024, 20040109888 and 20070025952, all of which are incorporated by reference in their entireties.

In certain embodiments, the CDP comprises a linear cyclodextrin-containing polymer, e.g., the polymer backbone includes cyclodextrin moieties. For example, the polymer may be a water-soluble, linear cyclodextrin polymer produced by providing at least one cyclodextrin derivative modified to bear one reactive site at each of exactly two positions, and reacting the cyclodextrin derivative with a linker having exactly two reactive moieties capable of forming a covalent bond with the reactive sites under polymerization conditions that promote reaction of the reactive sites with the reactive moieties to form covalent bonds between the linker and the cyclodextrin derivative, whereby a linear polymer comprising alternating units of cyclodextrin derivatives and linkers is produced. Alternatively the polymer may be a water-soluble, linear cyclodextrin polymer having a linear polymer backbone, which polymer comprises a plurality of substituted or unsubstituted cyclodextrin moieties and linker moieties in the linear polymer backbone, wherein each of the cyclodextrin moieties, other than a cyclodextrin moiety at the terminus of a polymer chain, is attached to two of said linker moieties, each linker moiety covalently linking two cyclodextrin moieties. In yet another embodiment, the polymer is a water-soluble, linear cyclodextrin polymer comprising a plurality of cyclodextrin moieties covalently linked together by a plurality of linker moieties, wherein each cyclodextrin moiety, other than a cyclodextrin moiety at the terminus of a polymer chain, is attached to two linker moieties to form a linear cyclodextrin polymer.

In some embodiments, the CDP-linked agent conjugate comprises a water soluble linear polymer conjugate comprising: cyclodextrin moieties; comonomers which do not contain cyclodextrin moieties (comonomers); and a plurality of therapeutic agents; wherein the CDP-linked agent conjugate comprises at least four, five six, seven, eight, etc., cyclodextrin moieties and at least four, five six, seven, eight, etc., comonomers. In some embodiments, the therapeutic agent is a therapeutic agent described herein, e.g., the CDP-linked agent conjugate is a CDP-cytotoxic agent conjugate, e.g., CDP-topoisomerase inhibitor conjugate, e.g., a CDP-topoisomerase inhibitor I conjugate (e.g., a CDP-camptothecin conjugate, CDP-irinotecan conjugate, CDP-SN-38 conjugate, CDP-topotecan conjugate, CDP-lamellarin D conjugate, a CDP-lurotecan conjugate, particle or composition, a CDP-exatecan conjugate, particle or composition, a CDP-diflomotecan conjugate, particle or composition, and CDP-topoisomerase I inhibitor conjugates which include derivatives of camptothecin, irinotecan, SN-38, lamellarin D, lurotecan, exatecan, and diflomotecan), a CDP-topoisomerase II inhibitor conjugate (e.g., a CDP-eptoposide conjugate, CDP-tenoposide conjugate, CDP-amsacrine conjugate and CDP-topoisomerase II inhibitor conjugates which include derivatives of etoposide, tenoposide, and amsacrine), a CDP-anti-metabolic agent conjugate (e.g., a CDP-antifolate conjugate (e.g., a CDP-pemetrexed conjugate, a CDP-floxuridine conjugate, a CDP-raltitrexed conjugate) or a CDP-pyrimidine analog conjugate (e.g., a CDP-capecitabine conjugate, a CDP-cytarabine conjugate, a CDP-gemcitabine conjugate, a CDP-5FU conjugate)), a CDP-alkylating agent conjugate, a CDP-anthracycline conjugate, a CDP-anti-tumor antibiotic conjugate (e.g., a CDP-HSP90 inhibitor conjugate, e.g., a CDP-geldanamycin conjugate, a CDP-tanespimycin conjugate or a CDP-alvespimycin conjugate), a CDP-platinum based agent conjugate (e.g., a CDP-cisplatin conjugate, a CDP-carboplatin conjugate, a CDP-oxaliplatin conjugate), a CDP-microtubule inhibitor conjugate, a CDP-kinase inhibitor conjugate (e.g., a CDP-seronine/threonine kinase inhibitor conjugate, e.g., a CDP-mTOR inhibitor conjugate, e.g., a CDP-rapamycin conjugate) or a a CDP-proteasome inhibitor conjugate (e.g., CDP-boronic acid containing molecule conjugate, e.g., a CDP-bortezomib conjugate) or a CDP-immunomodulator conjugate (e.g., a CDP-corticosteroid or a CDP-rapamycin analog conjugate).

The therapeutic agent can be attached to the CDP via a functional group such as a hydroxyl group, or where appropriate, an amino group.

In some embodiments, one or more of one type of therapeutic agent in the CDP-linked agent conjugate can be replaced with another, different type of therapeutic agent, e.g., another anticancer agent or anti-inflammatory agent.

In some embodiments, the least four cyclodextrin moieties and at least four comonomers alternate in the CDP-linked agent conjugate. In some embodiments, the therapeutic agents are cleaved from said CDP-linked agent conjugate under biological conditions to release the therapeutic agent. In some embodiments, the cyclodextrin moieties comprise linkers to which therapeutic agents are linked. In some embodiments, the therapeutic agents are attached via linkers.

In some embodiments, the comonomer comprises residues of at least two functional groups through which reaction and linkage of the cyclodextrin monomers was achieved. In some embodiments, the functional groups, which may be the same or different, terminal or internal, of each comonomer comprise an amino, acid, imidazole, hydroxyl, thio, acyl halide, —HC=CH—, —C≡C— group, or derivative thereof. In some embodiments, the two functional groups are the same and are located at termini of the comonomer precursor. In some embodiments, a comonomer contains one or more pendant groups with at least one functional group through which reaction and thus linkage of a therapeutic agent was achieved. In some embodiments, the functional groups, which may be the same or different, terminal or internal, of each comonomer pendant group comprise an amino, acid, imidazole, hydroxyl, thiol, acyl halide, ethylene, ethyne group, or derivative thereof. In some embodiments, the pendant group is a substituted or unsubstituted branched, cyclic or straight chain C1-C10 alkyl, or arylalkyl optionally containing one or more heteroatoms within the chain or ring. In some embodiments, the cyclodextrin moiety comprises an alpha, beta, or gamma cyclodextrin moiety. In some embodiments, the therapeutic agent is at least 5%, 10%, 15%, 20%, 25%, 30%, or 35% by weight of CDP-linked agent conjugate.

In some embodiments, the comonomer comprises polyethylene glycol of molecular weight 3,400 Da, the cyclodextrin moiety comprises beta-cyclodextrin, the theoretical maximum loading of a therapeutic agent such as a topoisomerase inhibitor on a CDP-linked agent conjugate (e.g., a CDP-topoisomerase inhibitor conjugate) is 25% (e.g., 20%, 15%, 13%, or 10%) by weight, and the therapeutic agent (e.g., a topoisomerase inhibitor) is 4-20% by weight (e.g., 6-10% by weight) of CDP-linked agent conjugate (e.g., CDP-topoisomerase inhibitor conjugate). In some embodiments, the therapeutic agent (e.g., a topoisomerase inhibitor) is poorly soluble in water. In some embodiments, the solubility of the therapeutic agent (e.g., a topoisomerase inhibitor) is <5 mg/ml at physiological pH. In some embodiments, the therapeutic agent (e.g., a topoisomerase inhibitor) is a hydrophobic compound with a log P>0.4, >0.6, >0.8, >1, >2, >3, >4, or >5.

In some embodiments, the therapeutic agent is attached to the CDP via a second compound (e.g., a linker).

In some embodiments, administration of the CDP-linked agent conjugate to a subject results in release of the therapeutic agent over a period of at least 6 hours. In some embodiments, administration of the CDP-linked agent conjugate to a subject results in release of the thereapeutic agent over a period of 2 hours, 3 hours, 5 hours, 6 hours, 8 hours, 10 hours, 15 hours, 20 hours, 1 day, 2 days, 3 days, 4 days, 7 days, 10 days, 14 days, 17 days, 20 days, 24 days, 27 days up to a month. In some embodiments, upon administration of the CDP-linked agent conjugate to a subject, the rate of therapeutic agent release is dependent primarily upon the rate of hydrolysis of the therapeutic agent as opposed to enzymatic cleavage.

In some embodiments, the CDP-linked agent conjugate has a molecular weight of 10,000-500,000 Da (e.g., 20,000-300,000, 30,000-200,000, or 40,000-200,000, or 50,000-100,000). In some embodiments, the cyclodextrin moieties make up at least about 2%, 5%, 10%, 20%, 30%, 50% or 80% of the CDP-linked agent conjugate by weight.

In some embodiments, the CDP-linked agent conjugate is made by a method comprising providing cyclodextrin moiety precursors modified to bear one reactive site at each of exactly two positions, and reacting the cyclodextrin moiety precursors with comonomer precursors having exactly two reactive moieties capable of forming a covalent bond with the reactive sites under polymerization conditions that promote reaction of the reactive sites with the reactive moieties to form covalent bonds between the comonomers and the cyclodextrin moieties, whereby a CDP comprising alternating units of a cyclodextrin moiety and a comonomer is produced. In some embodiments, the cyclodextrin moiety precursors are in a composition, the composition being substantially free of cyclodextrin moieties having other than two positions modified to bear a reactive site (e.g., cyclodextrin moieties having 1, 3, 4, 5, 6, or 7 positions modified to bear a reactive site).

In some embodiments, a comonomer of the CDP-linked agent conjugate comprises a moiety selected from the group consisting of: an alkylene chain, polysuccinic anhydride, poly-L-glutamic acid, poly(ethyleneimine), an oligosaccharide, and an amino acid chain. In some embodiments, a CDP-linked agent conjugate comonomer comprises a polyethylene glycol chain. In some embodiments, a comonomer comprises a moiety selected from: polyglycolic acid and polylactic acid chain. In some embodiments, a comonomer comprises a hydrocarbylene group wherein one or more methylene groups is optionally replaced by a group Y (provided that none of the Y groups are adjacent to each other), wherein each Y, independently for each occurrence, is selected from, substituted or unsubstituted aryl, heteroaryl, cycloalkyl, heterocycloalkyl, or —O—, C(=X) (wherein X is $NR_1$, O or S), —OC(O)—, —C(=O)O, —$NR_1$—, —$NR_1$CO—, —C(O)$NR_1$—, —S(O)$_n$— (wherein n is 0, 1, or 2), —OC(O)—$NR_1$, —$NR_1$—C(O)— $NR_1$—, —$NR_1$1—C($NR_1$)—$NR_1$—, and —B($OR_1$)—; and $R_1$, independently for each occurrence, represents H or a lower alkyl.

In some embodiments, the CDP-linked agent conjugate is a polymer having attached thereto a plurality of X moieties of the following formula:

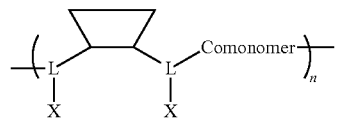

wherein each L is independently a linker, and each X is independently a therapeutic agent, a prodrug derivative thereof, or absent; and each comonomer is independently a comonomer described herein, and n is at least 4, 5, 6, 7, 8, 9, 10, 11, 12, 13, 14, 15, 16, 17, 18, 19 or 20, provided that the polymer comprises at least one therapeutic agent and in some embodiments, at least two therapeutic agent. In some embodiments, the molecular weight of the comonomer is from about 2000 to about 5000 Da (e.g., from about 3000 to about 4000 Da (e.g., about 3.4 kDa).

In some embodiments, the therapeutic agent is a therapeutic agent described herein. The therapeutic agent can be attached to the CDP via a functional group such as a hydroxyl group, or where appropriate, an amino group. In some embodiments, one or more of the therapeutic agent in the CDP-linked agent conjugate can be replaced with another therapeutic agent, e.g., another cytotoxic agent or immunomodulator.

In some embodiments, the CDP-linked agent conjugate is a polymer having attached thereto a plurality of X moieties of the following formula:

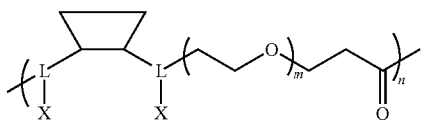

wherein each L is independently a linker, and each X is independently a linked agent or absent, provided that the polymer comprise at least one linked agent which is a therapeutic agent or a prodrug thereof, a bioactive agent or a precursor thereof, an adjuvant, a targeting ligand or a precursor thereof and in some embodiments, at least two therapeutic agent; and
wherein the group

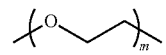

has a Mw of 3.4 kDa or less and n is at least 4, 5, 6, 7, 8, 9, 10, 11, 12, 13, 14, 15, 16, 17, 18, 19 or 20.

In some embodiments, the therapeutic agent is a therapeutic agent described herein. The therapeutic agent can be attached to the CDP via a functional group such as a hydroxyl group, or where appropriate, an amino group. In some embodiments, one or more of the therapeutic agent in the CDP-linked agent conjugate can be replaced with another therapeutic agent, e.g., another cytotoxic agent or immunomodulator.

In some embodiments, less than all of the L moieties are attached to X moieties, meaning in some embodiments, at least one X is absent. In some embodiments, the loading of the X moieties on the CDP-linked agent conjugate is from about 1 to about 50% (e.g., from about 1 to about 40%, from about 1 to about 25%, from about 5 to about 20% or from about 5 to about 15%). In some embodiments, each L independently comprises an amino acid or a derivative thereof. In some embodiments, each L independently comprises a plurality of amino acids or derivatives thereof. In some embodiments, each L is independently a dipeptide or derivative thereof. In one embodiment, L is one ore more of: alanine, arginine, histidine, lysine, aspartic acid, glutamic acid, serine, threonine, asparganine, glutamine, cysteine, glycine, proline, isoleucine, leucine, methionine, phenylalanine, tryptophan, tyrosine and valine.

In some embodiments, the CDP-linked agent conjugate is a polymer having attached thereto a plurality of L-X moieties of the following formula:

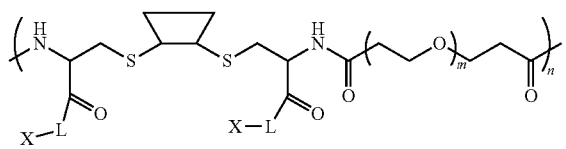

wherein each L is independently a linker or absent and each X is independently a linked agent or absent and wherein the group

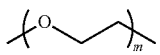

has a Mw of 3.4 kDa or less and n is at least 4, 5, 6, 7, 8, 9, 10, 11, 12, 13, 14, 15, 16, 17, 18, 19 or 20, provided that the polymer comprises at least one therapeutic agent and in some embodiments, at least two therapeutic agent.

In some embodiments, less than all of the C(=O) moieties are attached to L-X moieties, meaning in some embodiments, at least one L and/or X is absent. For example, if only X is absent and L is a glycine, L will comprise —NH—CH$_2$—C(=O)OH and if both L and AX are absent, the L-X moiety is an —OH. In some embodiments, the loading of the L, X and/or L-X moieties on the CDP-linked agent conjugate is from about 1 to about 50% (e.g., from about 1 to about 40%, from about 1 to about 25%, from about 5 to about 20% or from about 5 to about 15%). In some embodiments, the loading of the L, X and/or L-X moieties on the CDP-linked agent conjugate is from about 25 to about 100% (e.g., from about 50 to about 100%, or from about 75% to about 100%). In some embodiments, each L is independently an amino acid or derivative thereof. In some embodiments, each L is glycine or a derivative thereof. In some embodiments, the loading of the X moiety onto the polymer backbone is from about 6% to about the theoretical maximum. In some embodiments, it is from about 6% to about 13%.

In some embodiments, one or more of the therapeutic agent in the CDP-linked agent conjugate can be replaced with another therapeutic agent, e.g., another cytotoxic agent or immunomodulator.

In some embodiments, the CDP-linked agent conjugate is a polymer having the following formula:

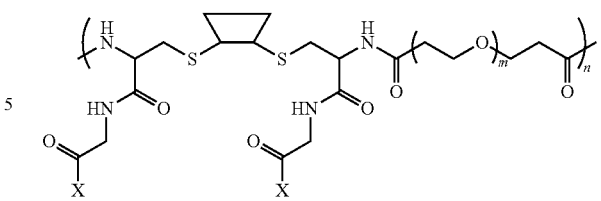

wherein X is independently a linked agent or absent, the group

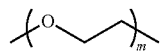

has a Mw of 3.4 kDa or less and n is at least 4, 5, 6, 7, 8, 9, 10, 11, 12, 13, 14, 15, 16, 17, 18, 19 or 20, provided that the polymer comprises at least one therapeutic agent and in some embodiments, at least two therapeutic agent.

In some embodiments, less than all of the C(=O) moieties are attached to

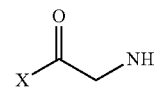

moieties, meaning in some embodiments,

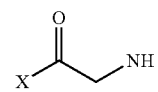

is absent, provided that the polymer comprises at least one linked agent which is a therapeutic agent and in some embodiments, at least two therapeutic agent. In some embodiments, the loading of the

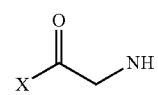

moieties on the CDP-linked agent conjugate is from about 1 to about 50% (e.g., from about 1 to about 40%, from about 1 to about 25%, from about 5 to about 20% or from about 5 to about 15%).

In some embodiments, one or more of the therapeutic agent in the CDP-linked agent conjugate can be replaced with another therapeutic agent, e.g., another cytotoxic agent or immunomodulator.

In some embodiments, the CDP-linked agent conjugate will contain a therapeutic agent and at least one additional therapeutic agent (e.g., a first and second therapeutic agent where the first and second therapeutic agents are different therapeutic agents). For instance, a therapeutic agent described herein and one more different cancer drugs, an immunosuppressant, an antibiotic or an anti-inflammatory agent may be grafted on to the polymer via optional linkers. By selecting different linkers for different drugs, the release of each drug may be attenuated to achieve maximal dosage and efficacy.

In some embodiments, the cyclodextrin-based polymer is represented by the following structure:

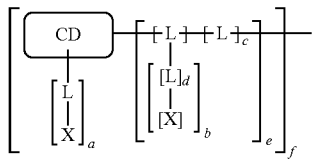

wherein CD is a cyclodextrin;
each L is independently a linker moiety;
each X is independently a linked agent which may be therapeutic agent or a prodrug thereof, a bioactive agent or a precursor thereof, an adjuvant, a targeting ligand or a precursor thereof, or a reactive group;
a is an integer between 0 and 10, preferably 0, 1, or 2;
b is 0 or 1;
c is 0-30,000, preferably <25,00, <20,000, <15,000, <10,000, <5,000, <1,000, <500, <100, >10, >50, or preferably between 75 and 80;
d is an integer between 0 and 10, preferably 0-5, or 0-1;
e is an integer between 1 and 5, preferably 2-5, 2-3, or 2, wherein a+e is limited by the size of the cyclodextrin (e.g., for β-CD, a+e is between 2 and 7); and
f is 1-10,000, preferably 1-1000, 2-100, 2-50, 4-30, preferably between 10 and 20.

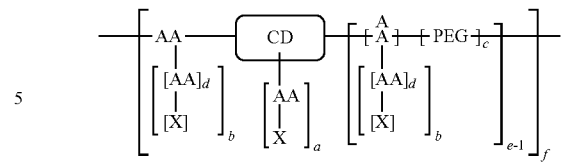

wherein CD is a cyclodextrin,
each AA is independently an amino acid,
PEG poly ethylene glycol,
each X is independently a linked agent,
and a, b, c, d, e, and f are as described above.

In some embodiments, a is 0. In other embodiments, a is 0, each b is 1, each d is 1, and e is 2. In some embodiments, AA is selected from the natural amino acids. In some embodiments, each AA is independently Cys, Gly, or a peptide containing Cys or Gly. In some embodiments, PEG has a molecular weight of between 1000 and 5000 Da, or approximately 3.4 kDa. In some embodiments, f is 10-20.

In other embodiments, the polymer is a polymer as described in U.S. Pat. No. 7,270,808, herein incorporated by reference. In some particular embodiments, the polymer is the compound of Formula II as described in U.S. Pat. No. 7,270,808.

In some embodiments, the cyclodextrin-based polymer is represented by the following structure:

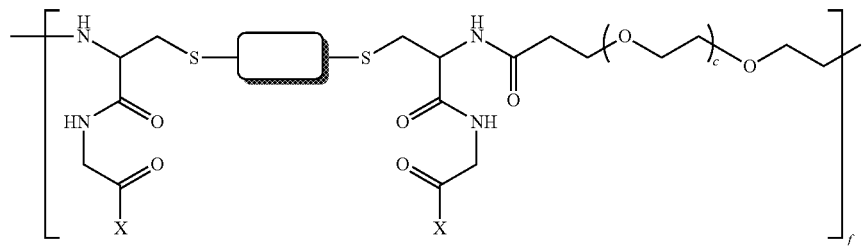

wherein CD is a cyclodextrin,
each x is independently a linked agent,
c is 0-30,000, preferably <25,00, <20,000, <15,000, <10,000, <5,000, <1,000, <500, <100, >10, >50, or preferably between 75 and 80, and
f is 1-10,000, preferably 1-1000, 2-100, 2-50, 4-30, preferably between 10 and 20.

Characteristics of CDP-Linked Agent Conjugates

In some embodiments, the CDP and/or CDP-linked agent conjugate, particle or composition as described herein have polydispersities less than about 3, or even less than about 2 (e.g., 1.5, 1.25, or less).

One embodiment provides an improved delivery of certain therapeutic agents by covalently attaching one or more therapeutic agents to a CDP. Such conjugation can improve the aqueous solubility and hence the bioavailability of the therapeutic agent.

In certain embodiments as disclosed herein, the CDP-linked agent conjugate has a number average ($M_n$) molecular weight between 1,000 and 500,000 Da, or between 5,000 and 200,000 Da, or between 30,000 to 100,000 Da., or between 10,000-100,000 Da. One method to determine molecular weight is by gel permeation chromatography ("GPC"), e.g., mixed bed columns, $CH_2Cl_2$ or HFIP (hexafluoroisopropanol) solvent, light scattering detector, and off-line do/dc. Other methods are known in the art.

In some embodiments, the cyclodextrin-based polymer is represented by the following structure:

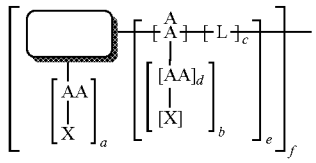

wherein CD is a cyclodextrin;

each AA is independently an amino acid;

L is a linker moiety;

each X is independently a linked agent;

and a, b, c, d, e, and f are as described above.

In some embodiments, L is an ethylene glycol, a is 0, and b is 1. In other embodiments, a is 0, b is 1, d is 1, and e is 2. In some embodiments, AA is selected from the natural amino acids. In some embodiments, each AA is independently Cys, Gly.

In some embodiments, the cyclodextrin-based polymer is represented by the following structure:

In some embodiments, the cyclodextrin moieties make up at least about 2%, 5%, 10%, 11%, 12%, 13%, 14%, 15%, 16%, 17%, 18%, 19%, 20%, 30%, 50% or 80% of the polymer by weight.

In certain embodiments as disclosed herein, the CDP-linked agent conjugate, particle or composition is biodegradable or bioerodable.

In certain embodiments as disclosed herein, the linked agent makes up at least 3% (e.g., at least about 5%) by weight of the CDP-linked agent, conjugate, or particle. In certain embodiments, the linked agent makes up at least 20% by weight of the CDP-linked agent conjugate. In certain embodiments, the linked agent makes up at least 5%, 10%, 15%, or at least 20% by weight of the CDP-linked agent, conjugate, or particle.

In certain embodiments as disclosed herein, the linked agent is a therapeutic agent or a prodrug thereof and the therapeutic agent makes up at least 3% (e.g., at least about 5%) by weight of the CDP-linked agent conjugate or particle. In certain embodiments, a therapeutic agent or a prodrug thereof makes up at least 20% by weight of the CDP-linked agent conjugate. In certain embodiments, the a therapeutic agent or a prodrug thereof makes up at least 5%, 10%, 15%, or at least 20% by weight of the CDP-linked agent, conjugate, or particle.

In certain embodiments as disclosed herein, the linked agent is a bioactive agent or a precursor thereof, and the bioactive agent or a precursor thereof makes up at least 3% (e.g., at least about 5%) by weight of the CDP-linked agent, conjugate, or particle. In certain embodiments, the bioactive agent or a precursor thereof makes up at least 20% by weight of the CDP-linked agent conjugate. In certain embodiments, the a bioactive agent or a precursor thereof makes up at least 5%, 10%, 15%, or at least 20% by weight of the CDP-linked agent, conjugate, or particle.

In certain embodiments as disclosed herein, the linked agent is a targeting ligand or precursor thereof, and the targeting ligand or a precursor thereof makes up at least 3% (e.g., at least about 5%) by weight of the CDP-linked agent conjugate or particle. In certain embodiments, the targeting ligand or a precursor thereof makes up at least 20% by weight of the CDP-linked agent conjugate. In certain embodiments, the a targeting ligand or a precursor thereof makes up at least 5%, 10%, 15%, or at least 20% by weight of the CDP-linked agent, conjugate, or particle.

Methods of Making CDP Conjugates

Generally, the CDP-linked agent conjugates described herein can be prepared in one of two ways: monomers bearing therapeutic agents, targeting ligands, and/or cyclodextrin moieties can be polymerized; or polymer backbones can be derivatized with therapeutic agents, targeting ligands, and/or cyclodextrin moieties.

In one embodiment, the synthesis of the CDP-linked agent conjugates can be accomplished by reacting monomers M-L-CD and M-L-X, wherein CD represents a cyclic moiety, such as a cyclodextrin molecule, or derivative thereof;

L, independently for each occurrence, may be absent or represents a linker group;

X, independently for each occurrence, represents the same or different linked agent which is a therapeutic agent or a prodrug thereof, a bioactive agent or a precursor thereof, an adjuvant, a targeting ligand or a precursor thereof; and M represents a monomer subunit bearing one or more reactive moieties capable of undergoing a polymerization reaction with one or more other M in the monomers in the reaction mixture, under conditions that cause polymerization of the monomers to take place.

In some embodiments, the linked agent is a therapeutic agent or a prodrug thereof, or a targeting ligand or a precursor thereof. In some embodiments, the linked agent is a therapeutic agent or targeting ligand.

In some embodiments, one or more of the linked agents in the CDP-linked agent conjugate can be replaced with another linked agent, e.g., another cytotoxic agent or immunomodulator.

In certain embodiments, the reaction mixture may further comprise monomers that do not bear CD, X moieties, e.g., to space the derivatized monomer units throughout the polymer.

In an alternative embodiment, a CDP-linked agent conjugate by reacting a polymer P (the polymer bearing a plurality of reactive groups, such as carboxylic acids, alcohols, thiols, amines, epoxides, etc.) with reactive group X-L-CD and/or Y-L-D (and, optionally, Z-L-T) is made, wherein CD represents a cyclic moiety, such as a cyclodextrin molecule, or derivative thereof;

L, independently for each occurrence, may be absent or represents a linker group;

D, independently for each occurrence, represents the same or different therapeutic agent or prodrug thereof;

T, independently for each occurrence, represents the same or different targeting ligand or precursor thereof;

X, independently for each occurrence, represents a linked group which is a reactive group such as carboxylic acids, alcohols, thiols, amines, epoxides, etc., capable of forming a covalent bond with a reactive group of the polymer; and Y and Z, independently for each occurrence, represent inclusion hosts or reactive groups, such as carboxylic acids, alcohols, thiols, amines, epoxides, etc., capable of forming a covalent bond with a reactive group of the polymer or inclusion complexes with CD moieties grafted to the polymer, under conditions that cause the grafting agents to form covalent bonds and/or inclusion complexes, as appropriate, with the polymer or moieties grafted to the polymer.

In some embodiments, one or more of the therapeutic agents in the CDP-taxane conjugate can be replaced with another therapeutic agent, e.g., another cytotoxic agent or immunomodulator.

In an alternative embodiment, a CDP-linked agent conjugate by reacting a polymer P (the polymer bearing a plurality of reactive groups, such as carboxylic acids, alcohols, thiols, amines, epoxides, etc.) with X-L-CD where each X may be the same or different reactive groups is formed. Thus, X is independently for each occurrence, a reactive group, such as carboxylic acids, alcohols, thiols, amines, epoxides, etc., capable of forming a covalent bond with a reactive group of the polymer or inclusion complexes with CD moieties grafted to the polymer, under conditions that cause the grafting agents to form covalent bonds and/or inclusion complexes, as appropriate, with the polymer or moieties grafted to the polymer.

In certain embodiments, the different reactive groups are reacted with the polymer simultaneously or substantially simultaneously (e.g., in a one-pot reaction), or are reacted sequentially with the polymer (optionally with a purification and/or wash step between reactions).

In some embodiments, the CDP is made by a method comprising providing cyclodextrin moiety precursors modified to bear one reactive site at each of exactly two positions, and reacting the cyclodextrin moiety with comonomer precursors having exactly two reactive moieties capable of forming a covalent bond with the reactive sites under polymerization conditions that promote reaction of the reactive sites with the reactive moieties to form covalent bonds between the comonomers and the cyclodextrin moieties, whereby a CDP comprising alternating units of a cyclodextrin moiety and comonomer is produced.

In one embodiment, the precipitated polymer is a linear or branched CDPs and CDP-linked agent conjugates as described herein. While the discussion below focuses on the preparation of linear cyclodextrin molecules, one skilled in the art would readily recognize that the methods described can be adapted for producing branched polymers by choosing an appropriate comonomer precursor.

Accordingly, one embodiment describes a method of preparing a linear CDP. A linear CDP may be prepared by copolymerizing a cyclodextrin monomer precursor disubstituted with one or more appropriate leaving groups with a comonomer precursor capable of displacing the leaving groups. The leaving group, which may be the same or different, may be any leaving group known in the art which may be displaced upon copolymerization with a comonomer precursor. In a preferred embodiment, a linear CDP may be prepared by iodinating a cyclodextrin monomer precursor to form a diiodinated cyclodextrin monomer precursor and copolymerizing the diiodinated cyclodextrin monomer precursor with a comonomer precursor to form a linear CDP having a repeating unit of formula I or II, provided in the section entitles "CDP-linked agent conjugates" or a combination thereof, each as described above. In some embodiments, the cyclodextrin moiety precursors are in a composition, the composition being substantially free of cyclodextrin moieties having other than two positions modified to bear a reactive site (e.g., 1, 3, 4, 5, 6, or 7). While examples presented below discuss iodinated cyclodextrin moieties, one skilled in the art would readily recognize that the cyclodextrin moieties as described herein encompasses cyclodextrin moieties wherein other leaving groups such as alkyl and aryl sulfonate may be present instead of iodo groups. In a preferred embodiment, a linear cyclodextrin copolymer is prepared by iodinating a cyclodextrin monomer precursor as described above to form a diiodinated cyclodextrin monomer precursor of formula XXXIVa, XXXIVb, XXXIVc or a mixture thereof:

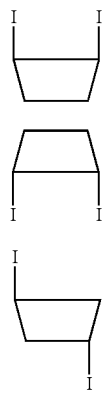

XXXIVa

XXXIVb

XXXIVc

In some embodiments, the iodine moieties as shown on the cyclodextrin moieties are positioned such that the derivatization on the cyclodextrin is on the A and D glucopyranose moieties. In some embodiments, the iodine moieties as shown on the cyclodextrin moieties are positioned in such that the derivatization on the cyclodextrin is on the A and C glucopyranose moieties. In some embodiments, the iodine moieties as shown on the cyclodextrin moieties are positioned in such that the derivatization on the cyclodextrin is on the A and F glucopyranose moieties. In some embodiments, the iodine moieties as shown on the cyclodextrin moieties are positioned in such that the derivatization on the cyclodextrin is on the A and E glucopyranose moieties.

The diiodinated cyclodextrin may be prepared by any means known in the art. (Tabushi et al. J. Am. Chem. 106, 5267-5270 (1984); Tabushi et al. J. Am. Chem. 106, 4580-4584 (1984)). For example, β cyclodextrin may be reacted with biphenyl-4,4'-disulfonyl chloride in the presence of anhydrous pyridine to form a biphenyl-4,4'-disulfonyl chloride capped β-cyclodextrin which may then be reacted with potassium iodide to produce diiodo-β-cyclodextrin. The cyclodextrin monomer precursor is iodinated at only two positions. By copolymerizing the diiodinated cyclodextrin monomer precursor with a comonomer precursor, as described above, a linear cyclodextrin polymer having a repeating unit of Formula 1a, 1b, or a combination thereof, also as described above, may be prepared. If appropriate, the iodine or iodo groups may be replaced with other known leaving groups.

Also, the iodo groups or other appropriate leaving group may be displaced with a group that permits reaction with a comonomer precursor, as described above. For example, a diiodinated cyclodextrin monomer precursor of formula XXXIVa, XXXIVb, XXXIVc or a mixture thereof may be aminated to form a diaminated cyclodextrin monomer precursor of formula XXXVa, XXXVb, XXXVc or a mixture thereof:

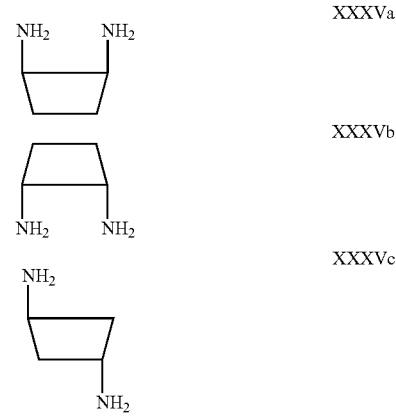

XXXVa

XXXVb

XXXVc

In some embodiments, the amino moieties as shown on the cyclodextrin moieties are positioned such that the derivatization on the cyclodextrin is on the A and D glucopyranose moieties. In some embodiments, the amino moieties as shown on the cyclodextrin moieties are positioned in such that the derivatization on the cyclodextrin is on the A and C glucopyranose moieties. In some embodiments, the amino moieties as shown on the cyclodextrin moieties are positioned in such that the derivatization on the cyclodextrin is on the A and F glucopyranose moieties. In some embodiments, the amino moieties as shown on the cyclodextrin moieties are positioned in such that the derivatization on the cyclodextrin is on the A and E glucopyranose moieties.

The diaminated cyclodextrin monomer precursor may be prepared by any means known in the art. (Tabushi et al.

Tetrahedron Lett. 18:11527-1530 (1977); Mungall et al., J. Org. Chem. 16591662 (1975)). For example, a diiodo-β-cyclodextrin may be reacted with sodium azide and then reduced to form a diamino-β-cyclodextrin). The cyclodextrin monomer precursor is aminated at only two positions. The diaminated cyclodextrin monomer precursor may then be copolymerized with a comonomer precursor, as described above, to produce a linear cyclodextrin copolymer having a repeating unit. However, the amino functionality of a diaminated cyclodextrin monomer precursor need not be directly attached to the cyclodextrin moiety. Alternatively, the amino functionality or another nucleophilic functionality may be introduced by displacement of the iodo or other appropriate leaving groups of a cyclodextrin monomer precursor with amino group containing moieties such as, for example, $HSCH_2CH_2NH_2$ (or a di-nucleophilic molecule more generally represented by $HW-(CR_1R_2)_n-WH$ wherein W, independently for each occurrence, represents O, S, or $NR_1$; $R_1$ and $R_2$, independently for each occurrence, represent H, (un)substituted alkyl, (un)substituted aryl, (un)substituted heteroalkyl, (un)substituted heteroaryl) with an appropriate base such as a metal hydride, alkali or alkaline carbonate, or tertiary amine to form a diaminated cyclodextrin monomer precursor of formula XXXVd, XXXVe, XXXVf or a mixture thereof:

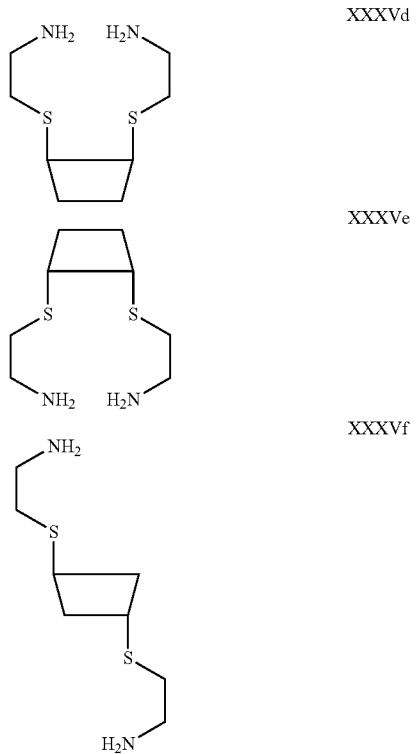

XXXVd

XXXVe

XXXVf

In some embodiments, the $-SCH_2CH_2NH_2$ moieties as shown on the cyclodextrin moieties are positioned such that the derivatization on the cyclodextrin is on the A and D glucopyranose moieties. In some embodiments, the $-SCH_2CH_2NH_2$ moieties as shown on the cyclodextrin moieties are positioned in such that the derivatization on the cyclodextrin is on the A and C glucopyranose moieties. In some embodiments, the $-SCH_2CH_2NH_2$ moieties as shown on the cyclodextrin moieties are positioned in such that the derivatization on the cyclodextrin is on the A and F glucopyranose moieties. In some embodiments, the $-SCH_2CH_2NH_2$ moieties as shown on the cyclodextrin moieties are positioned in such that the derivatization on the cyclodextrin is on the A and E glucopyranose moieties.

A linear oxidized CDP may also be prepared by oxidizing a reduced linear cyclodextrin-containing copolymer as described below. This method may be performed as long as the comonomer does not contain an oxidation sensitive moiety or group such as, for example, a thiol.

A linear CDP may be oxidized so as to introduce at least one oxidized cyclodextrin monomer into the copolymer such that the oxidized cyclodextrin monomer is an integral part of the polymer backbone. A linear CDP which contains at least one oxidized cyclodextrin monomer is defined as a linear oxidized cyclodextrin copolymer or a linear oxidized cyclodextrin-containing polymer. The cyclodextrin monomer may be oxidized on either the secondary or primary hydroxyl side of the cyclodextrin moiety. If more than one oxidized cyclodextrin monomer is present in a linear oxidized cyclodextrin copolymer, the same or different cyclodextrin monomers oxidized on either the primary hydroxyl side, the secondary hydroxyl side, or both may be present. For illustration purposes, a linear oxidized cyclodextrin copolymer with oxidized secondary hydroxyl groups has, for example, at least one unit of formula XXXVIa or XXXVIb:

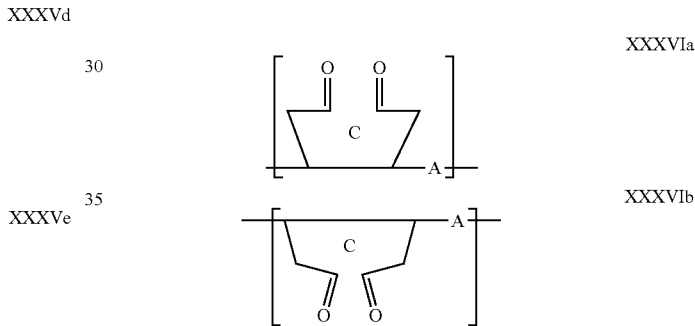

XXXVIa

XXXVIb

In formulae XXXVIa and XXXVIb, C is a substituted or unsubstituted oxidized cyclodextrin monomer and the comonomer (i.e., shown herein as A) is a comonomer bound, e.g., covalently bound, to the oxidized cyclodextrin C. Also in formulae XXXVIa and XXXVIb, oxidation of the secondary hydroxyl groups leads to ring opening of the cyclodextrin moiety and the formation of aldehyde groups.

A linear oxidized CDP copolymer may be prepared by oxidation of a linear cyclodextrin copolymer as discussed above. Oxidation of a linear cyclodextrin copolymer may be accomplished by oxidation techniques known in the art. (Hisamatsu et al., Starch 44:188-191 (1992)). Preferably, an oxidant such as, for example, sodium periodate is used. It would be understood by one of ordinary skill in the art that under standard oxidation conditions that the degree of oxidation may vary or be varied per copolymer. Thus in one embodiment, a CDP may contain one oxidized cyclodextrin monomer. In another embodiment, substantially all cyclodextrin monomers of the copolymer would be oxidized.

Another method of preparing a linear oxidized CDP involves the oxidation of a diiodinated or diaminated cyclodextrin monomer precursor, as described above, to form an oxidized diiodinated or diaminated cyclodextrin monomer precursor and copolymerization of the oxidized diiodinated or diaminated cyclodextrin monomer precursor with a comonomer precursor. In a preferred embodiment, an oxidized diiodinated cyclodextrin monomer precursor of formula XXXVIIa, XXXVIIb, XXXVIIc, or a mixture thereof:

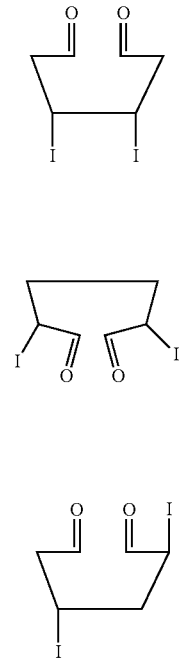

XXXVIIa

XXXVIIb

XXVIIc may be prepared by oxidation of a diiodinated cyclodextrin monomer precursor of formulae XXXIVa, XXXIVb, XXXIVc, or a mixture thereof, as described above. In another preferred embodiment, an oxidized diaminated cyclodextrin monomer precursor of formula XXXVIIIa, XXXVIIIb, XXXVIIIc or a mixture thereof:

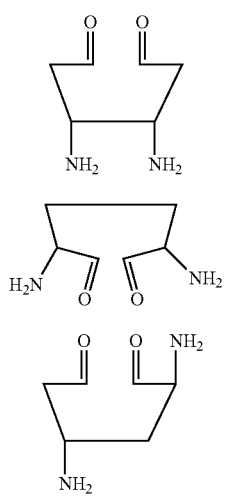

XXXVIIIa

XXXVIIIb

XXVIIIc may be prepared by amination of an oxidized diiodinated cyclodextrin monomer precursor of formulae XXXVIIa, XXXVIIb, XXXVIIc, or a mixture thereof, as described above. In still another preferred embodiment, an oxidized diaminated cyclodextrin monomer precursor of formula XXXIXa, XXXIXb, XXXIXc or a mixture thereof:

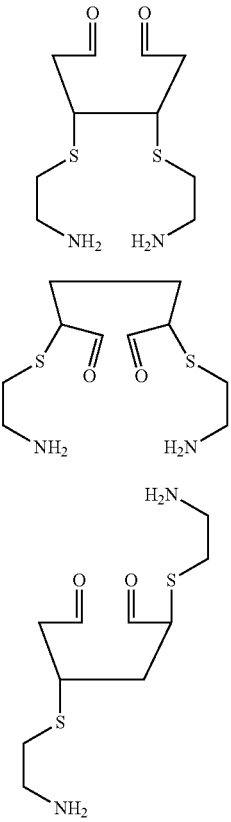

XXXIXa

XXXIXb

XXXIXc may be prepared by displacement of the iodo or other appropriate leaving groups of an oxidized cyclodextrin monomer precursor disubstituted with an iodo or other appropriate leaving group with the amino or other nucleophilic group containing moiety such as, e.g. $HSCH_2CH_2NH_2$ (or a di-nucleophilic molecule more generally represented by $HW-(CR_1R_2)_n-WH$ wherein W, independently for each occurrence, represents O, S, or $NR_1$; $R_1$ and $R_2$, independently for each occurrence, represent H, (un)substituted alkyl, (un)substituted aryl, (un)substituted heteroalkyl, (un)substituted heteroaryl) with an appropriate base such as a metal hydride, alkali or alkaline carbonate, or tertiary amine.

Alternatively, an oxidized diiodinated or diaminated cyclodextrin monomer precursor, as described above, may be prepared by oxidizing a cyclodextrin monomer precursor to form an oxidized cyclodextrin monomer precursor and then diiodinating and/or diaminating the oxidized cyclodextrin monomer, as described above. As discussed above, the cyclodextrin moiety may be modified with other leaving groups other than iodo groups and other amino group containing functionalities. The oxidized diiodinated or diaminated cyclodextrin monomer precursor may then be copolymerized with a comonomer precursor, as described above, to form a linear oxidized cyclodextrin copolymer.

A linear oxidized CDP may also be further modified by attachment of at least one ligand to the copolymer. The ligand is as described above.

In some embodiments, a CDP can be made by: providing cyclodextrin moiety precursors;
providing comonomer precursors which do not contain cyclodextrin moieties (comonomer precursors); and copolymerizing the said cyclodextrin moiety precursors and comonomer precursors to thereby make a CDP wherein CDP comprises at least four, five six, seven, eight, or more, cyclodextrin moieties and at least four, five six, seven, eight, or more, comonomers.

In some embodiments, the at least four, five, six, seven, eight, or more cyclodextrin moieties and at least four, five, six, seven, eight, or more comonomers alternate in the water soluble linear polymer. In some embodiments, the method includes providing cyclodextrin moiety precursors modified to bear one reactive site at each of exactly two positions, and reacting the cyclodextrin moiety precursors with comonomer precursors having exactly two reactive moieties capable of forming a covalent bond with the reactive sites under polymerization conditions that promote reaction of the reactive sites with the reactive moieties to form covalent bonds between the comonomers and the cyclodextrin moieties, whereby a CDP comprising alternating units of a cyclodextrin moiety and a comonomer is produced.

In some embodiments, the cyclodextrin comonomers comprise linkers to which therapeutic agents may be further linked. In some embodiments, the therapeutic agents are linked via second linkers.

In some embodiments, the comonomer precursor is a compound containing at least two functional groups through which reaction and thus linkage of the cyclodextrin moieties is achieved. In some embodiments, the functional groups, which may be the same or different, terminal or internal, of each comonomer precursor comprise an amino, acid, imidazole, hydroxyl, thio, acyl halide, —HC=CH—, —C≡C— group, or derivative thereof. In some embodiments, the two functional groups are the same and are located at termini of the comonomer precursor. In some embodiments, a comonomer contains one or more pendant groups with at least one functional group through which reaction and thus linkage of a therapeutic agent can be achieved. In some embodiments, the functional groups, which may be the same or different, terminal or internal, of each comonomer pendant group comprise an amino, acid, imidazole, hydroxyl, thiol, acyl halide, ethylene, ethyne group, or derivative thereof. In some embodiments, the pendant group is a substituted or unsubstituted branched, cyclic or straight chain $C_1$-$C_{10}$ alkyl, or arylalkyl optionally containing one or more heteroatoms within the chain or ring.

In some embodiments, a CDP of the following formula

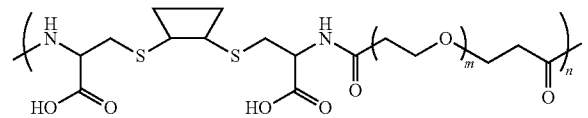

can be made by providing a compound of formula AA and formula BB:

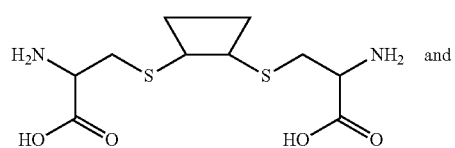
Formula AA

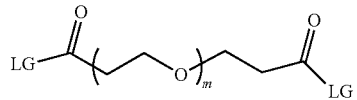
Formula BB wherein LG is a leaving group;

and contacting the compounds under conditions that allow for the formation of a covalent bond between the compounds of formula AA and BB, to form a polymer of the following formula:

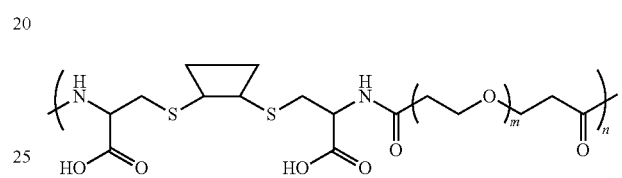

wherein the group

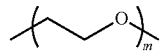

has a Mw of 3.4 kDa or less and n is at least 4, 5, 6, 7, 8, 9, 10, 11, 12, 13, 14, 15, 16, 17, 18, 19 or 20.

In some embodiments, Formula BB is

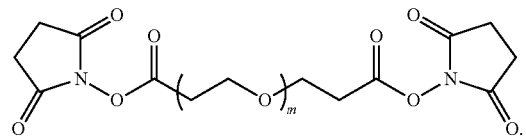

In some embodiments, the group

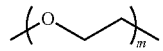

has a Mw of 3.4 kDa and the Mw of the compound is from 27,000 Da to 99,600 Da.

In some embodiments, the compounds of formula AA and formula BB are contacted in the presence of a base. In some embodiments, the base is an amine containing base. In some embodiments, the base is DEA.

In some embodiments, a CDP of the following formula:
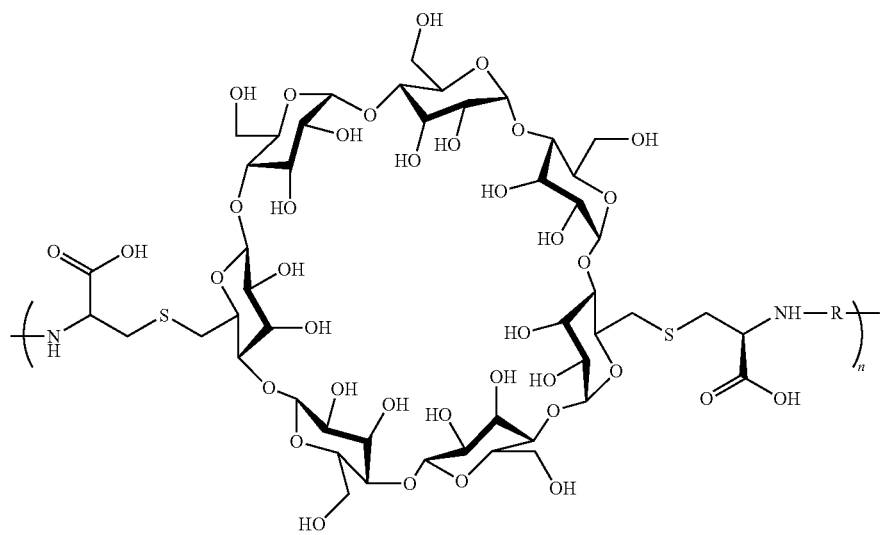
wherein R is of the form:
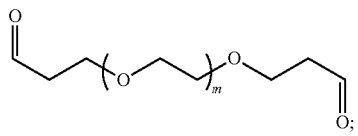
can be made by the steps of: reacting a compound of the formula below:
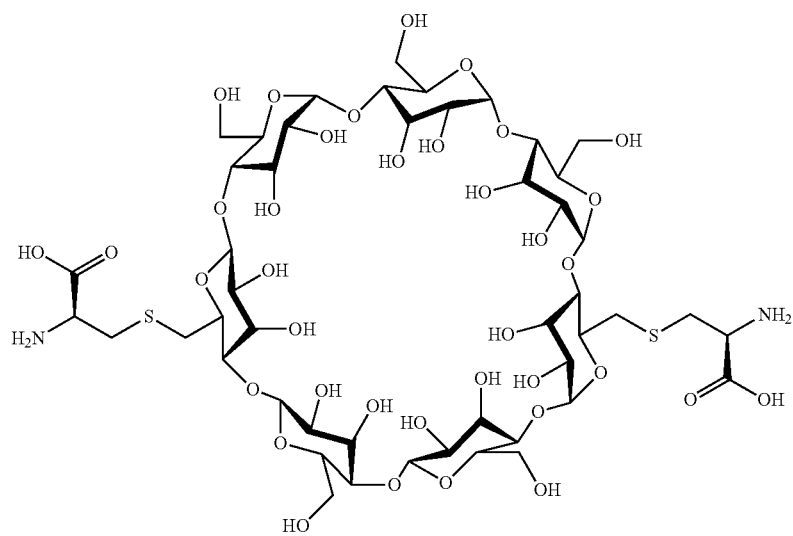 [SMILES: N[C@H](CSCC1O[C@@H]2O[C@@H]3C(CO)O[C@@H](O[C@@H]4C(CO)O[C@@H](O[C@@H]5C(CSC[C@@H](N)C(=O)O)O[C@@H](O[C@@H]6C(CO)O[C@H](O[C@@H]7C(CO)O[C@H](O[C@@H]8C(CO)O[C@H](O[C@H]1[C@H](O)C2O)C(O)[C@H]8O)C(O)[C@H]7O)C(O)[C@H]6O)C(O)[C@H]5O)C(O)[C@H]4O)C(O)[C@H]3O)C(=O)O]
with a compound of the formula below:
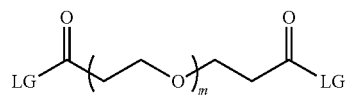
wherein the group
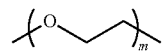
has a Mw of 3.4 kDa or less and n is at least 4, 5, 6, 7, 8, 9, 10, 11, 12, 13, 14, 15, 16, 17, 18, 19 or 20, in the presence of a non-nucleophilic organic base in a solvent.
In some embodiments,
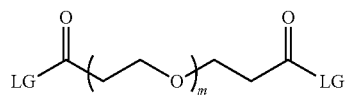

is
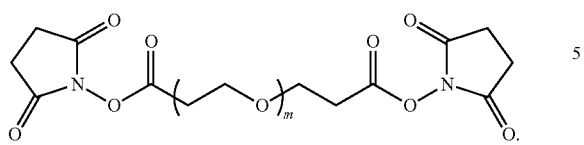
In some embodiments, the solvent is a polar aprotic solvent. In some embodiments, the solvent is DMSO.
In some embodiments, the method also includes the steps of dialysis; and lyophylization.
In some embodiments, a CDP provided below can be made by the following scheme:
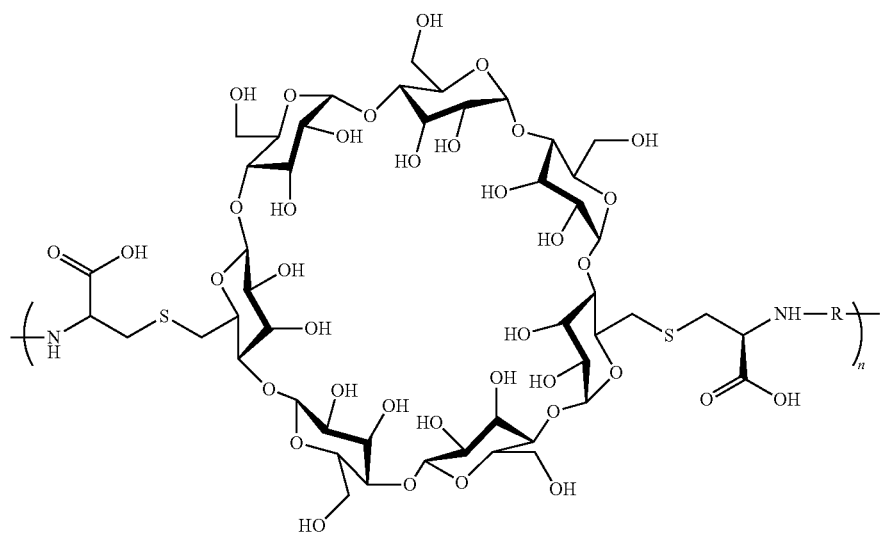
wherein R is of the form:
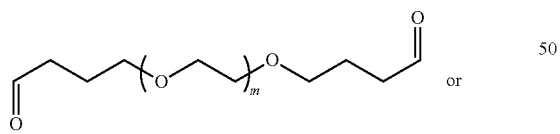
or
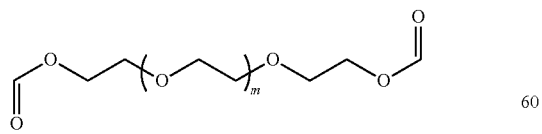
comprising the steps of: reacting a compound of the formula below:

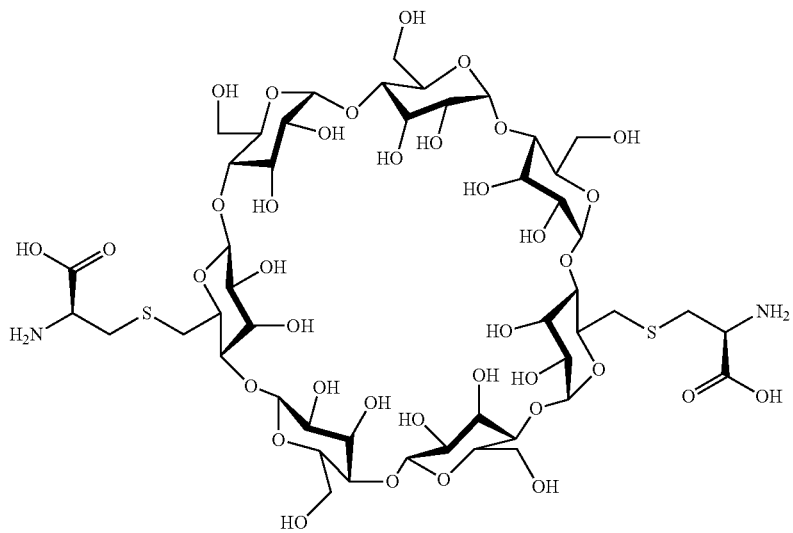 [SMILES: N[C@H](CSCC1O[C@@H]2O[C@@H]3C(CO)O[C@@H](O[C@@H]4C(CO)O[C@@H](O[C@@H]5C(CSC[C@@H](N)C(=O)O)O[C@@H](O[C@@H]6C(CO)O[C@H](O[C@@H]7C(CO)O[C@H](O[C@@H]8C(CO)O[C@H](O[C@H]1[C@H](O)C2O)C(O)[C@H]8O)C(O)[C@H]7O)C(O)[C@H]6O)C(O)[C@H]5O)C(O)[C@H]4O)C(O)[C@H]3O)C(=O)O]
with a compound of the formula below:
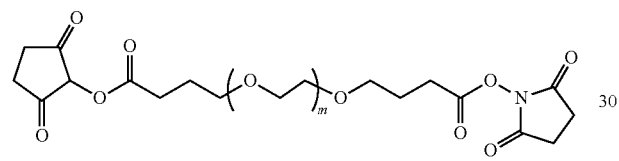
wherein the group
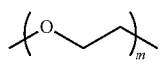
has a Mw of 3.4 kDa or less and n is at least 4, 5, 6, 7, 8, 9, 10, 11, 12, 13, 14, 15, 16, 17, 18, 19 or 20, or with a compound provided below:
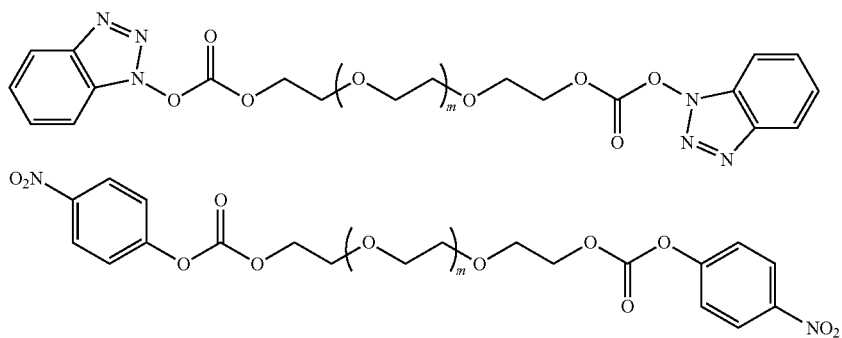
wherein the group
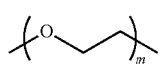
has a Mw of 3.4 kDa; in the presence of a non-nucleophilic organic base in DMSO; and dialyzing and lyophilizing the following polymer

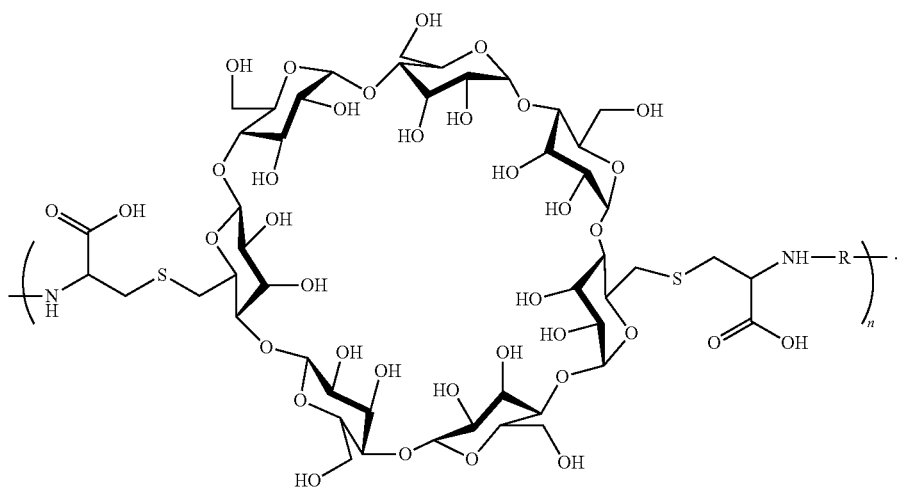

A CDP described herein may be attached to or grafted onto a substrate. The substrate may be any substrate as recognized by those of ordinary skill in the art. In another preferred embodiment, a CDP may be crosslinked to a polymer to form, respectively, a crosslinked cyclodextrin copolymer or a crosslinked oxidized cyclodextrin copolymer. The polymer may be any polymer capable of crosslinking with a CDP (e.g., polyethylene glycol (PEG) polymer, polyethylene polymer). The polymer may also be the same or different CDP. Thus, for example, a linear CDP may be crosslinked to any polymer including, but not limited to, itself, another linear CDP, and a linear oxidized CDP. A crosslinked linear CDP may be prepared by reacting a linear CDP with a polymer in the presence of a crosslinking agent. A crosslinked linear oxidized CDP may be prepared by reacting a linear oxidized CDP with a polymer in the presence of an appropriate crosslinking agent. The crosslinking agent may be any crosslinking agent known in the art. Examples of crosslinking agents include dihydrazides and disulfides. In a preferred embodiment, the crosslinking agent is a labile group such that a crosslinked copolymer may be uncrosslinked if desired.

A linear CDP and a linear oxidized CDP may be characterized by any means known in the art. Such characterization methods or techniques include, but are not limited to, gel permeation chromatography (GPC), matrix assisted laser desorption ionization-time of flight mass spectrometry (MALDI-TOF Mass spec), $^1$H and $^{13}$C NMR, light scattering and titration.

A cyclodextrin composition containing at least one linear CDP and at least one linear oxidized CDP as described above is also contemplated. Accordingly, either or both of the linear CDP and linear oxidized CDP may be crosslinked to another polymer and/or bound to a ligand as described above. Therapeutic compositions according to the invention contain a therapeutic agent and a linear CDP or a linear oxidized CDP, including crosslinked copolymers. A linear CDP, a linear oxidized CDP and their crosslinked derivatives are as described above. The therapeutic agent may be any synthetic, semi-synthetic or naturally occurring biologically active therapeutic agent, including those known in the art.

One embodiment contemplates attaching a linked agent t to a CDP for delivery of the linked agent which is therapeutic agent or a prodrug thereof, a bioactive agent or a precursor thereof, an adjuvant, a targeting ligand or a precursor thereof. Disclosed herewith are various types of linear, branched, or grafted CDPs which may be precipitated according to the present invention wherein a linked agent is covalently bound to the polymer. In certain embodiments, the linked agent is covalently linked via a biohydrolyzable bond, for example, an ester, amide, carbamates, or carbonate. An exemplary synthetic scheme for covalently bonding a derivatized CD to a linked agent is shown in Scheme I where the linked agent is exemplified as a therapeutic agent (T.A.)

Scheme I

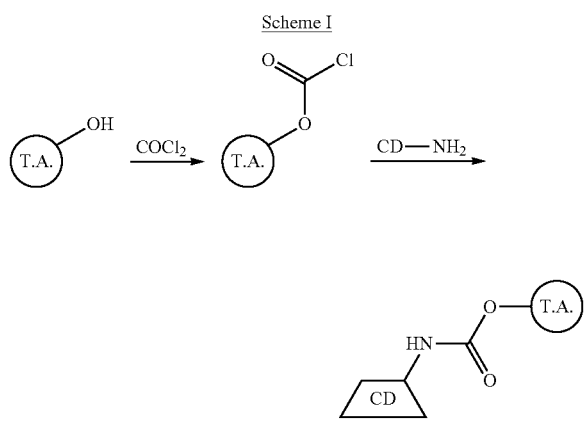

A general strategy for synthesizing linear, branched or grafted cyclodextrin-containing polymers (CDPs) for loading a linked agent such as a therapeutic agent and/or a targeting ligand is shown in Scheme II.

Scheme II

Exemplary cyclodextrin monomers for linear, branch or graft cyclodextrin polymers

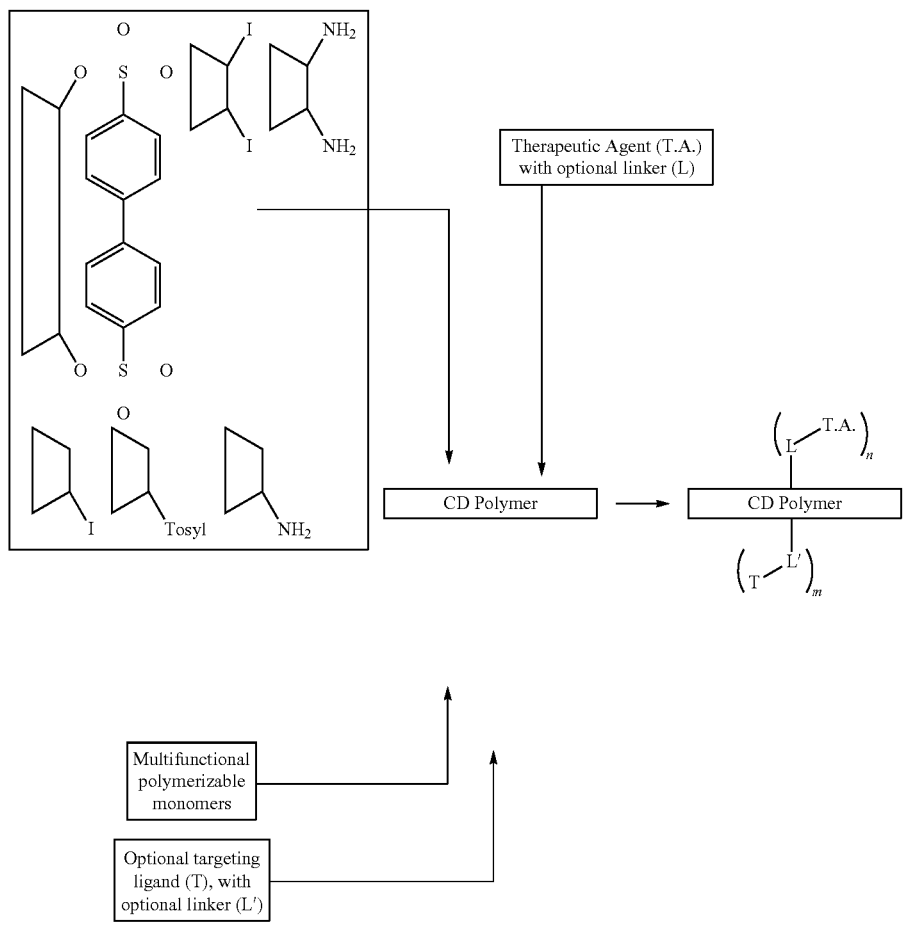

As described below in Schemes III-XIV, this general strategy can be used to achieve a variety of different cyclodextrin-containing polymers for the delivery of therapeutic agents, e.g., cytotoxic agents, e.g., topoisomerase inhibitors, e.g., a topoisomerase I inhibitor (e.g., camptothecin, irinotecan, SN-38, topotecan, lamellarin D, lurotecan, exatecan, diflomotecan, or derivatives thereof), or a topoisomerase II inhibitor (e.g., an etoposide, a tenoposide, doxorubicin, or derivatives thereof), an anti-metabolic agent (e.g., an anti-folate (e.g., pemetrexed, floxuridine, or raltitrexed) or a pyrimidine conjugate (e.g., capecitabine, cytarabine, gemcitabine, or 5FU)), an alkylating agent, an anthracycline, an anti-tumor antibiotic (e.g., a HSP90 inhibitor, e.g., geldanamycin), a platinum based agent (e.g., cisplatin, carboplatin, or oxaliplatin), a microtubule inhibitor, a kinase inhibitor (e.g., a seronine/threonine kinase inhibitor, e.g., a mTOR inhibitor, e.g., rapamycin) or a proteasome inhibitor.

The resulting CDPs are shown graphically as polymers (A)-(L):

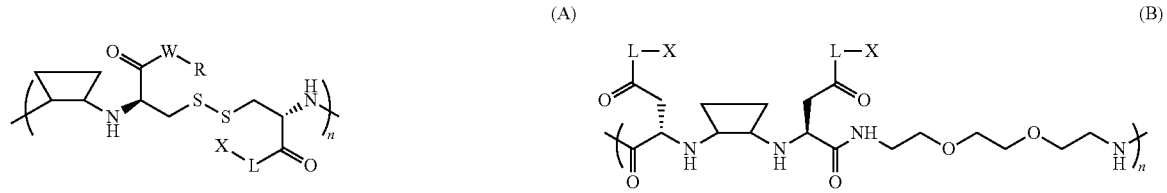

-continued
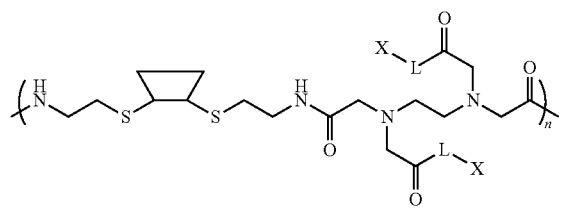
(C)
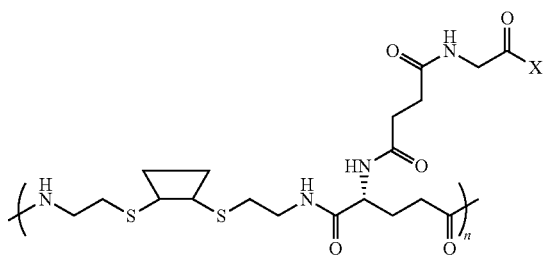
(D)
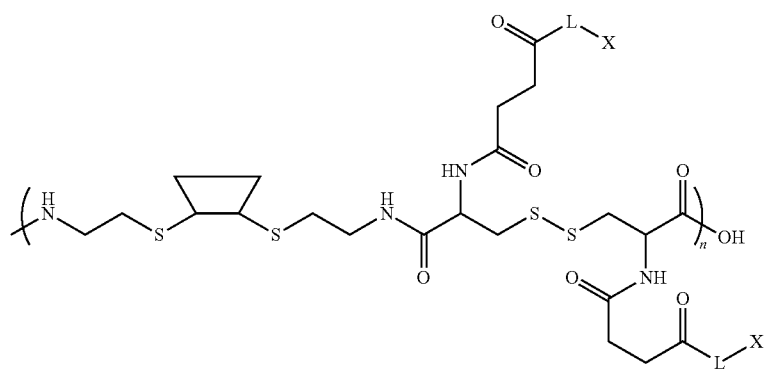
(E)
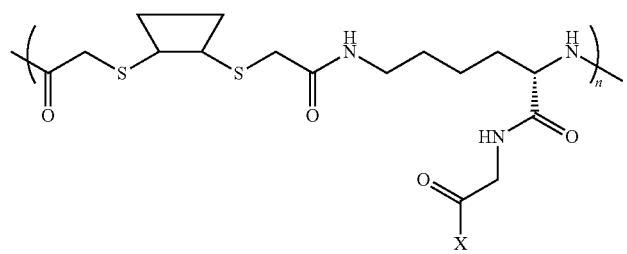
(F)
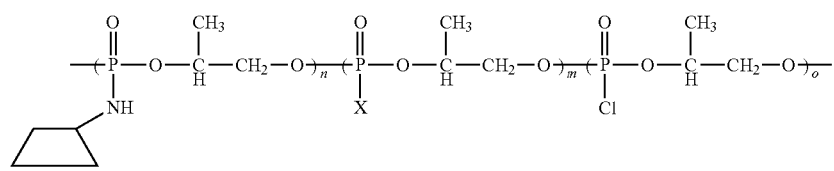
(G)
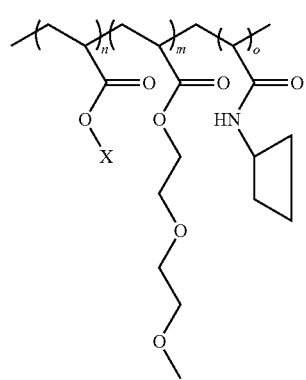
(H)

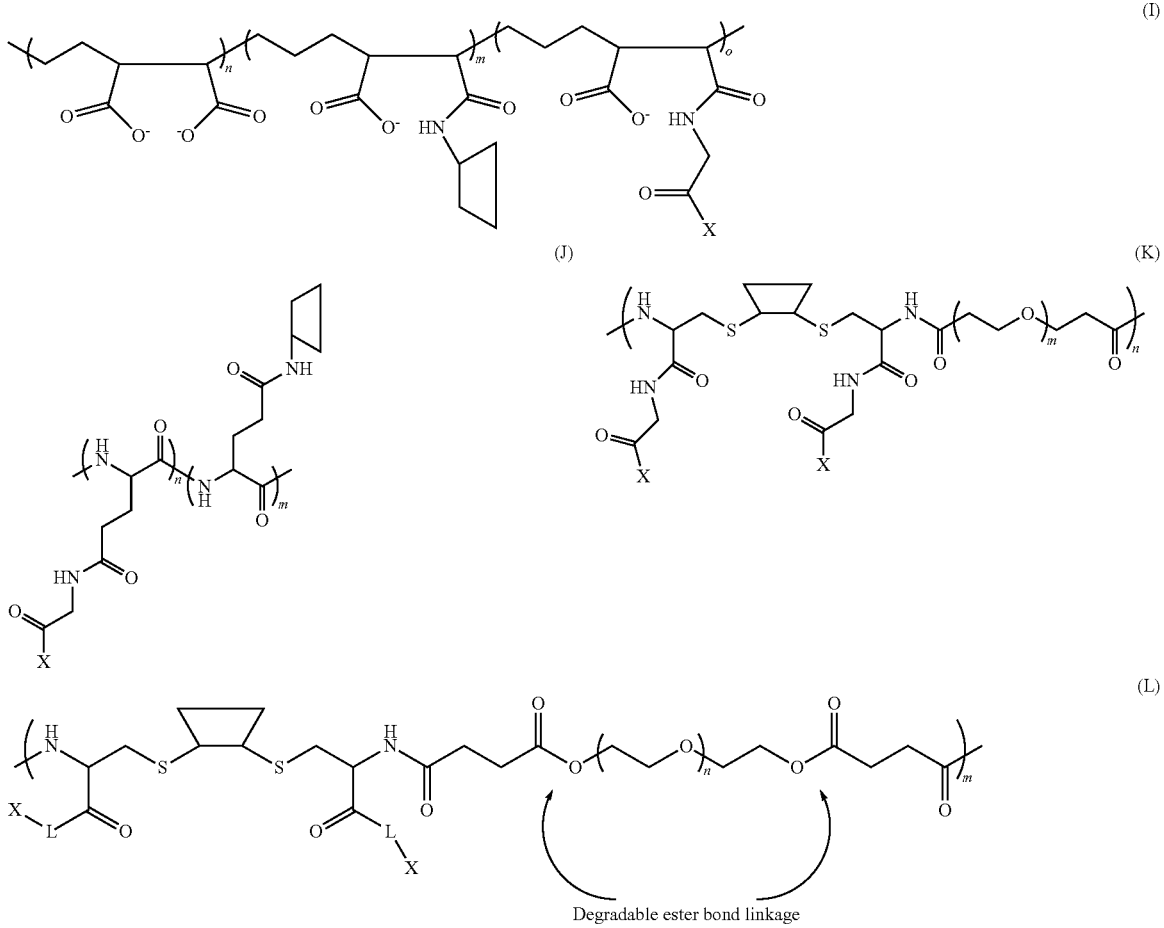

For each of (A)-(L), m, n, and o, independently, =1 to 1000; X=therapeutic agent or OH and L is absent or a linker The general strategies as shown above can be used to achieve a variety of different cyclodextrin-containing polymers for the delivery of therapeutic agents. The resulting CDPs are shown graphically as polymers (A)-(L). Generally, wherein R can be a therapeutic agent or an OH, it is required that at least one R within the polymer be a therapeutic agent, e.g., the loading is not zero. Generally, m, n, and o, if present, are independently from 1 to 1000, e.g., 1 to 500, e.g., 1 to 100, e.g., 1 to 50, e.g., 1 to 25, e.g., 10 to 20, e.g. about 14.

Figure 5A:
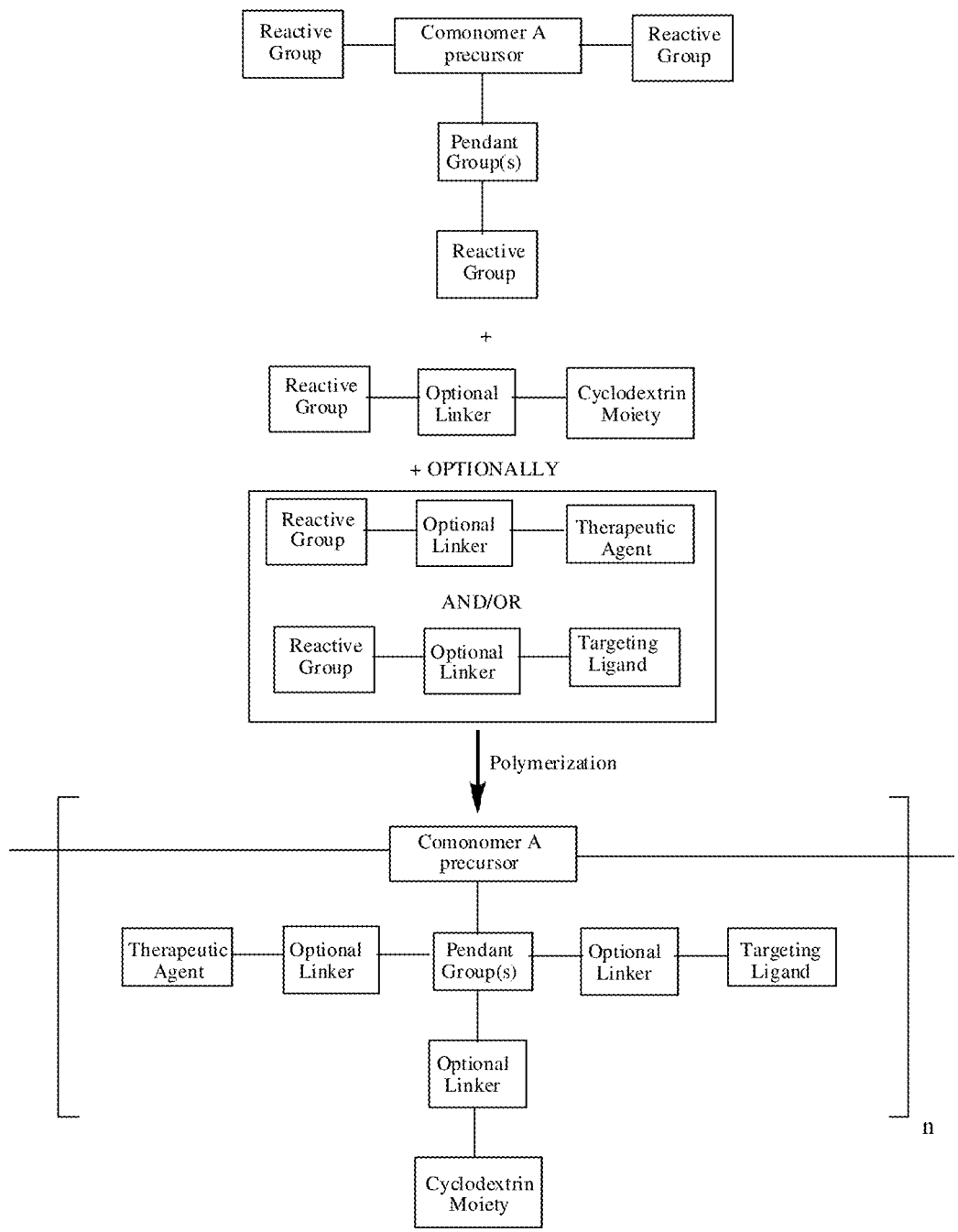
FIGS. 5A and 5B.
Figure 5B:
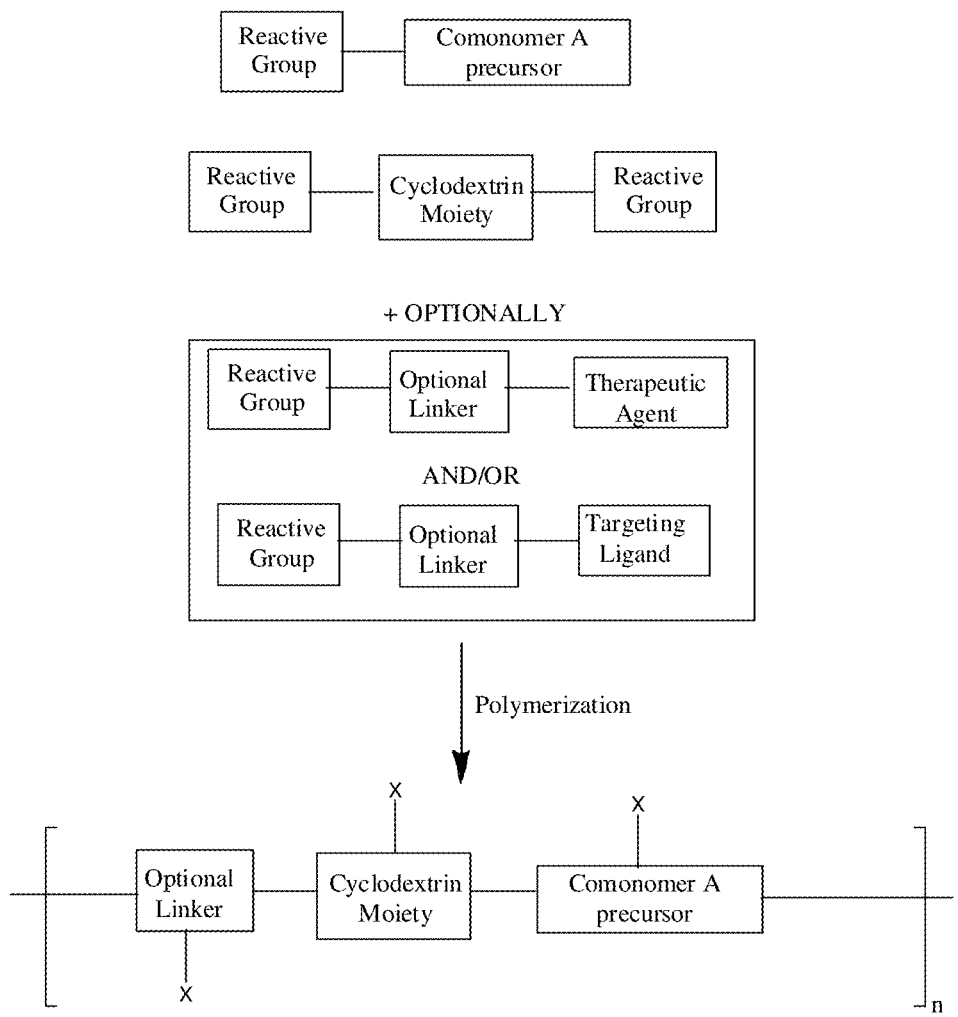

For example, comonomer precursors (shown in FIG. 5A as A), cyclodextrin moieties, linked agents may be assembled as shown in FIGS. 5A and 5B. Note that in FIGS. 5A and 5B, in any given reaction there may be more than one comonomer precursor, cyclodextrin moiety, linked agent (exemplified in FIG. 5A as a therapeutic agent or targeting ligand) that is of the same type or different. Furthermore, prior to polymerization, one or more comonomer precursor, cyclodextrin moiety, therapeutic agent or targeting ligand may be covalently linked with each other in one or more separate step. The scheme as provided above includes embodiments, where not all available positions for attachment of the therapeutic agent are occupied on the CDP. For example, in some embodiments, less than all of the available points of attachments are reacted, leaving less than 100% yield of the therapeutic agent onto the polymer. Accordingly, the loading of the linked agent onto the polymer can vary.

One skilled in the art may choose from a variety of reactive groups, e.g., hydroxyls, carboxyls, halides, amines, and activated ethenes, ethynes, or aromatic groups in order achieve polymerization such as described in FIG. 5A and FIG. 5B. For further examples of reactive groups are disclosed in Advanced Organic Chemistry: Reactions, Mechanisms, and Structure, 5th Edition, 2000. In some embodiments, one or more of the linked agent moieties in the CDP-linked agent conjugate can be replaced with another therapeutic agent, e.g., another cytotoxic agent or immunomodulator.

FIG. 5B provides a general scheme of preparing linear CDPs. One skilled in the art would recognize that by choosing a comonomer A precursor that has multiple reactive groups polymer branching can be achieved.

In some embodiments, one or more of the therapeutic agent moieties in the CDP-linked agent conjugate can be replaced with another therapeutic agent, e.g., another cytotoxic agent or immunomodulator.

Examples of different ways of synthesizing CDP-linked agent conjugates are shown in Schemes III-VIII below. In each of Schemes III-VIII, one or more of the linked agent moieties in the CDP-linked agent conjugate can be replaced with another linked agent. For example, one therapeutic agent can be replaced by another therapeutic agent, e.g., another cytotoxic agent or immunomodulator or one therapeutic agent can be replaced by a targeting ligand.

Scheme III

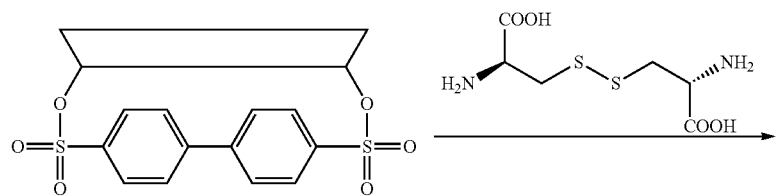

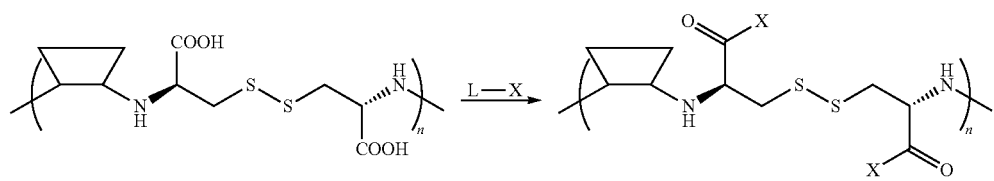

wherein
L is absent or a linker; and
X represents OH or linked agent

Scheme IV

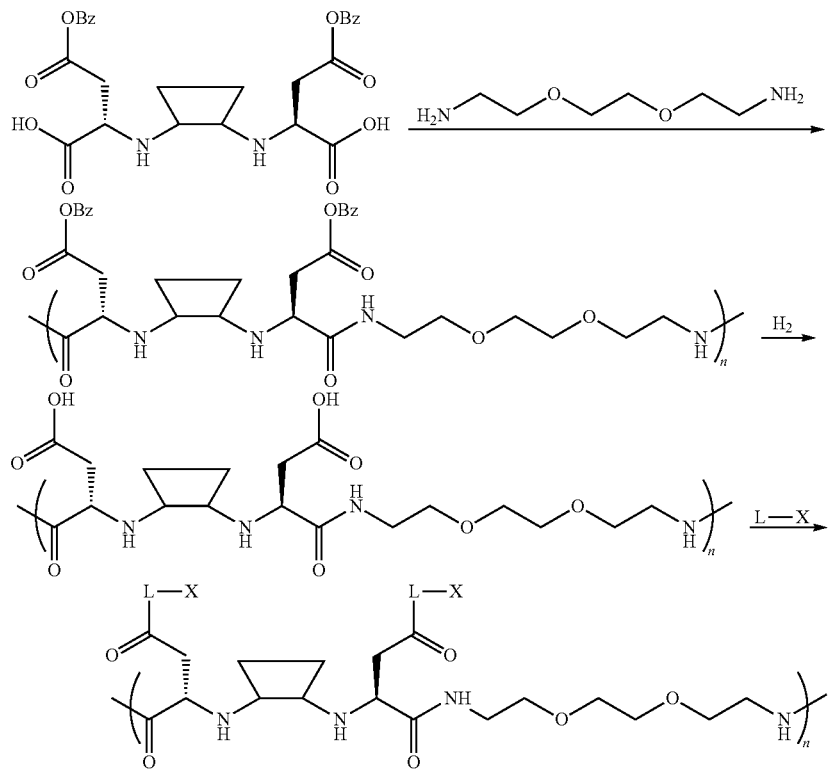

wherein
L is absent or a linker
X. is a linked agent

Scheme IV, as provided above, includes embodiments where L-linked agent is absent in one or more positions as provided above. This can be achieved, for example, when less than 100% yield is achieved when coupling a linked agent such as a therapeutic agent to the polymer and/or when less than an equivalent amount of therapeutic agent is used in the reaction. Accordingly, the loading of the therapeutic agent, by weight of the polymer, can vary.

Scheme V
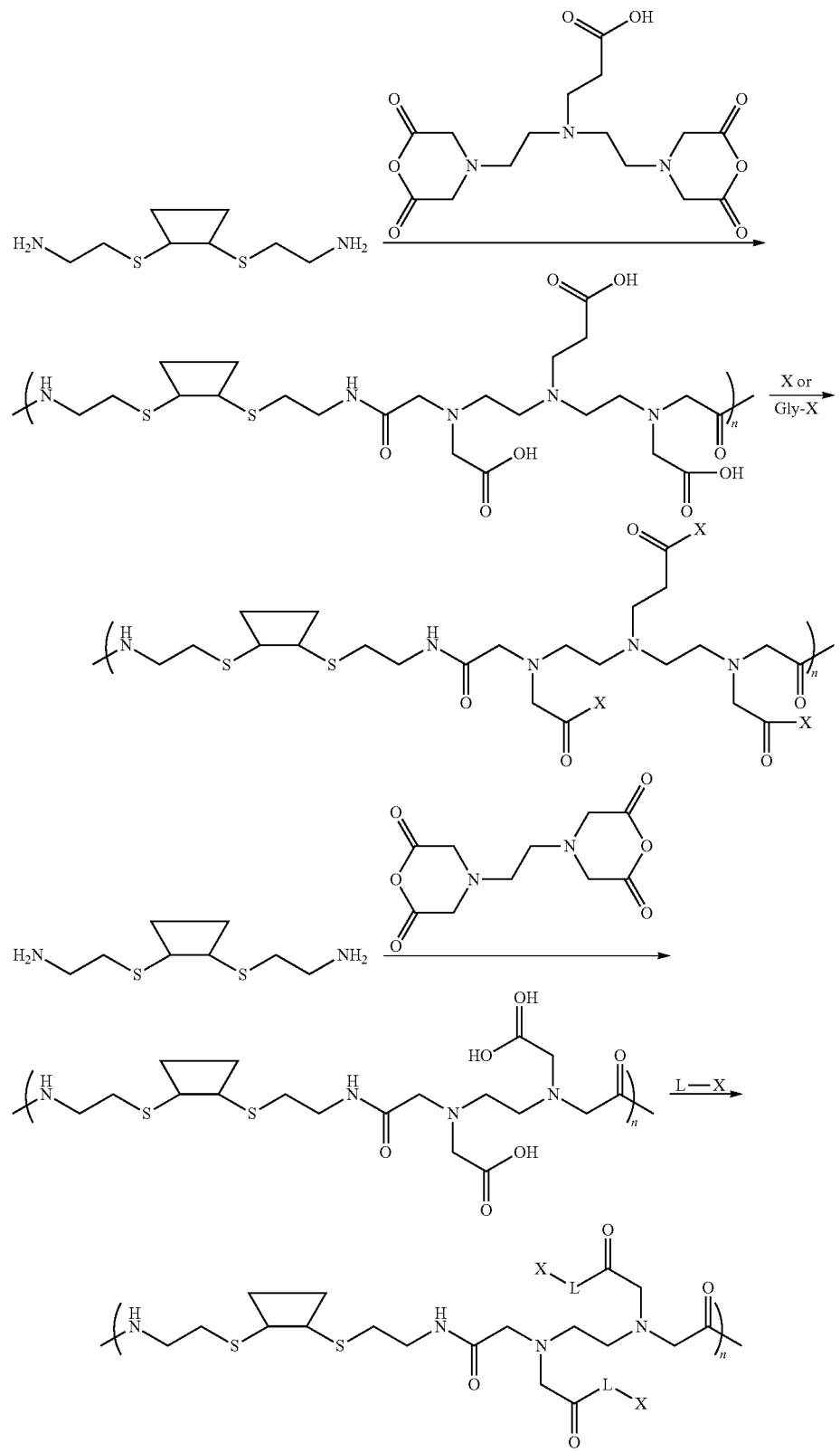
wherein
L is absent or a linker, e.g., glycyl residue
X is a linked agent Scheme V, as provided above, includes embodiments where L-linked agent is absent in one or more positions as provided above. This can be achieved, for example, when less than 100% yield is achieved when coupling the linked agent to the polymer and/or when less than an equivalent amount of linked agent is used in the reaction. Accordingly, the loading of the linked agent, by weight of the polymer, can vary.

Scheme VI

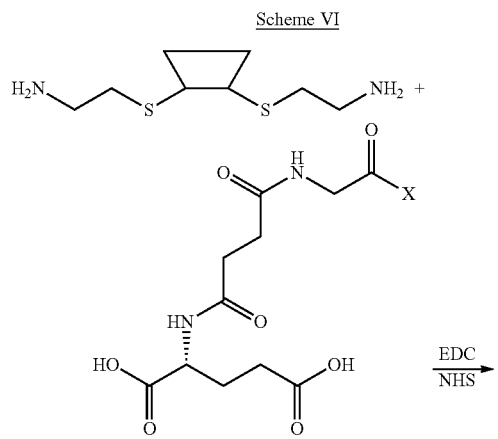

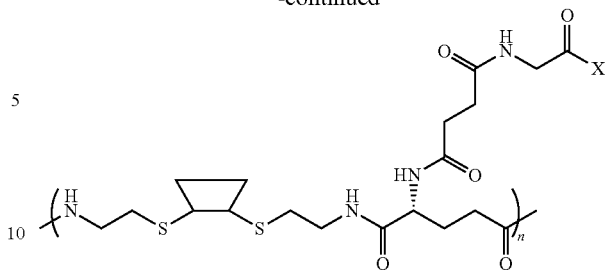

Scheme VI, as provided above, includes embodiments where linked agent is absent in one or more positions as provided above. This can be achieved, for example, when less than 100% yield is achieved when coupling the linked agent to the polymer and/or when less than an equivalent amount of linked agent is used in the reaction. In one embodiment, the linked agent is a therapeutic agent. Accordingly, the loading of the linked agent, by weight of the polymer, can vary.

Scheme VII

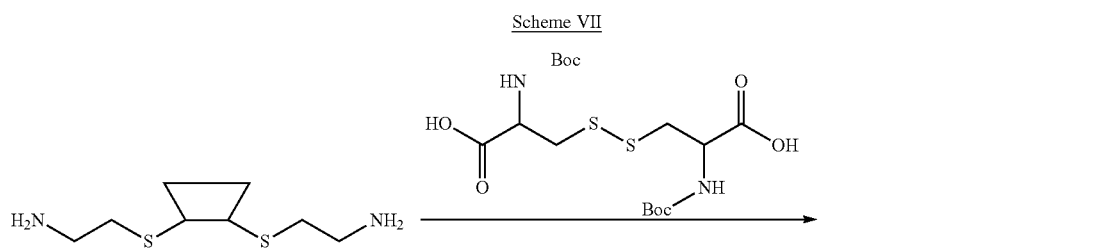

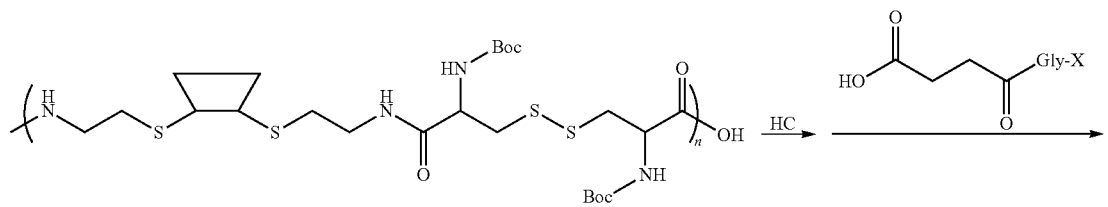

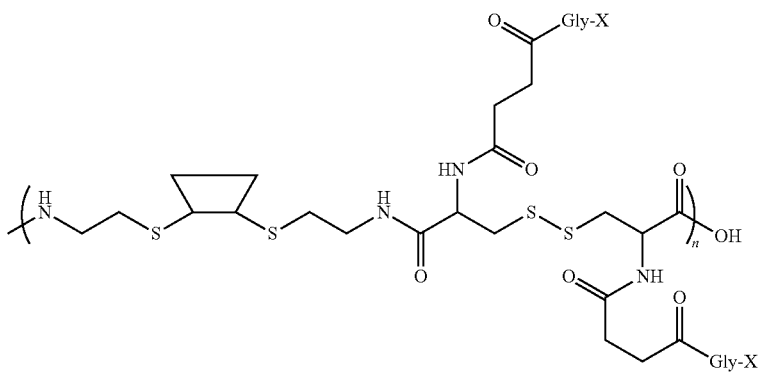

Scheme VII, as provided above, includes embodiments where gly-linked agent is absent in one or more positions as provided above. This can be achieved, for example, when less than 100% yield is achieved when coupling the linked agent to the polymer and/or when less than an equivalent amount of linked agent is used in the reaction. In one embodiment, the linked agent is a therapeutic agent. Accordingly, the loading of the linked agent, by weight of the polymer, can vary.

Scheme VIII

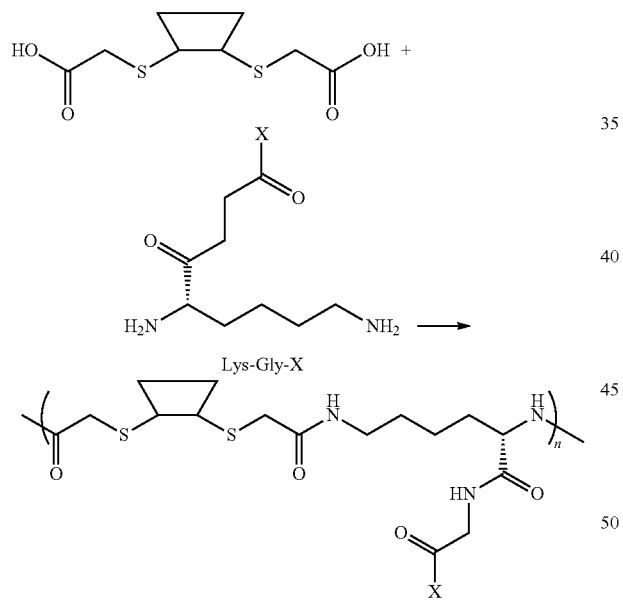

Scheme VIII, as provided above, includes embodiments where linked agent is absent in one or more positions as provided above. This can be achieved, for example, when less than 100% yield is achieved when coupling the linked agent to the polymer and/or when less than an equivalent amount of linked agent is used in the reaction. In one embodiment, the linked agent is a therapeutic agent. Accordingly, the loading of the linked agent, by weight of the polymer, can vary.

Additional examples of methods of synthesizing CDP-linked agent conjugates are shown in Schemes IX-XIV below. In each of Schemes IX-XIV, one or more of the linked agent moieties in the CDP-linked agent conjugate can be replaced with another linked agent e.g., another therapeutic agent such as a cytotoxic agent or immunomodulator. In one embodiment, the linked agent is a therapeutic agent.

Scheme IX

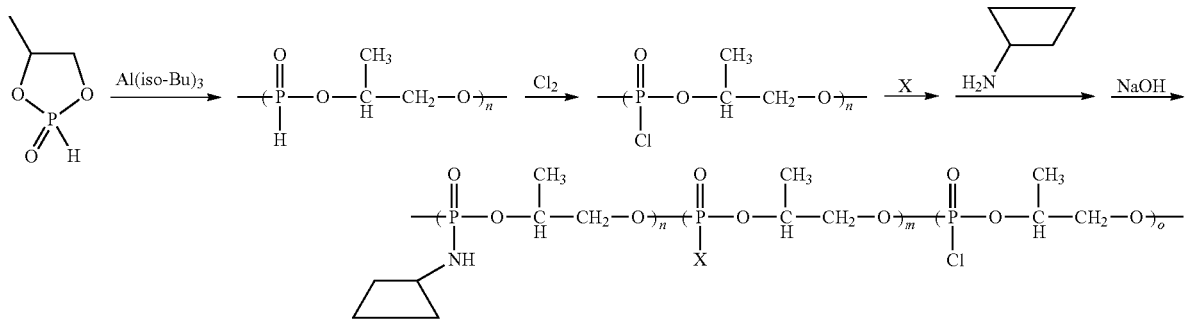

Scheme IX, as provided above, includes embodiments where linked agent is absent in one or more positions as provided above. This can be achieved, for example, when less than 100% yield is achieved when coupling the linked agent to the polymer and/or when less than an equivalent amount of linked agent is used in the reaction. Accordingly, the loading of the linked agent, by weight of the polymer, can vary.

Scheme X

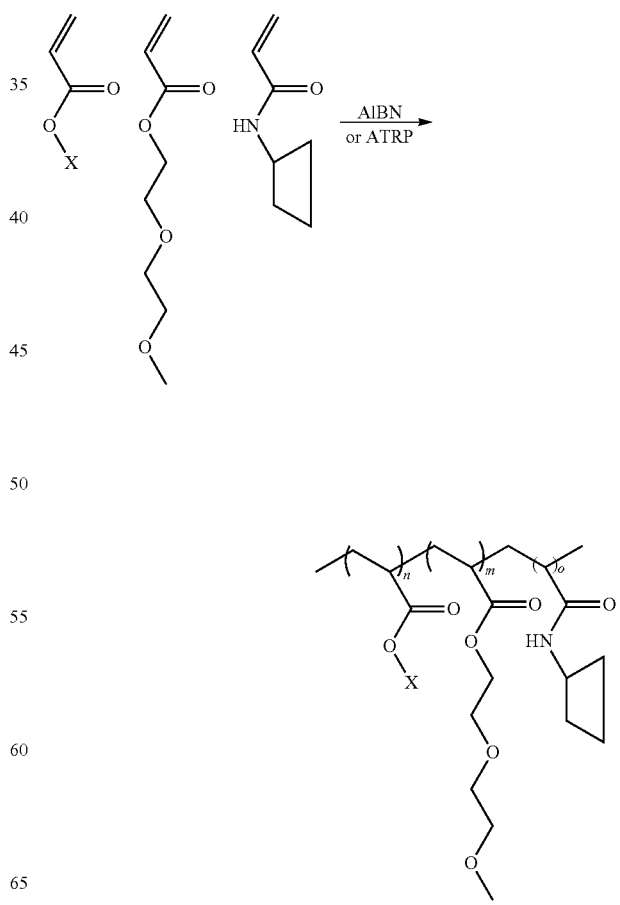

Scheme XI

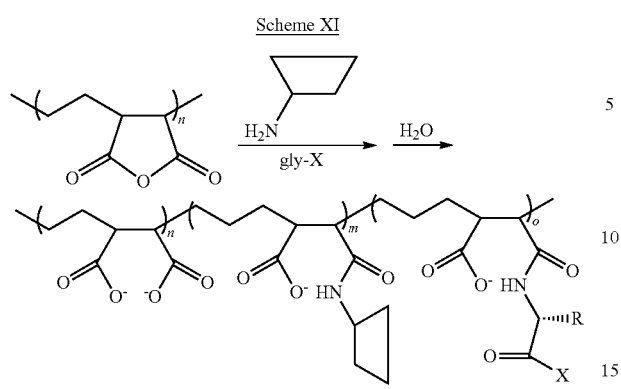

Scheme XI, as provided above, includes embodiments where gly-linked agent is absent in one or more positions as provided above. This can be achieved, for example, when less than 100% yield is achieved when coupling the linked agent to the polymer and/or when less than an equivalent amount of linked agent is used in the reaction. Accordingly, the loading of the linked agent, by weight of the polymer, can vary.

Scheme XII

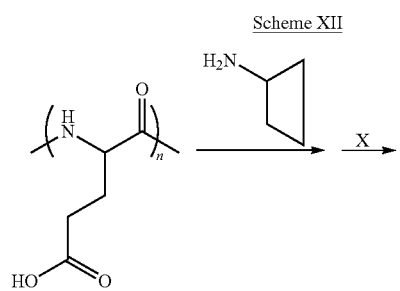

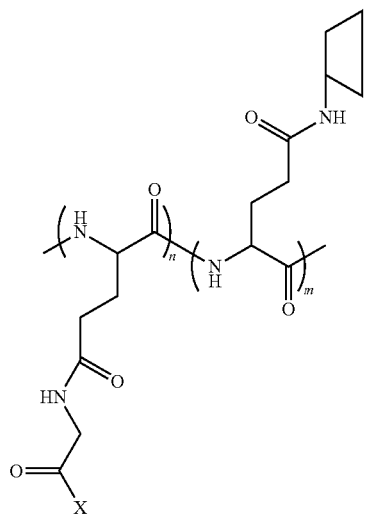

Scheme XII, as provided above, includes embodiments where linked agent is absent in one or more positions as provided above. This can be achieved, for example, when less than 100% yield is achieved when coupling the linked agent to the polymer and/or when less than an equivalent amount of linked agent is used in the reaction. Accordingly, the loading of the linked agent, by weight of the polymer, can vary.

CDPs and CDP-conjugates synthesized using CD-biscysteine monomer and a di-NHS ester such as PEG-DiSPA or PEG-BTC as shown in Schemes XIII-XIV below may also be precipitated according to the present invention.

Scheme XIII

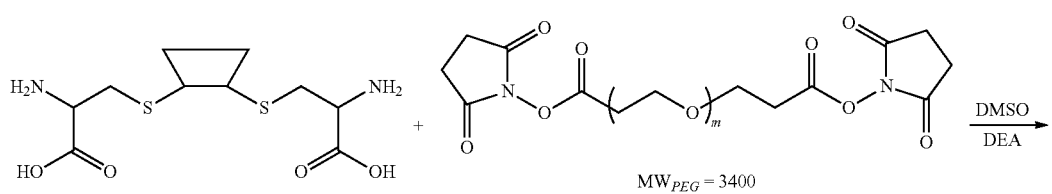

95-98%
Mn 55,700; Mw 99,500; Mw/Mn = 1.74

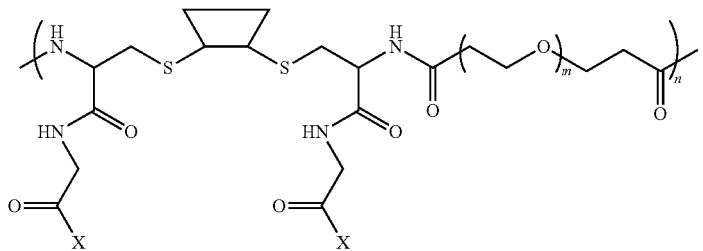

Scheme XIII, as provided above, includes embodiments where gly-linked agent is absent in one or more positions as provided above. This can be achieved, for example, when less than 100% yield is achieved when coupling the linked agent to the polymer and/or when less than an equivalent amount of linked agent is used in the reaction. Accordingly, the loading of the linked agent, by weight of the polymer, can vary.

In some embodiments, the method includes providing cyclodextrin moiety precursors modified to bear one reactive site at each of exactly two positions, and reacting the cyclodextrin moiety precursors with comonomer precursors having exactly two reactive moieties capable of forming a covalent bond with the reactive sites under polymerization conditions that promote reaction of the reactive sites with the reactive moieties to form covalent bonds between the Scheme XIV

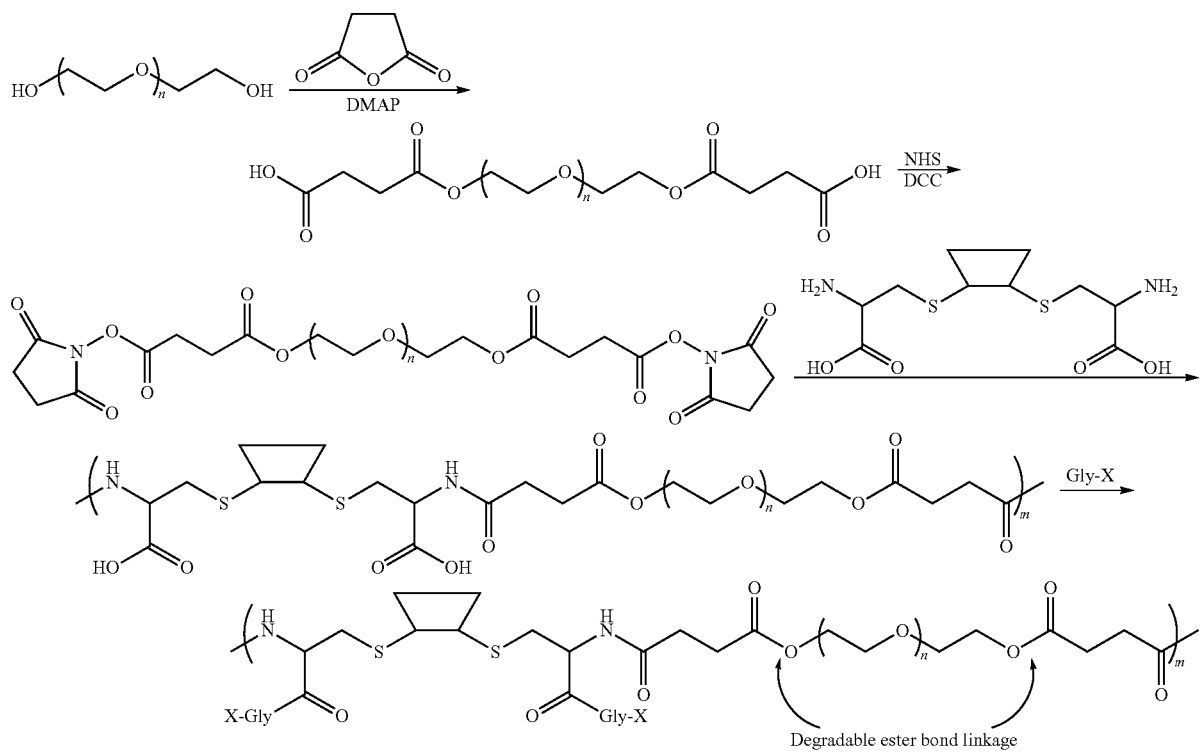

Scheme XIV, as provided above, includes embodiments where gly-linked agent is absent in one or more positions as provided above. This can be achieved, for example, when less than 100% yield is achieved when coupling the linked agent to the polymer and/or when less than an equivalent amount of linked agent is used in the reaction. Accordingly, the loading of the linked agent, by weight of the polymer, can vary.

In some embodiments, a CDP-linked agent conjugate can be made by providing a CDP comprising cyclodextrin moieties and comonomers which do not contain cyclodextrin moieties (comonomers), wherein the cyclodextrin moieties and comonomers alternate in the CDP and wherein the CDP comprises at least four, five, six, seven, eight, etc. cyclodextrin moieties and at least four, five, six, seven, eight, etc. comonomers; and attaching a linked agent to the CDP.

In some embodiments, the CDP is made by a process comprising: providing cyclodextrin moiety precursors, providing comonomer precursors, and copolymerizing said cyclodextrin moiety precursors and comonomer precursors to thereby make a CDP comprising cyclodextrin moieties and comonomers. In some embodiments, the CDP is conjugated with a linked agent to provide a CDP-linked agent conjugate.

comonomers and the cyclodextrin moieties, whereby a CDP comprising alternating units of a cyclodextrin moiety and a comonomer is produced.

In some embodiments, the therapeutic agent makes up at least 5%, 10%, 15%, 20%, 25%, 30%, or even 35% by weight of the CDP-linked agent conjugate. In some embodiments, at least about 50% of available positions on the CDP are reacted with a therapeutic agent and/or a linker therapeutic agent (e.g., at least about 55%, 60%, 65%, 70%, 75%, 80%, 85%, 90%, or 95%).

In some embodiments, the comonomer comprises polyethylene glycol of molecular weight 3,400 Da, the cyclodextrin moiety comprises beta-cyclodextrin, the theoretical maximum loading of therapeutic agent on the CDP-linked agent conjugate is 19%, and therapeutic agent is 17-21% by weight of the CDP-linked agent conjugate. In some embodiments, about 80-90% of available positions on the CDP are reacted with a therapeutic agent and/or a linker therapeutic agent.

In some embodiments, the comonomer precursor is a compound containing at least two functional groups through which reaction and thus linkage of the cyclodextrin moieties is achieved. In some embodiments, the functional groups, which may be the same or different, terminal or internal, of each comonomer precursor comprise an amino, acid, imidazole, hydroxyl, thio, acyl halide, —HC=CH—, —C≡C— group, or derivative thereof. In some embodiments, the two functional groups are the same and are located at termini of the comonomer precursor. In some embodiments, a comonomer contains one or more pendant groups with at least one functional group through which reaction and thus linkage of a therapeutic agent is achieved. In some embodiments, the functional groups, which may be the same or different, terminal or internal, of each comonomer pendant group comprise an amino, acid, imidazole, hydroxyl, thiol, acyl halide, ethylene, ethyne group, or derivative thereof. In some embodiments, the pendant group is a substituted or unsubstituted branched, cyclic or straight chain C1-C10 alkyl, or arylalkyl optionally containing one or more heteroatoms within the chain or ring.

In some embodiments, the cyclodextrin moiety comprises an alpha, beta, or gamma cyclodextrin moiety.

In some embodiments, the therapeutic agent is poorly soluble in water.

In some embodiments, the solubility of the therapeutic agent is <5 mg/ml at physiological pH.

In some embodiments, the therapeutic agent is a hydrophobic compound with a log P>0.4, >0.6, >0.8, >1, >2, >3, >4, or >5. In some embodiments, the therapeutic agent is hydrophobic and is attached via a second compound.

In some embodiments, administration of the CDP-linked agent conjugate to a subject results in release of the therapeutic agent over a period of at least 6 hours. In some embodiments, administration of the CDP-linked agent conjugate to a subject results in release of the therapeutic agent over a period of 6 hours to a month. In some embodiments, upon administration of the CDP-linked agent conjugate to a subject the rate of therapeutic agent release is dependent primarily upon the rate of hydrolysis as opposed to enzymatic cleavage.

In some embodiments, the CDP-linked agent conjugate has a molecular weight of 10,000-500,000 Da.

In some embodiments, the cyclodextrin moieties make up at least about 2%, 5%, 10%, 20%, 30%, 50% or 80% of the polymer by weight.

In some embodiments, the CDP includes a comonomer selected from the group consisting of: an alkylene chain, polysuccinic anhydride, poly-L-glutamic acid, poly(ethyleneimine), an oligosaccharide, and an amino acid chain. In some embodiments, a comonomer comprises a polyethylene glycol chain. In some embodiments, a comonomer comprises a polyglycolic acid or polylactic acid chain. In some embodiments, a comonomer comprises a hydrocarbylene group wherein one or more methylene groups is optionally replaced by a group Y (provided that none of the Y groups are adjacent to each other), wherein each Y, independently for each occurrence, is selected from, substituted or unsubstituted aryl, heteroaryl, cycloalkyl, heterocycloalkyl, or —O—, C(=X) (wherein X is NR$_1$, O or S), —OC(O)—, —C(=O)O, —NR$_1$—, —NR$_1$CO—, —C(O)NR$_1$—, —S(O)$_n$— (wherein n is 0, 1, or 2), —OC(O)—NR$_1$, —NR$_1$—C(O)—NR$_1$—, —NR$_1$—C(NR$_1$)—NR$_1$—, and —B(OR$_1$)—; and R$_1$, independently for each occurrence, represents H or a lower alkyl.

In some embodiments, a CDP-polymer conjugate of the following formula can be made as follows:

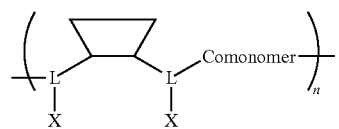

providing a polymer of the formula below:

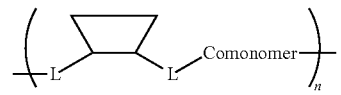

and coupling the polymer with a plurality of X moieties, wherein each X is independently absent or a therapeutic agent, to provide:

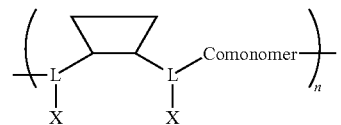

wherein the comonomer has a Mw of 2000 to 5000 Da (e.g., 3000 to 4000 Da, e.g., 3200 Da to about 3800 Da, e.g., about 3.4 kDa) and n is at least 4, 5, 6, 7, 8, 9, 10, 11, 12, 13, 14, 15, 16, 17, 18, 19 or 20.

In some embodiments, one or more of the therapeutic agent moieties in the CDP-linked agent conjugate can be replaced with another therapeutic agent, e.g., another cytotoxic agent or immunomodulator.

In some embodiments, a CDP-polymer conjugate of the following formula can be made as follows:

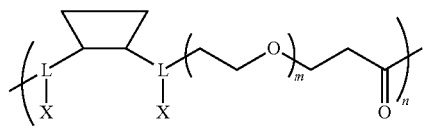

providing a polymer of the formula below:

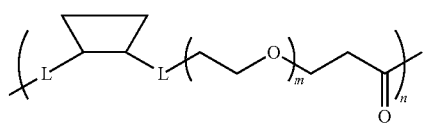

and coupling the polymer with a plurality of X moieties, wherein each X is independently absent or a therapeutic agent, to provide:

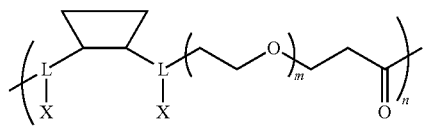

wherein the group

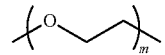

has a Mw of 4000 Da or less, e.g., 3200 to 3800 Da, e.g., 3.4 kDa and n is at least 4, 5, 6, 7, 8, 9, 10, 11, 12, 13, 14, 15, 16, 17, 18, 19 or 20.

In some embodiments, one or more of the therapeutic agent moieties in the CDP-linked agent conjugate can be replaced with another therapeutic agent, e.g., another cytotoxic agent or immunomodulator.

The reaction scheme as provided above includes embodiments where X is absent in one or more positions as provided above. This can be achieved, for example, when less than 100% yield is achieved when coupling the therapeutic agent to the polymer (e.g., 80-90%) and/or when less than an equivalent amount of therapeutic agent is used in the reaction. Accordingly, the loading of the therapeutic agent, by weight of the polymer, can vary, for example, the loading of the therapeutic agent can be at least about 3% by weight, e.g., at least about 5%, at least about 8%, at least about 10%, at least about 13%, at least about 15%, or at least about 20%.

In some embodiments, a CDP-polymer conjugate of the following formula can be made as follows:

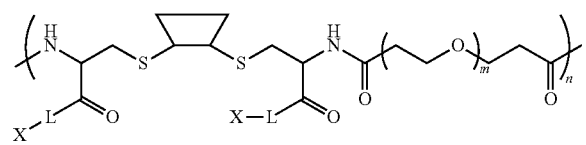

providing a polymer below:

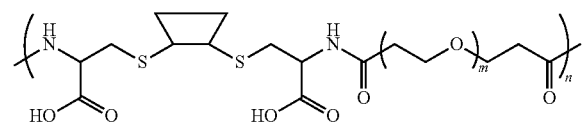

and coupling the polymer with a plurality of L-X moieties, wherein L is a linker or absent and X is a therapeutic agent, to provide:

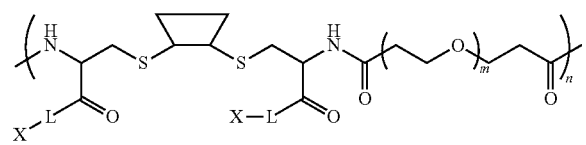

wherein the group

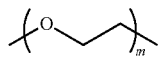

has a Mw of 4000 Da or less, e.g., 3200 to 3800 Da, e.g., 3.4 kDa and n is at least 4, 5, 6, 7, 8, 9, 10, 11, 12, 13, 14, 15, 16, 17, 18, 19 or 20.

In some embodiments, one or more of the therapeutic agent moieties in the CDP-linked agent conjugate can be replaced with another therapeutic agent, e.g., another cytotoxic agent or immunomodulator.

The reaction scheme as provided above includes embodiments where L-X is absent in one or more positions as provided above. This can be achieved, for example, when less than 100% yield is achieved when coupling the therapeutic agent-linker to the polymer (e.g., 80-90%) and/or when less than an equivalent amount of therapeutic agent-linker is used in the reaction. Accordingly, the loading of the therapeutic agent, by weight of the polymer, can vary, for example, the loading of the therapeutic agent can be at least about 3% by weight, e.g., at least about 5%, at least about 8%, at least about 10%, at least about 13%, at least about 15%, or at least about 20%.

In some embodiments, at least a portion of the L moieties of L-X is absent. In some embodiments, each L is independently an amino acid or derivative thereof (e.g., glycine).

In some embodiments, the coupling of the polymer with the plurality of L-X moieties results in the formation of a plurality of amide bonds.

In certain instances, the CDPs are random copolymers, in which the different subunits and/or other monomeric units are distributed randomly throughout the polymer chain. Thus, where the formula $X_m$—$Y_n$—$Z_o$ appears, wherein X, Y and Z are polymer subunits, these subunits may be randomly interspersed throughout the polymer backbone. In part, the term "random" is intended to refer to the situation in which the particular distribution or incorporation of monomeric units in a polymer that has more than one type of monomeric units is not directed or controlled directly by the synthetic protocol, but instead results from features inherent to the polymer system, such as the reactivity, amounts of subunits and other characteristics of the synthetic reaction or other methods of manufacture, processing, or treatment.

In some embodiments, one or more of the therapeutic agent (e.g., cytotoxic agent or immunomodulator) in the CDP-linked agent conjugate (e.g., CDP-cytotoxic agent conjugate or CDP-immunomodulator conjugate) can be replaced with another therapeutic agent, e.g., a cytotoxic agent or immunomodulator such as another anticancer agent or anti-inflammatory agent.

The reaction scheme as provided above includes embodiments where L-X is absent in one or more positions as provided above. This can be achieved, for example, when less than 100% yield is achieved when coupling the therapeutic agent (e.g., topoisomerase inhibitor)-linker to the polymer and/or when less than an equivalent amount of therapeutic agent (e.g., topoisomerase inhibitor)-linker is used in the reaction. Accordingly, the loading of the therapeutic agent (e.g., topoisomerase inhibitor), by weight of the polymer, can vary, for example, the loading of the therapeutic agent (e.g., topoisomerase inhibitor) can be at least about 3% by weight, e.g., at least about 5%, at least about 8%, at least about 10%, at least about 11%, at least about 12%, at least about 13%, at least about 14%, at least about 15%, at least about 20%, at least about 25%, at least about 30%, at least about 35%, at least about 40%, at least about 45%, or at least about 50%.

In some embodiments, at least a portion of the L moieties of L-X is absent. In some embodiments, each L is independently an amino acid or derivative thereof (e.g., glycine).

In some embodiments, the coupling of the polymer with the plurality of L-X moieties results in the formation of a plurality of amide bonds.

Anti-Solvent

In some embodiments, the anti-solvent comprises any of an organic solvent or a mixture of two or more organic solvents. By way of example, the anti-solvent can include any of methanol, ethanol, n-propanol, isopropanol, n-butanol, and ethyl ether, methyl isobutyl ketone (MIBK), ethyl acetate (ETAC), among others.

Solvent

In other embodiments, the CDP-linked agent conjugate, particle or composition may be a flexible or flowable material. When the CDP used is itself flowable, the CDP composition, even when viscous, need not include a biocompatible solvent to be flowable, although trace or residual amounts of biocompatible solvents may still be present.

While it is possible that the biodegradable polymer or the biologically active agent may be dissolved in a small quantity of a solvent that is non-toxic to more efficiently produce an amorphous, monolithic distribution or a fine dispersion of the biologically active agent in the flexible or flowable composition, it is an advantage that, in a preferred embodiment, no solvent is needed to form a flowable composition. Moreover, the use of solvents is preferably avoided because, once a polymer composition containing solvent is placed totally or partially within the body, the solvent dissipates or diffuses away from the polymer and must be processed and eliminated by the body, placing an extra burden on the body's clearance ability at a time when the illness (and/or other treatments for the illness) may have already deleteriously affected it.

However, when a solvent is used to facilitate mixing or to maintain the flowability of the CDP-linked agent conjugate, particle or composition, it should be non-toxic, otherwise biocompatible, and should be used in relatively small amounts. Solvents that are toxic should not be used in any material to be placed even partially within a living body. Such a solvent also must not cause substantial tissue irritation or necrosis at the site of administration.

Examples of suitable biocompatible solvents, when used, include N-methyl-2-pyrrolidone, 2-pyrrolidone, ethanol, propylene glycol, acetone, methyl acetate, ethyl acetate, methyl ethyl ketone, dimethylformamide, dimethylsulfoxide, tetrahydrofuran, caprolactam, oleic acid, or 1-dodecylazacylcoheptanone. In some embodiments, the solvents include N-methylpyrrolidone, 2-pyrrolidone, dimethylsulfoxide, and acetone are preferred because of their solvating ability and their biocompatibility. In some embodiments, the solvents include any of an ether, an alcohol, N-Methyl-2-pyrrolidone (NMP), dimethylacetamide (DMA), ethyl formate, methyl ethyl ketone (MEK), methyl isobutyl ketone (MIBK), methyl propyl ketone, isopropyl ketone, isopropyl acetate, acetonitrile (MeCN) and dimethyl sulfoxide (DMSO).

In certain embodiments, the CDP-linked agent conjugates, particles and compositions are soluble in one or more common organic solvents for ease of fabrication and processing. Common organic solvents include such solvents as chloroform, dichloromethane, dichloroethane, 2-butanone, butyl acetate, ethyl butyrate, acetone, ethyl acetate, dimethylacetamide, N-methylpyrrolidone, dimethylformamide, and dimethylsulfoxide.

Particle Characterization

In some embodiments, at least one attribute of a sample of particles (e.g., nanoparticles) produced (e.g., an average particle size, polydispersity, drug loading, etc), or that of its preparation, can be compared with a reference value or specification or allowable range for that attribute. The reference value can be, e.g., a release parameter or a manufacturing specification, e.g., one set by a regulatory agency, e.g., the FDA or EMEA, a compendial authority, or a manufacturer, or industry standard. In an embodiment, the reference value is a value exhibited by a preparation previously made by the method. In an embodiment, e.g., responsive to whether the attribute meets a reference value for that attribute a further decision or step is taken, e.g., the sample is classified, selected, rejected, accepted, or discarded, released or withheld, processed into a drug product, shipped, moved to a different location, formulated, labeled, packaged, released into commerce, exported, imported, or sold or offered for sale, depending on whether the preselected criterion is met. For example, based on the result of the evaluation, the batch from which a sample is taken can be processed, e.g., as just described. For example, if the criterion is met, the preparation is sold, shipped, or offered for sale or otherwise released into commerce.

Degradation

In certain embodiments, the CDP-linked agent conjugates, particles and compositions described herein, upon contact with body fluids, undergo gradual degradation. The life of a biodegradable polymer in vivo depends upon, among other things, its molecular weight, and biostability. In general, the greater the molecular weight and the greater the biostability, the slower biodegradation will be.

If a subject composition is formulated with a therapeutic agent or other material, release of the therapeutic agent or other material for a sustained or extended period as compared to the release from an isotonic saline solution generally results. Such release profile may result in prolonged delivery (over, say 1 to about 2,000 hours, or alternatively about 2 to about 800 hours) of effective amounts (e.g., about 0.0001 mg/kg/hour to about 10 mg/kg/hour, e.g., 0.001 mg/kg/hour, 0.01 mg/kg/hour, 0.1 mg/kg/hour, 1.0 mg/kg/hour) of the therapeutic agent or any other material associated with the polymer.

A variety of factors may affect the desired rate of hydrolysis of CDP-linked agent conjugates, particles and compositions, the desired softness and flexibility of the resulting solid matrix, rate and extent of bioactive material release. Some of such factors include the selection/identity of the various subunits, the enantiomeric or diastereomeric purity of the monomeric subunits, homogeneity of subunits found in the polymer, and the length of the polymer. For instance, one embodiment compriese heteropolymers with varying linkages, and/or the inclusion of other monomeric elements in the polymer, in order to control, for example, the rate of biodegradation of the matrix.

To illustrate further, a wide range of degradation rates may be obtained by adjusting the hydrophobicities of the backbones or side chains of the polymers while still maintaining sufficient biodegradability for the use intended for any such polymer. Such a result may be achieved by varying the various functional groups of the polymer. For example, the combination of a hydrophobic backbone and a hydrophilic linkage produces heterogeneous degradation because cleavage is encouraged whereas water penetration is resisted. Assays useful for determining the release of any material from the polymers of the present system are known in the aft.

The following examples are presented for further elucidation of various aspects of the invention. The examples are provided only for illustrative purposes and are not intended to necessarily indicate the optimal ways of practicing the invention and/or optimal results that can be obtained.

EXAMPLE I

A stock solution of 100 mg/ml of Poly-CD-Glycine-Docetaxel (CPD-No. 1 was prepared as follows: a solution of a 100 mg/ml Poly-CD-PEG (commonly known as CDP, which was made by Cambrex, Charles City Iowa) was prepared by dissolving 1.545 g of the polymer in 15.5 ml of anhydrous DMF (Aldrich) in a 50 ml round bottom flask. The mixture was stirred at room temperature on a stir plate at a medium speed (about 600 rpm) for approximately 1 hour 45 minutes to dissolve the polymer in the anhydrous DMF. 680 mg of Docetaxel-2'-Glycine MSA (CPD-No. 2, custom made by AMRI, Albany, N.Y.), 135 mg of EDCI (N-(3-Dimethylaminoprolyl)-N'-ethylcarbodiimide hydrochloride, commercial grade (Sigma-Adlrich), and 81 mg of NHS(N-Hydroxysuccinimide—98%, Fluka) were then added to the DMF-polymer solution and the solution was stirred until clear. 123 µl of DIPEA (N,N-Diisopropylethylamine—≥99%, Sigmal-Aldrich) was then added and the stirring continued for 3 hours 15 minutes at room temperature to complete the reaction. The resultant solution was stored in a freezer.

Three Celite (Celite® 512 medium from Sigma-Aldrich) suspensions in the anti-solvent IPA (isopropyl alcohol, Burdick & Jackson) were prepared by adding 500 mg, 1000 mg, and 1500 mg, respectively of Celite, to 15 ml of IPA in 20 ml scintillation vials. To each vial 1 ml of the above docetaxel conjugated CDP (CDP-No. 1) solution was added drop-wise and stirred with a magnetic stirrer at 1500 RPM. The ratios of CDP-No. 1 to Celite in the vials containing 500 mg, 1000 mg, and 1500 mg of Celite were, respectively, 1:5, 1:10, and 1:15 w/w. In all cases, a blob-like matrix composed of precipitated polymer and Celite appeared initially but it seemed to disappear into well-dispersed small particles after about 1 hour.

The resultant suspension was then vacuum filtered via Buchner funnel with Whatman filter paper. Each vial was rinsed with 20 ml acetone, which was also added to the filter followed by an additional 100 ml acetone rinse. The application of vacuum was continued for an additional 5 minutes to dry the polymer-coupled Celite (Celite-polymer). All filter cakes were free from "blob-like" material except that from the vial having the 1:50 ratio of CDP-No. 1 to Celite.

The Celite-Polymer was recovered and placed into a 50 ml falcon tube and 20 ml of water was added to the tube and the resultant suspension was stirred at 1500 rpm. After two hours of stirring, 4 ml of the suspension was removed and filtered through a 0.22 µm steriflip vacuum filter. The filtrate was recovered and assayed for docetaxel content (HPLC) and particle size. Particle size determination was performed using Zetasizer (Malvern Instruments). The results are shown in the table below and are consistent with those obtained by conventional processes:

TABLE 1

| CDP No. 1: Celite | Yield (%) | PS Zave (nm) |
|---|---|---|
| 1:5 | 31.3 | NA |
| 1:10 | 48.0 | 24 |
| 1:15 | 50.2 | 25 |

EXAMPLE II

A filter was constructed by filling a 20 ml glass syringe with approximately 26 grams of 5 mm (Pyrex) glass beads about ¾ full. A recirculation loop was constructed as per FIG. 3 using PTFE (polytetrafluorloethylene) tubing and an Ismatec gear pump Before starting, acetone was recirculated in the loop for several minutes and then drained.

A 15 ml solution of Poly-CD-PEG (commonly known as CDP, MW=4830, 1.5 g, 0.311 mmol) in anhydrous DMF was prepared (99.8% Anhydrous DMF, with 0.005% water, Aldrich) in a 50 ml round-bottom flask at a concentration of 100 mg/ml of Poly-CD-PEG. The mixture was stirred at room temperature on a stir plate at a medium speed (about 600 rpm) for approximately 45 minutes to completely dissolve the polymer. Docetaxel-2'-Glycine. MS (CDP-No. 2, MW 961.04, 0.656 g, 0.683 mmol), EDCI (MW 191.7, 0.132 g, 0.683 mmol) and NHS (MW 115.09, 0.0786 g, 0.683 mmol) were then added to the polymer-DMF solution and the solution was stirred until clear. DIEA (MW 129.25, 0.0883 g, 0.119 ml, 0.683 mmol) was then added and the stiffing was continued for 2 hours at room temperature.

6 ml of IPA was slowly added to 3 ml of the CDP solution in a 20 ml scintillation vial while continuously mixing the content of the vial. The content of the vial was then poured into a glass bead syringe (See vessel 12 in FIG. 3), which was fluidly coupled to the pump, and the pump was started at about 100 ml/min Isopropyl alcohol (IPA) was slowly added to the solution while the solution was recirculated through the syringe. After adding 10 ml of IPA, the beads appeared coated and the solution was cloudy. An additional 10 ml of IPA was added to the solution while the recirculation continued.

After an hour, the solution appeared clear. The IPA was drained from the circuit and was replaced with acetone. The acetone was then recirculated through the syringe for about 15 minutes. The acetone was then drained and replaced with fresh acetone and the fresh acetone was recirculated through the syringe for 15 minutes.

The acetone was then drained, and the circuit was refilled with approximately 28 ml of deionized water and the water was recirculated through the syringe for several minutes. The cloudy layer bound to the beads disappeared. The aqueous solution was then recovered and stored at 4° C. An aliquot of the solution was lyophilized. The drug concentration in the lyophilized product was determined gravimetrically to be 6.6 mg/ml, representing a recovery of 62%.

EXMPLE III

A filter was constructed by packing a single stainless steel scrubber (Tough Guy PN 2NTH9, Grainger Industrial Supply) into a 150 ml glass filter reactor housing (PN 6381, Ace Glass). A recirculation loop through the filter was constructed in a manner shown in FIG. 3 using PTFE tubing and an Ismatec gear pump 170 ml of isopropyl alcohol (IPA) was recirculated in the loop for several minutes in two session and then drained.

A 13 ml solution of Poly-CD-PEG (commonly known as CDP, MW 4830, 1.3 g, 0.311 mmol) was prepared by dissolving 1.3 g of CDP in 13 ml of anhydrous DMF (99.8% Anhydrous DMF, with 0.005% water, Aldrich) in a 20 ml scintillation vial at a concentration of 100 mg/ml of CDP. The mixture was stirred at room temperature on a stir plate at a medium speed (about 600 rpm) for approximately 45 minutes to completely dissolve the polymer. Docetaxel-2'-Glycine. MSA (CDP-No. 2, MW 961.04, 0.568 g, 0.683 mmol), EDCI (MW 191.7, 0.114 g, 0.683 mmol) and NHS (MW 115.09, 0.0681 g, 0.683 mmol) was then added to the polymer-DMF solution and the solution was stirred to obtain a clear solution. DIEA (MW 129.25, 0.0801 g, 0.108 ml, 0.683 mmol) was then added and the stirring was continued for 2 hours at room temperature.

The loop circuit was then filled with approximately 150 ml of IPA and the pump was started at about 450 ml/min 10 ml of the polymer solution was slowly injected into the filter at the top through a syringe and 18 Ga needle while the flow was recirculating. Recirculation continued for about 45 minutes.

Figure 6:
FIG. 6 is an image of a precipitate having effectively infiltrated a scrubber matrix as a result of an embodiment of a process according to the teachings of the invention.

During this period, it was observed visually that the precipitate effectively infiltrated the scrubber matrix, as shown in FIG. 6.

After 45 minutes the circuit was drained and recharged with about 150 ml acetone and the acetone was recirculated for about 30 minutes. The resultant acetone solution was drained and was replaced with approximately 170 ml of deionized water. Recirculation was restarted. After 30 minutes, the water was recovered. The conjugate concentration determined by weighing the dried product of a lyophilized aliquot of solution of known volume was 3.4 mg/ml, representing a recovery of 57%.

All publications cited herein, including patent and non-patent publications, are hereby incorporated by reference in their entirety. Those having ordinary skill in the art will appreciate that various modifications can be made to the above embodiments without departing from the scope of the invention.

The invention claimed is:

1. A process for precipitating a polymer from a polymer-containing fluid, comprising:
    providing a vessel housing a medium, the medium providing one or more precipitation surfaces,
    introducing a polymer-containing fluid and an anti-solvent into the vessel so as to cause precipitation of at least a portion of the polymer on at least one of said precipitation surfaces,
    wherein the polymer is a cyclodextrin-containing polymer (CDP)-docetaxel conjugate.

2. The process of claim 1 wherein the process further comprises extracting at least a portion of the polymer-containing fluid and the anti-solvent from the vessel and recirculating the mixture thorough the vessel and medium to induce further precipitation.

3. The process of claim 1, wherein said medium is porous.

4. The process of claim 3, wherein said porous medium comprises a plurality of insoluble supports providing said precipitation surfaces.

5. The process of claim 4, wherein said insoluble supports having said precipitation surfaces comprise a powder of diatomaceous earth.

6. The process of claim 1, wherein said medium is inert to any of said anti-solvent, said polymer-containing fluid, and said polymer.

7. The process of claim 1, wherein said polymer in said polymer-containing fluid has an average molecular weight between 50 kDa and 100 kDa.

8. The process of claim 1, further introducing at least a portion of said anti-solvent into said vessel prior to the introduction of the polymer-containing fluid into the vessel.

9. The process of claim 1, further comprising causing a flow of the anti-solvent through said vessel.

10. The process of claim 1, wherein the polymer in said polymer-containing fluid is immiscible in said anti-solvent.

11. The process of claim 1, wherein said polymer-containing fluid comprises any of a polymer solution, a polymer dispersion, and a mixed polymer solution/dispersion.

12. The process of claim 1, wherein said polymer-containing fluid comprises a polymer solution, said polymer solution comprising a quantity of said polymer dissolved in a process solvent, wherein said process solvent is at least partially miscible with said anti-solvent.

13. The process of claim 1, wherein the polymer in said polymer-containing fluid comprises a plurality of cyclodextrin moieties.

14. The process of claim 13, wherein at least one of said cyclodextrin moieties comprises α-cyclodextrin, β-cyclodextrin or γ-cyclodextrin.

15. The process of claim 13, wherein said cyclodextrin moieties form any of a linear and branched polymer.

16. The process of claim 1, wherein said polymer-containing fluid comprises acetone, ether, alcohol, tetrahydrofuran, 2-pyrrolidone, N-methyl-2-pyrrolidone, dimethylformamide, dimethylacetamide, methyl acetate, ethyl formate, methyl ethyl ketone, methyl isobutyl ketone, methyl propyl ketone, isopropyl ketone, isopropyl acetate, acetonitrile, dimethyl sulfoxide, or a combination thereof.

17. The process of claim 1, wherein said anti-solvent comprises any of an organic solvent or a mixture of two or more organic solvents.

18. A process for precipitating a polymer from a polymer-containing fluid, comprising:
    providing a vessel containing an anti-solvent and a plurality of insoluble supports in contact with said anti-solvent, said insoluble supports having a plurality of precipitation surfaces, and
    introducing a polymer-containing fluid into said anti-solvent so as to cause precipitation of at least a portion of the polymer on said precipitation surfaces,
    wherein the polymer is a cyclodextrin-containing polymer (CDP)-docetaxel conjugate.

19. A process for generating polymeric particles, comprising
    providing a vessel housing a medium, the medium providing one or more precipitation surfaces,
    introducing a polymer-containing fluid and an anti-solvent into the vessel so as to cause precipitation of at least a portion of the polymer on at least one of said precipitation surfaces, and
    placing the precipitated polymer in contact with a stripping liquid to remove at least a portion of said precipitated polymer from said at least one precipitation surface so as to form a plurality of polymeric particles,
    wherein the polymer is a cyclodextrin-containing polymer (CDP)-docetaxel conjugate.

20. The process of claim 19, further comprising causing a recirculating flow of the anti-solvent through the vessel and introducing the polymer-containing fluid into said flowing anti-solvent.

21. The process of claim 19, wherein said medium is porous.

22. The process of claim 19, wherein said medium is inert to any of said anti-solvent, said polymer-containing fluid, and said polymer.

23. The process of claim 19, wherein the polymer in said polymer-containing fluid is miscible in said anti-solvent.

24. The process of claim 19, wherein the polymer in said polymer-containing fluid comprises a plurality of cyclodextrin moieties.

25. The process of claim 24, wherein at least one of said cyclodextrin moieties comprises α-cyclodextrin, β-cyclodextrin or γ-cyclodextrin.

26. The process of claim 24, wherein said cyclodextrin moieties form any of a linear and branched polymer.

27. The process of claim 19, wherein said polymer-containing fluid comprises acetone, ether, alcohol, tetrahydrofuran, 2-pyrrolidone, N-methyl-2-pyrrolidone, dimethylformamide, dimethylacetamide, methyl acetate, ethyl formate, methyl ethyl ketone, methyl isobutyl ketone, methyl propyl ketone, isopropyl ketone, isopropyl acetate, acetonitrile, dimethyl sulfoxide, or a combination thereof.

28. The process of claim 19, wherein said anti-solvent comprises any of an organic solvent or a mixture of two or more organic solvents.

29. The process claim 19, further comprising filtering a mixture of said particles and said solvent.

30. The process of claim 19, further comprising collecting said polymeric particles.

31. The process of claim 30, further comprising lyophilizing said collected polymeric particles.

* * * * *